United States Patent
Zitzewitz et al.

(10) Patent No.: US 10,467,695 B1
(45) Date of Patent: Nov. 5, 2019

(54) SYSTEMS AND METHODS RELATED TO BOND VALUATION

(71) Applicant: Interactive Data Pricing and Reference Data LLC, Bedford, MA (US)

(72) Inventors: Eric Zitzewitz, Hanover, NH (US); Ning Liu, New York, NY (US)

(73) Assignee: Interactive Data Pricing and Reference Data LLC, Bedford, MA (US)

( * ) Notice: Subject to any disclaimer, the term of this patent is extended or adjusted under 35 U.S.C. 154(b) by 796 days.

(21) Appl. No.: 14/457,586

(22) Filed: Aug. 12, 2014

Related U.S. Application Data

(60) Provisional application No. 61/864,817, filed on Aug. 12, 2013, provisional application No. 61/936,096, filed on Feb. 5, 2014.

(51) Int. Cl.
*G06Q 40/04* (2012.01)

(52) U.S. Cl.
CPC .................... *G06Q 40/04* (2013.01)

(58) Field of Classification Search
CPC .............. G06Q 40/06; G06Q 40/00
See application file for complete search history.

(56) References Cited

U.S. PATENT DOCUMENTS

| | | | |
|---|---|---|---|
| 6,912,509 B1* | 6/2005 | Lear ............... | G06Q 40/04 705/36 R |
| 7,167,837 B1* | 1/2007 | Ciampi ............ | G06Q 40/00 705/35 |
| 8,346,647 B1* | 1/2013 | Phelps ............. | G06Q 40/06 705/35 |
| 2003/0177077 A1* | 9/2003 | Norman .......... | G06Q 40/00 705/35 |

(Continued)

OTHER PUBLICATIONS

Keim, D. et al., "The Cost of Institutional Equity Trades:," Financial Analysts Journal 54: 50-69, Jul./Aug. 1998.*

(Continued)

*Primary Examiner* — Peter Ludwig
*Assistant Examiner* — Gregory S Cunningham, II
(74) *Attorney, Agent, or Firm* — DLA Piper LLP (US)

(57) ABSTRACT

An exemplary aspect comprises a computer system having one or more processors, comprising: a receiving component that receives valuation data for a security; a filtering component that filters the received valuation data to remove outlier values according to a predetermined set of parameters; a transaction cost adjustment component calculates a transaction cost adjustment coefficient based on a first transaction cost adjustment regression calculation of the processed valuation data, and determines a final transaction cost adjustment value based on the transaction cost adjustment coefficient; a market adjustment component that calculates a market adjustment coefficient based on a first market adjustment regression calculation of the processed (Continued)

valuation data, and determines a final market adjustment value based on the market adjustment coefficient; and an output component that outputs a pricing estimation of the security based on the final transaction cost adjustment value and the final market adjustment value.

11 Claims, 32 Drawing Sheets

(56) References Cited

U.S. PATENT DOCUMENTS

2007/0078746 A1* 4/2007 Ciampi .................. G06Q 40/00
705/36 R

OTHER PUBLICATIONS

Copeland, Financial Theory and Corporate Policy, $3^{rd}$ Edition 1992.*
SPSS: Stepwise linear regression. University of Leeds [source online], [date of article available to public] Mar. 24, 2013 [retrieved on Oct. 26, 2017 ]. Retrieved from the Internet: <URL: https://web.archive.org/web/20130324061058/http://www.geog.leeds.ac.uk/courses/other/statistics/spss/stepwise.*

* cited by examiner

FIG. 8

| USIG Worksheet | | | | | | | | | | | | | | |
|---|---|---|---|---|---|---|---|---|---|---|---|---|---|---|
| Real Time ▼ | View: All ▼ | | Group: Bank NY ▼ | | | | | | | | | | | |
| Details | Parent Search | Guidance Entry | Quote Entry | Interpolate | | Accept | | | | | | | | |
| CUSIP | Description | Coupon | Maturity Date | Bid Spread | Model Bid Spread | Mid Spread | Model Mid Spread | Benchmark | Bid Yield | Bid Price | Model Bid Price | Mid Price | Model Mid Price | Model/Eval Diff |
| 06405TBDF | BANK NEW YORK INC SB NT | 5.500 | 12/01/2017 | 126 | | | | 5 Year | 1.882 | 117.0870 | 118.236 | | | 0.890 |
| 06406AA | BANK NEW YORK MELLON CORP - SR | 1.969 | 06/20/2017 | 57 | | | | 5 Year | 1.192 | 103.4107 | 102.695 | | | -0.940 |
| 06406HAU | BANK NEW YORK MTN BK EN - FR 4.5 | 4.500 | 10/15/2013 | 90 | | | | 912795SC1 | 1.100 | 102.9717 | 102.205 | | | -0.810 |
| 06406HBJ | BANK NEW YORK MTN BK EN - FR 4.5 | 4.500 | 04/01/2013 | 0 | | | | 912795SC1 | 0.300 | 101.2697 | 100.955 | | | -0.330 |
| 06406HBK | BANK NEW YORK MTN BK EN - FR 5.1 | 5.125 | 06/27/2013 | | | | | 912795SC1 | | 101.2697 | 100.285 | | | -1.000 |
| 06406HBL | BANK NEW YORK MTN BK EN - FR 4.3 | 4.300 | 05/15/2014 | 31 | | | | 10 Year | 0.552 | 105.3123 | 105.016 | | | -0.370 |
| 06406HBM | BANK NEW YORK MTN BK EN - FR 5.4 | 5.450 | 05/15/2019 | 52 | | | | 10 Year | 2.156 | 120.1015 | 120.385 | | | -0.070 |
| 06406HBN | BANK NEW YORK MTN BK EN - SR NT | 3.100 | 01/15/2015 | 44 | | | | 3 Year | 0.767 | 104.9722 | 105.859 | | | -0.780 |
| 06406HBP | BANK NEW YORK MTN BK EN - SR NT | 4.600 | 01/15/2020 | 55 | | | | 10 Year | 2.180 | 115.8196 | 115.226 | | | -0.950 |
| 06406HBQ | BANK NEW YORK MTN BK EN - SR NT | 2.950 | 06/18/2015 | 32 | | | | 3 Year | 0.738 | 106.6778 | 106.427 | | | 0.620 |
| 06406HBS | BANK NEW YORK MTN BK EN - SR NT | 2.500 | 01/15/2016 | 25 | | | | 5 Year | 0.872 | 104.9549 | 105.152 | | | 0.040 |
| 06406HBT | BANK NEW YORK MTN BK EN - SR NT | 1.500 | 01/31/2014 | 18 | | | | 2 Year | 0.421 | 101.2220 | 101.269 | | | -0.010 |
| 06406HBU | BANK NEW YORK MTN BK EN - SR NT | 4.150 | 02/01/2021 | 72 | | | | 10 Year | 2.350 | 113.2571 | 112.964 | | | -0.690 |
| 06406HBX | BANK NEW YORK MTN BK EN - SR NT | 2.300 | 07/28/2016 | 39 | | | | 5 Year | 1.016 | 104.7219 | 105.625 | | | 0.720 |
| 06406HBY | BANK NEW YORK MTN BK EN - SR NT | 3.550 | 09/23/2021 | 74 | | | | 10 Year | 2.373 | 109.4706 | 110.494 | | | 0.610 |
| 06406HBZ | BANK NEW YORK MTN BK EN - SR NT | 1.700 | 11/24/2014 | 35 | | | | 2 Year | 0.592 | 102.0570 | 101.601 | | | -0.550 |
| 06406HCA | BANK NEW YORK MTN BK EN - SR NT | 2.400 | 01/17/2017 | 41 | | | | 5 Year | 1.032 | 105.3684 | 105.631 | | | 0.060 |
| 06406HCC | BANK NEW YORK MTN BK EN - SR NT | 1.200 | 02/20/2015 | 37 | | | | 3 Year | 0.693 | 101.1041 | 102.159 | | | 0.950 |
| 06406HCD | BANK NEW YORK MTN BK EN - FR 0.7 | 0.700 | 10/23/2013 | 46 | | | | 3 Year | 0.801 | 99.7145 | 99.246 | | | -0.610 |
| 06406HCE | BANK NEW YORK MTN BK EN - FR 1.3 | 1.300 | 01/25/2016 | 65 | | | | 5 Year | 1.272 | 100.1345 | 99.448 | | | -0.930 |
| 06406JBC | BANK NEW YORK INC SUB CORE N - 2 | 0.000 | 04/01/2014 | 401 | | | | 2 Year | 4.252 | 94.6662 | 93.887 | | | -0.840 |
| 06406JBD | BANK NEW YORK INC SUB CORE N - 2 | 0.000 | 04/14/2014 | 406 | | | | 2 Year | 4.307 | 94.5224 | 93.814 | | | -0.770 |
| 06406JBE | BANK NEW YORK INC SUB CORE N - 2 | 0.000 | 04/14/2014 | 406 | | | | 2 Year | 4.307 | 94.5224 | 95.054 | | | 0.470 |
| 06406JCN | BANK NEW YORK INC SUB CORE N - F | 5.100 | 02/20/2018 | 158 | | | | 5 Year | 2.202 | 100.5037 | 101.353 | | | 0.840 |
| 06406JHB | BANK NEW YORK INC SUB CORE N - F | 4.950 | 03/15/2015 | 45 | | | | 3 Year | 0.771 | 109.3369 | 110.455 | | | 1.000 |
| 0640P0AB | BANK NEW YORK INC SR CORENOTES | 4.600 | 10/15/2013 | 147 | | | | 912795C1 | 1.779 | 102.3909 | 103.183 | | | 0.750 |
| 0640P0AC | BANK NEW YORK INC SR CORENOTES | 4.700 | 10/15/2013 | 148 | | | | 912795C1 | 1.790 | 102.4743 | 101.967 | | | -0.550 |

COMMENT | | SAVE | RESET | REFRESH

| Trade Data Enhancements (Institutional Trades - Security) | | | | | | | | | | | | | | | | | | | |
|---|---|---|---|---|---|---|---|---|---|---|---|---|---|---|---|---|---|---|---|
| Identifier | 3135G0LN | | | | | | | | | | | | | | | | | | |
| Side | Size | Model Side Indicator | Model Paired Indicator | Model Paired | Trade Time | Trade Price | Trade Yield | Trade Spread | Trade Id Mark | Mdl. Trade-to-trade Change in Price | Mdl. Updated Time | Model Bid Price | Model Mid Price | Model Ask Price | Mdl. OOS Weights | Mdl. Out-of-sample TC | Mdl. Truncated Out-of-sample TC | Mdl. Issue-Level TC | Mdl. Final TC | Trade Action |
| Dir Sell | 5,000,000 | 1 | 0 | 0 | 08/07/2012 13:55:07 | 100.130 | 0.420 | 6 | 912828BY0 | | | | | | | | | | | REPORTED |
| IDB | 5,000,000 | 0 | 0 | 0 | 08/07/2012 13:00:56 | 100.175 | 0.440 | 7 | 912828BY0 | | | | | | | | | | | REPORTED |
| IDB | 5,000,000 | 1 | 0 | 0 | 08/07/2012 13:07:44 | 100.170 | 0.441 | 8 | 912828BY0 | | | | | | | | | | | REPORTED |
| Dir Sell | 5,000,000 | 0 | 1 | 1 | 08/07/2012 12:56:07 | 100.185 | 0.436 | 8 | 912828BY0 | | | | | | | | | | | REPORTED |
| IDB | 5,000,000 | 0 | 1 | 1 | 08/07/2012 12:52:13 | 100.020 | 0.484 | 13 | 912828BY0 | | | | | | | | | | | REPORTED |
| IDB | 5,000,000 | 0 | 0 | 0 | 08/07/2012 12:52:13 | 100.177 | 0.439 | 9 | 912828BY0 | | | | | | | | | | | REPORTED |
| Dir Sell | 5,000,000 | | | | 08/07/2012 12:47:20 | 100.198 | 0.439 | 9 | 912828BY0 | | | | | | | | | | | REPORTED |
| IDB | 5,000,000 | | | | 08/07/2012 12:29:00 | 100.162 | 0.432 | 9 | 912828BY0 | | | | | | | | | | | REPORTED |
| Dir Sell | 5,000,000 | | | | 08/07/2012 11:17:56 | 100.192 | 0.433 | 8 | 912828BY0 | | | | | | | | | | | REPORTED |
| Dir Sell | 5,000,000 | | | | 08/07/2012 11:36:22 | 100.200 | 0.432 | 8 | 912828BY0 | | | | | | | | | | | REPORTED |
| Dir Buy | 5,000,000 | | | | 08/07/2012 10:38:17 | 100.215 | 0.420 | 8 | 912828BY0 | | | | | | | | | | | REPORTED |
| IDB | 5,000,000 | | | | 08/07/2012 09:58:59 | 100.211 | 0.427 | 8 | 912828BY0 | | | | | | | | | | | REPORTED |
| IDB | 5,000,000 | | | | 08/07/2012 09:58:59 | 100.210 | 0.426 | 8 | 912828BY0 | | | | | | | | | | | REPORTED |
| Dir Buy | 5,000,000 | | | | 08/07/2012 09:52:36 | 100.227 | 0.421 | 8 | 912828BY0 | | | | | | | | | | | REPORTED |
| IDB | 5,000,000 | | | | 08/07/2012 09:52:28 | 100.227 | 0.421 | 8 | 912828BY0 | | | | | | | | | | | REPORTED |
| Dir Buy | 5,000,000 | | | | 08/07/2012 09:02:16 | 100.235 | 0.419 | 8 | 912828BY0 | | | | | | | | | | | REPORTED |

[ Accept ] [ Apply to Security ] [ Reject ]

FIG. 11

MODEL PRICING CONFIGURATION

SECTOR [CORP ▼]

[DATA PREPARATION] [TRANSACTION COST ADJUSTMENT] [MARKET ADJUSTMENT]

DATA PREPARATION

MINIMUM TRADES FOR A BOND REQUIRED

THE MINIMUM NUMBER OF TRADES FOR A BOND TO CALCULATE THE AVERAGES IN THE MODEL IS [6]

ADJUSTED WEIGHTS

ADJUSTED WEIGHTS, FUNCTION (2.2):

ADJUSTED WEIGHTS = WEIGHT/(COEF1 + COEF2 * SIZE * (1 - (ABS(SIDE + PAIRED)/2)) + COEF3 * ABS(SIDE) - COEF4 * (SIDE + PAIRED))

COEF1 = [0.8]
COEF2 = [0.3]
COEF3 = [0.25]
COEF4 = [0.15]

[COMMENT]

[SAVE] [RESET] [REFRESH]

FIG. 12

MODEL PRICING CONFIGURATION

SECTOR [CORP ▽]

| DATA PREPARATION | TRANSACTION COST ADJUSTMENT | MARKET ADJUSTMENT |

TRANSACTION COST ADJUSTMENT

Truncated In-Sample and Out-of-Sample Predicted Transaction Costs, *Function (3.3) and (3.4)*

$C_O = Sign(S_d + P) * max(Coef1, min(Coef2 * coef, Sign(S_d + P) * C_{O\_original}))$, if $ABS(S_d + P) = 1$ Coef1 = [0.05]
Coef2 = [2.5]

$C_I = Sign(S_d + P) * max(Coef3, min(Coef4 * coef, Sign(S_d + P) * C_{I\_original}))$, if $ABS(S_d + P) = 1$ Coef3 = [0.05]
Coef4 = [2.5]

Rescaled Transaction Cost, *Function (3.18)*

$tc = C_O * (1 + (\widetilde{\beta}_1^p - 1) * (Coef5 - Coef6 * Max(0, Min(1, E_p * 100 - 100))))$ Coef5 = [0.8]
Coef6 = [0.3]

Final Transaction Cost Adjustment, *Function (3.26)*

$tc_3 = tc * (1 + (\widetilde{\beta}_1 - 1) * max(0, min(1, Coef7 - Coef8 * ln(Coef9 * \overline{E}_p))))$ Coef7 = [0.5]
Coef8 = [0.25]
Coef9 = [8]

COMMENT [            ]

[ SAVE ] [ RESET ] [ REFRESH ]

FIG. 13

MODEL PRICING CONFIGURATION

SECTOR [CORP ▼]

| DATA PREPARATION | TRANSACTION COST ADJUSTMENT | MARKET ADJUSTMENT |

MARKET ADJUSTMENT

New LQD Beta, *Function (3.19)*
$$\beta_i = Max(Coef1, \beta_{LQD} * Coef2 + \overline{\beta}_1^l * Coef3)$$

Coef1 = [5]
Coef2 = [0.4]
Coef3 = [0.4]

New HYG-LQD Beta, *Function (3.21)*
$$\beta_K = \beta_{HYG-LQD} * Coef4 + Coef5 * (\overline{\beta}_1^h - \beta_{HYG-LQD}) * (1 - Coef6 * max(0, min(Coef7, \overline{E}_k)))$$

Coef4 = [0.8]
Coef5 = [0.8]
Coef6 = [0.2]
Coef7 = [4]

Final Market Adjustment, *Function (3.29)*
$$eff23 = eff2 * (Coef8 * (1 + (\widetilde{\beta}_2 - 1) * max(0, min(1, 1 - Coef9 * \sqrt{\sigma^2(\widetilde{\beta}_2)})))$$

Coef8 = [0.9]
Coef9 = [3]

[COMMENT]

[SAVE] [RESET] [REFRESH]

FIG. 14

MODEL PRICING CONFIGURATION

SECTOR [AGY ▾]

[ DATA PREPARATION | TRANSACTION COST ADJUSTMENT | MARKET ADJUSTMENT ]

MARKET ADJUSTMENT

New AGZ Beta, Function (3.19)
$$\beta_\alpha = Max(Coef1, \beta_{AGZ} * Coef2 + \overline{\beta}_1^l * Coef3)$$

Coef1 = [5]
Coef2 = [0.4]
Coef3 = [0.4]

New IEI-AGZ Beta, Function (3.21)
$$\beta_1 = \beta_{IEI\text{-}AGZ}^l * Coef4 + Coef5 * (\overline{\beta}_1^k - \beta_{IEI\text{-}AGZ}^l) * (1 - Coef6 * \max(0, \min(Coef7, \overline{E}_k)))$$

Coef4 = [0.8]
Coef5 = [0.8]
Coef6 = [0.2]
Coef7 = [4]

Final Market Adjustment, Function (3.29)
$$eff23 = eff2 * (Coef8 * (1 + (\widetilde{\beta}_2 - 1) * \max(0, \min(1, 1 - Coef9 * \sqrt{\sigma^2(\widetilde{\beta}_2)})))$$

Coef8 = [0.9]
Coef9 = [3]

COMMENT [ ]   SAVE   RESET   REFRESH

FIG. 15

MODEL DETAILS

USIG INSTRUMENT CUSIP: [CU2342GT87]   [REAL TIME ▼]

|  | BID | MID | ASK |  |
|---|---|---|---|---|
| PRICE | | | | $ |
| YIELD | | | | bps |
| SPREAD | | | | % |

CLS [ ] $
CONF. GROUP [ ]

MODEL RATING SCORE [ ]
MODEL YTM [ ]
MODEL UPDATED TIME [ ]
MODEL/EVAL DIFF [ ]
MODEL MKT. ADJ. [ ]
MODEL PX CHANGE [ ]
MODEL PRICE STATUS [ ]

COMMENT [ ]    [SAVE] [RESET] [REFRESH]

INVESTMENT GRADE MARKET DATA RANKING PROFILES

| PROFILE NAME | STATUS |
|---|---|
| DEFAULT INSTITUTIONAL | ACTIVE |
| DEFAULT RETAIL | ACTIVE |
| KHARKIN IGNORE MICRO LOT | PENDING |
| | |

[NEW] [COPY] [DELETE]

| | |
|---|---|
| NAME | DEFAULT RETAIL |
| LAST UPDATED | 03/01/2013 12:21:15 |
| UPDATED BY | PVALENTIN |
| DATE CREATED | 12/19/2012 09:38:01 |

DATA RANKING

1. DEFAULT SOURCE QUOTE
2. MODEL PRICE HIGH CONFIDENCE GROUP
3. INTERDEALER
4. IDCO SOURCE DATA

[←] [↓] [↑] [→]

UNUSED DATA TYPES

DEALER BUY - NONRECENT - MICRO LOT
DEALER BUY - NONRECENT - ODD LOT
DEALER BUY - NONRECENT - ROUND LOT
DEALER BUY - NONRECENT - ALL SIZES
DEALER BUY - RECENT - MICRO LOT
DEALER BUY - RECENT - ODD LOT
INTERDEALER GROUP - ROUND LOT

RECENT (LESS THAN) [3] HRS
PREVIOUS DAY (AFTER) [4:00 PM]
INTERDEALER GROUP SIZE [5]
MIN. LEVEL FOR "HIGH RANK" [4]

COMMENT [ ]

[SAVE] [RESET] [REFRESH]

MODEL PRICING CONFIGURATIONS

SECTOR [CORP ▼]

| DATA PREPARATION | TRANSACTION COST ADJUSTMENT | MARKET ADJUSTMENT | CONFIDENCE INTERVAL | CONFIDENCE GROUP |

CONFIDENCE GROUP – THRESHOLD RANGE

HIGH AND MEDIUM GROUP

THE RANGE SHOULD BE [13] + [2] CENTS
                     − [3] CENTS

MEDIUM AND LOW GROUP

THE RANGE SHOULD BE [80] + [20] CENTS
                     − [30] CENTS

COMMENT [          ]

[SAVE]  [RESET]  [REFRESH]

FIG. 25

MODEL PRICING CONFIGURATIONS

SECTOR [CORP ▼]

| DATA PREPARATION | TRANSACTION COST ADJUSTMENT | MARKET ADJUSTMENT | CONFIDENCE INTERVAL |

CONFIDENCE INTERVAL

LARGE TRADES DEFINITION
"LARGE" IS DEFINED AS TRADES WITH SIZE OVER $ [1,000,000]

CONFIDENCE INTERVAL TYPE
THE TYPE OF CONFIDENCE INTERVAL IS [25-75 ▼], AND THE TYPE OF QUANTILES REGRESSION IS [50] th PERCENTILE

TRUNCATION REQUIREMENTS
PREDICTED VALUES ARE TRUNCATED AT THE [1st] AND [99th] PERCENTILES FROM THE MOST RECENT MONTH

POINTS REQUIREMENTS
A MINIMUM OF ([0.05] POINTS)² IS APPLIED

COMMENT [          ]

[SAVE]  [RESET]  [REFRESH]

SYSTEMS AND METHODS RELATED TO BOND VALUATION

CROSS REFERENCE TO RELATED APPLICATIONS

This application claims priority under 35 U.S.C. 119(e) to U.S. Provisional Patent Application No. 61/864,817, filed Aug. 12, 2013, entitled "Systems and Method Related to Bond Valuation" and to U.S. Provisional Patent Application No. 61/936,096, filed Feb. 5, 2014, entitled "Systems and Methods Related to Bond Valuation." The entire contents of each of the above-referenced applications are incorporated herein by reference.

INTRODUCTION

Effective valuation of fixed income instruments, such as corporate bonds, is an essential input to various activities within capital markets, including bond trading, risk management and financial reporting. Unlike equity instruments, whose issuance typically is concentrated in one issue per issuing entity (or potentially a small number of stock "classes"), fixed income issuers may have tens, hundreds, or even thousands of issues outstanding. Each of these instruments might have different features and may have differing levels of liquidity. Consequently, even with the accessibility of trade data for certain corporate bonds through the FINRA TRACE system, trade frequency is inconstant and analysis is required to ascertain bond valuation at any moment in time.

To date, this analysis has generally been a labor-intensive process, such that valuations are generally produced with limited frequency, such as once or twice per day. However, new data made available through TRACE in November 2008, as well as the increased trading of fixed income exchange traded funds ("ETFs") have made possible an algorithmic valuation process for corporate bonds. Contained within TRACE data is an indicator that identifies whether the reporting entity (the dealer) bought the bond from a client (a "dealer buy"), sold the bond to a client (a "dealer sell") or traded the bond with another dealer (an "interdealer transaction"). Dealer buys thus imply the "bid" side of the market, dealer sells imply the offer side, and the interdealer transactions imply the "mid" market. The research leading to certain embodiments has shown that the distance between a bid and ask differs according to the size of the transaction and to the bond itself.

Using this indicator (distance between bid and ask), along with the size of the transaction, certain exemplary embodiments may use a regression analysis to calculate coefficients describing the transaction costs for individual bonds and categories of bonds. Certain embodiments may then use these coefficients to generate transaction cost adjusted prices for each trade to infer the mid-market. Furthermore, these embodiments may weight these transaction cost adjusted prices to create a current estimate of bond value.

Additionally, certain embodiments may use regression analysis to calculate coefficients that describe the relationship between a bond and selected ETFs. In the absence of new trades, the embodiments may update the valuation estimate by applying the coefficient adjusted ETF changes. As a result, the embodiments may produce bond evaluations in real-time and without human analysis.

More specifically, an exemplary aspect may comprise a computer system having one or more processors, comprising: a receiving component that receives valuation data for a security; a filtering component that filters the received valuation data to remove outlier values according to a predetermined set of parameters; a transaction cost adjustment component calculates a transaction cost adjustment coefficient based on a first transaction cost adjustment regression calculation of the processed valuation data, and determines a final transaction cost adjustment value based on the transaction cost adjustment coefficient; a market adjustment component that calculates a market adjustment coefficient based on a first market adjustment regression calculation of the processed valuation data, and determines a final market adjustment value based on the market adjustment coefficient; and an output component that outputs a pricing estimation of the security based on the final transaction cost adjustment value and the final market adjustment value.

In one or more exemplary system embodiments: (1) the pricing estimation is determined by rescaling prices to terms of the final transaction cost adjustment value and the final market adjustment value; (2) a confidence interval component calculates a confidence interval for the outputted pricing estimation; (3) the confidence interval is calculated with approximately the same frequency as the outputted pricing estimation; (4) the received valuation data comprises ETF transaction price data; (5) the received valuation data comprises bond attribute data; (6) the received valuation data comprises credit rating data; (7) the received valuation data comprises TRACE data; and/or (8) the pricing estimation is updated by applying one or more coefficient adjusted ETF data updates.

BRIEF DESCRIPTION OF THE DRAWINGS

FIG. 8 depicts an exemplary Investment Grade Worksheet Enhancements screen and a High Yield Worksheet Enhancements screen.

FIG. 9 depicts an exemplary Agency Worksheet screen.

FIG. 10 depicts exemplary Investment Grade and High Yield screens.

FIG. 11 depicts an exemplary trade data enhancement screen.

FIG. 12 depicts an exemplary model pricing configuration screen for data preparation.

FIG. 13 depicts an exemplary model pricing configuration screen for transaction cost adjustment.

FIGS. 14 and 15 depict exemplary model pricing configuration screens for market adjustment.

FIG. 19 depicts an exemplary pricing mode displayed on a Model Details screen.

FIG. 20 depicts an exemplary Quotes Market Data screen for each system, i.e., IG, HY and AGY for display of model price and model evaluations.

FIG. 21 depicts an exemplary investment grade data ranking profile screen.

FIG. 22 depicts an exemplary Quote History screen for each system, i.e., IG, HY and AGY, displaying model price and model evaluations.

FIG. 23 depicts an exemplary event log.

FIG. 25 depicts an exemplary model pricing configuration screen for a confidence group.

FIG. 27 depicts an exemplary model pricing configuration screen for a confidence interval.

FIG. 30 depicts an exemplary screen of upload blended price betas.

FIG. 31 depicts an exemplary new tab added on the screen of Security Details as "Blended Px Betas" and display CUSIP with 18 betas.

DETAILED DESCRIPTION OF CERTAIN EXEMPLARY EMBODIMENTS

Exemplary embodiments described herein provide real-time model pricing of securities, e.g., corporate bonds, using past trade information, provide an automated confidence measure that allows the system or user to judge the reliability of model prices, and provide the functionality and controls necessary to use the model price in market data ranking as one of the data sources among quotes, trades and evaluations.

According to a first embodiment, i.e., Phase One, specifications for real-time model pricing of corporate bonds are provided. The first embodiment provides a model and the workflows for estimating the current value of a corporate bond using trade history, as well as movements in the general credit market as proxied by liquidly traded exchange traded funds. The mathematical framework underlying the model is described herein.

According to a second embodiment, i.e., Phase Two, business requirements for an automated gauge of model price reliability are provided, along with controls over using the model price alongside of related market input information.

1. Phase One Overview

Exemplary embodiments described herein support real-time model pricing of corporate bonds using past trade information. A model and workflows for estimating current value of a corporate bond using trade history, as well as movements in the general credit market as proxied by liquidly traded exchange traded funds, are provided. Also provided are mathematical settings for regressions in Appendix D. Exemplary regressions described herein fit into the framework described in Appendix D and one may identify components of the framework for each specific regression. "Right-hand-side" refers to quantities including observations of dependent variables. "Basis functions" refer to quantities including observations of independent variables. Except as otherwise stated, section numbers and appendices referred to within Phase One refer to Phase One section numbers and appendices.

1.1 Basic Workflows

Figure 1A:
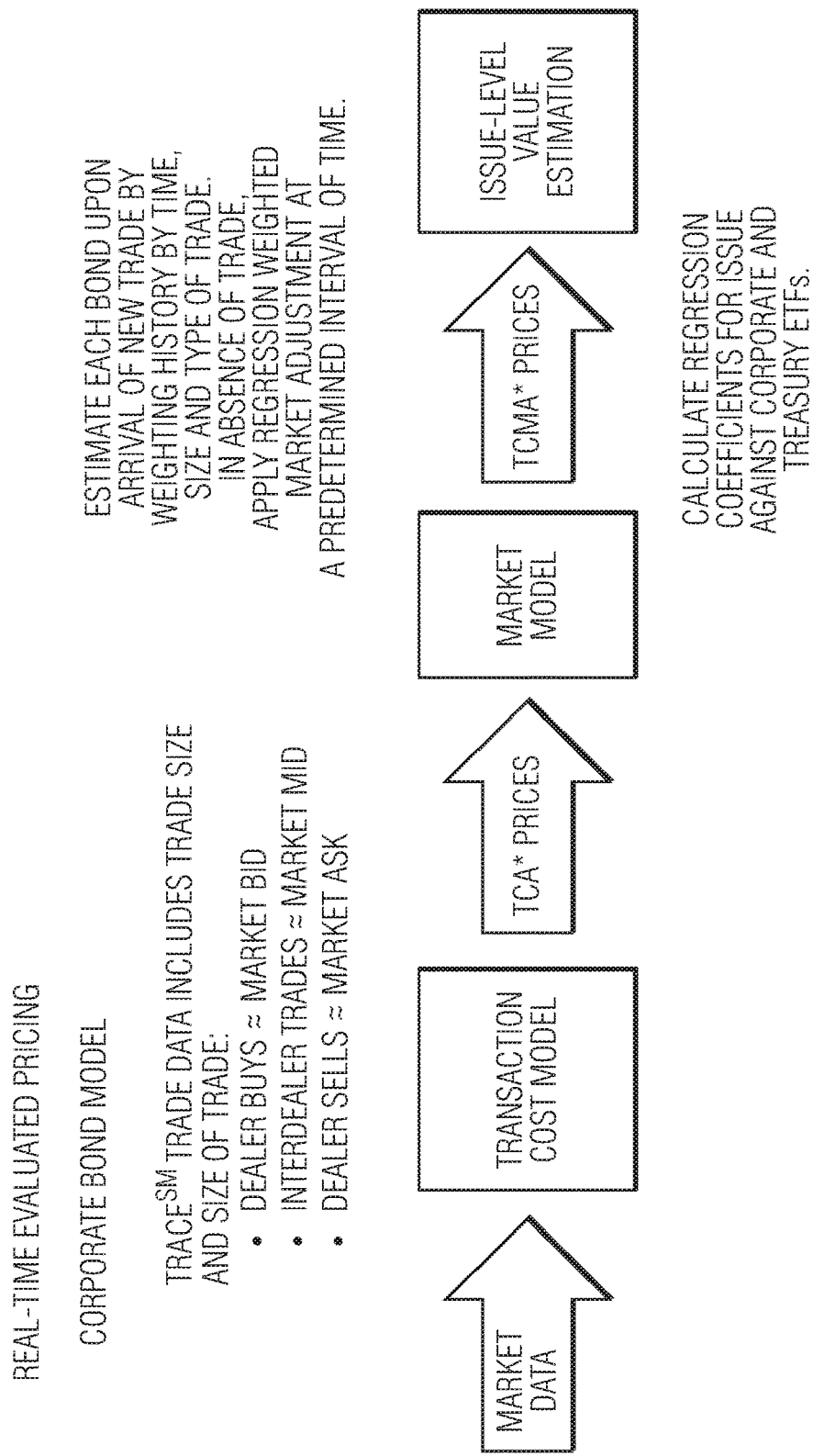
FIG. 1A depicts an exemplary flowchart of real-time evaluated pricing for a corporate bond model.
Figure 1B:
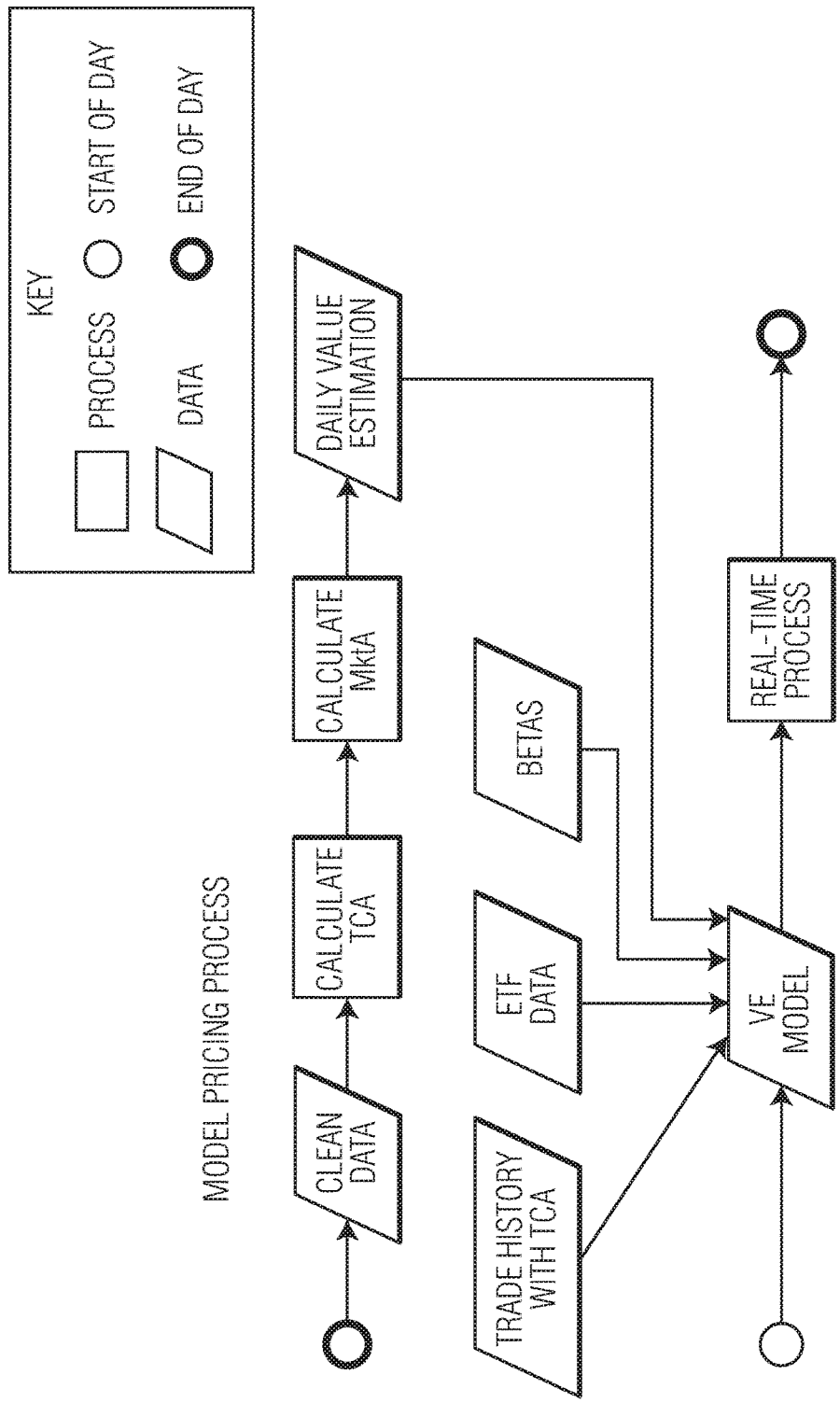
FIG. 1B depicts an exemplary model pricing process.

FIG. 1A depicts an exemplary flowchart of real-time evaluated pricing for a corporate bond model. FIG. 1B depicts an exemplary model pricing process. Model Pricing includes two basic processes:

A daily (overnight) process that uses trade history and ETF data to create a value estimate for each security in the model.

A real-time (intraday) process that updates the last value estimation as new trades and ETF prices arrive in the system.

Daily (Overnight) Processes: The pricing model has three components: transaction cost adjustment (TCA), market adjustment (MktA), and value estimation (VE). The three components of the model can be calculated in separate steps:

At the end of each day, the system takes trade prices and adjusts them for transaction costs using information on their size and direction (e.g. dealer buys, interdealer, or dealer sells).

Then the system takes transaction cost-adjusted prices and adjusts them for market movements since the time of the trade.

After iterating the above two processes, the system then takes a history of transaction-cost and market-adjusted prices and constructs a value estimate.

Real-Time (Intraday) Process: For each day, at some specified time interval, updated market-wide indicators can be used to market-update all value estimates. In addition, when new trades occur in an issue at the start of day, these trades can be used in the value estimation model to update value estimates, allowing the real time model to be run in response to the periodic updating of ETF data and as trades occur.

1.2 Securities in Scope

An exemplary model may include trade information of U.S. corporate bonds from TRACE data. For a security to be eligible to be included in the model, the security may:

Be USD denominated

Be TRACE eligible

Have at least 'n' trades in a 3-year trade history, where 'n' is configurable (initially set to 6). n=6 is a reasonable starting point since it is the minimum requirement to calculate adjusted price in Section 3.6., while the professor currently requires 1000 trades.

Figure 2:
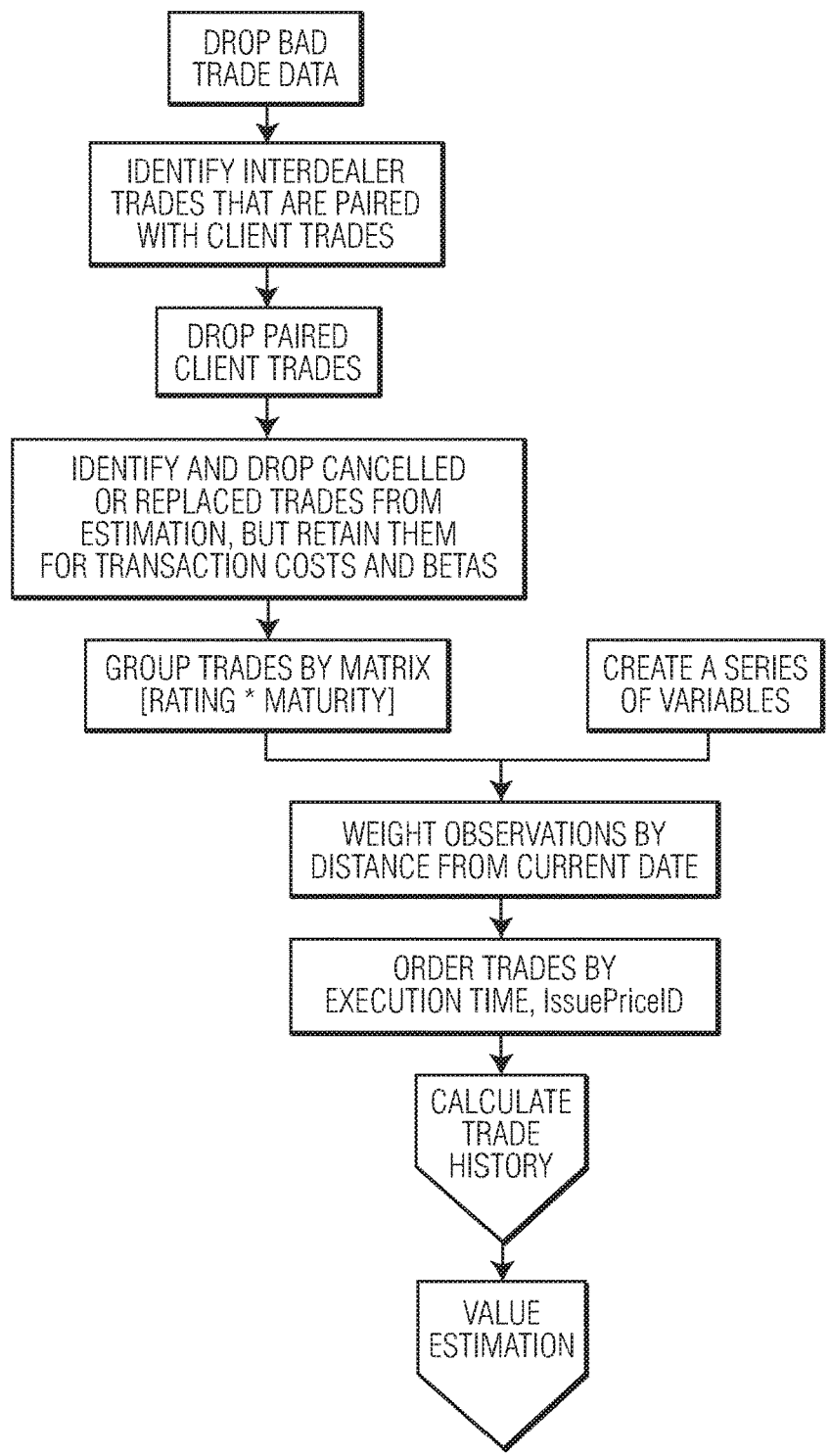
FIG. 2 depicts an exemplary flow chart showing the work flow for an exemplary data preparation step.

Not be a convertible bond, preferred stock, convertible preferred, or index linked note 2. Data Preparation As described in this section, a data set is input into the system and filtered according to certain conditions, and a series of variables are created for use in further calculations. FIG. 2 depicts a flow chart showing the work flow for an exemplary data preparation step.

2.1 Data Inputs

ETF data. This data set contains the log of the most recent transaction price, and bid and ask as of a series of time stamped records. The tickers that are used in this model are LQD, HYG, IEI, and TLT. For Agencies, use ETF tickers AGZ instead of LQD, IEI-AGZ instead of HYG-LQD, and remain TLT-IEI the same.

Noted: (1) For the time range of ETFs, the system may go back to whatever the last time range, regardless of how far it is. Thus, if there was a trade at 3 am, the system may use the most recent ETF closing price. If bond market was open but stock market was closed, the system use the most recent close price, which may be 1 day or 1.5 days ago.

(2) For Fair Value, the system may avoid opening price. The system may use 9:30 snap (which may be the open or may be a few second later) and this is a better predictor of future prices than the local close. It may be that for bond trades occurring right around 9:30, it is better to append the 9:35 ETF prices.

(3) The system may exclude the ETF suspect prices and instead use the ETF price 5 minutes before (or the most recent one).

Bond attribute data. This data set contains the following variables that describe the bond features: Entity ID, CUSIP, maturity date, an issuer identifier, sector and pricing system (IG, HY or Agencies).

Credit rating data. This data set contains S&P credit ratings for each issue at the time of data collection. For issues without S&P ratings, ratings are inferred from Moody's or Fitch ratings, or, if unrated, from the issue's yields. The system may include a mapping table of ratings between IDC rating bucket and the three agencies, see Appendix A for the mapping table and more details. For Agencies, there may be no credit difference for the credit line bucket and variable R may be removed from the model.

TRACE data. The system uses trades from TRACE data, see Appendix B for more details about how the system obtains TRACE data by merging two files (not required for Omega).

2.2 Holiday Calendar

Follow the same holiday schedule as IG/HY systems, i.e., a modified SIFMA calendar to include NYSE open days.

There are two scenarios on holiday:

If ETF data comes in but no trade data since stock market is open while bond market is closed, then the system calculates new model price;

If both stock and bond markets are closed, then no new model price is calculated.

2.3 Data Cleaning 2.3.1 Drop Outliers and Problematic Trade Observations

The system drops outliers and other likely problematic trade observations under the following circumstances, if:
lotsize<$1000
price<=0, price>160
price is missing
side is missing
is suspect="Y"
special price="Y"

2.3.2 Drop Interdealer Paired Client Trades

An interdealer trade is identified as paired if it shares the same CUSIP, exact execution time, and lot size with a client trade (dealer buy or sell). Then client trades that are paired with interdealer trades are dropped, but the interdealer trade is retained.

2.3.3 Drop Cancelled or Replaced Trades from Estimation

Trades that are known to have been eventually cancelled or replaced are not used in any estimation, but these trades are retained in order to have transaction costs and betas appended to them. In other words, we drop cancelled and replaced trades in intraday processing, but keep them in tradeset prepared for overnight regression.

2.3.4 Drop Matured Bonds

Some matured bonds continue to be evaluated past their maturity date, either at par or at a fixed price, within continuous pricing. There is functionality built into the continuous pricing systems (EVAL, Omega) to manage this process. However, this functionality may not be replicated in the model, as the final output to the client is not the pure model prices. It is a combination of model prices, blended prices and continuous prices (see description of Model Pricing Phase Two section on functionality). If a bond does not have a model price, the system may send the continuous price. Therefore for matured bonds, if the system removes them from the model automatically at maturity, the existing continuous price functionality may take over and send the appropriate price (or absence).

Though the system may not produce a model price for matured (or called or defaulted) bonds, the system may include historical trades on these bonds in the input trade data to the overnight regressions. This is because the bonds were legitimately non-matured when the trades occurred, and therefore still form part of the history that the regressions may be using.

Intraday Model prices may be calculated for the universe of bonds which:
(a) Have TRACE trades, and
(b) Are not matured—OR—are matured but are in default Overnight regression shall include matured securities which have TRACE trades within the TRADE-WINDOW (where the window is currently 4 years).

2.4 Trade Data Processing 2.4.1 Construct 30 Maturity * Credit Cells

Trades are divided into groups based on credit ratings and time to maturity. As high yield bonds with more than 10 years to maturity are rare, they are included in the 7.5-10 group. Thus, there are six credit rating groups (AA and above, A, BBB, B, and CCC or below) and five time-to-maturity groups (0-2 years, 2-5 years, 5-7.5 years, 7.5-10 years including 10-20 years and 20+ years).

The maturity * credit cells have the following format as the tables show. Table 1 is for Investment Grade bonds. Table 2 is for High Yield bonds.

TABLE 1

Investment Grade Maturity * Credit Grids

| | Maturity | | | | | |
|---|---|---|---|---|---|---|
| Credit Ratings | 0-2 YTM | 2-5 YTM | 5-7.5 YTM | 7.5-10 YTM | 10-20 YTM | 20+ YTM |
| AAA | | | | | | |
| AA | | | | | | |
| A | | | | | | |
| BBB | | | | | | |

TABLE 2

High Yield Maturity * Credit Grids

| | Maturity | | | |
|---|---|---|---|---|
| Credit Ratings | 0-2 YTM | 2-5 YTM | 5-7.5 YTM | 7.5+ YTM |
| BB | | | | |
| B | | | | |
| CCC or worse | | | | |

2.4.2 Note: The system uses the credit ratings to identify Investment Grade bonds and High Yield bonds, as shown in Table 1, HY bonds are the ones with ratings BB or below. So for HY indicator shown in the regression in later sections, HY indicator may be 1 if the bond has ratings BB or below, otherwise it is 0.

2.4.3 For agency bonds, only 6 cells for the different maturities are necessary and terms of credit ratings are dropped, as shown in Table 3.

TABLE 3

Agencies Maturity * Credit Grids

Maturity

| 0-2 Y | 2-5 | 5-7.5 | 7.5-10 | 10-20 | 20+ |
|---|---|---|---|---|---|
| TM | YTM | YTM | YTM | YTM | YTM |

2.4.4 Note: To identify Agency and Corporate bonds, the bond's feed. If the trade comes from BTDS feed, it may be corporate; and if the trade is from ATDS feed, it may be agency.

2.4.5 Order Trades on Execution Time

Trades are ordered within each issue based on execution time. For cases with multiple trades executed in a given second, trades are ordered by IssuePriceID. The trade ordering is used for calculating the average of last 5 trades in Section 3.6.2.

2.4.6 Weight Observations on Time

Observations are weighted based on distance in time from the current date. The weight assigned to each is proportional according to the following equation:

$$weight = e^{\frac{today - date\_of\_trade}{100}}. \quad (2.1)$$

These weights are then divided by the sum of the expression in the following equation for the current and prior trade:

$$Adjusted\ Weights = \frac{Weight}{0.8 + 0.3 * S_z * \left(1 - \frac{ABS(S_d + P)}{2}\right) + 0.25 * ABS(S_d) - 0.15 * (S_d + P)}$$

For trade with a size greater than $250,000, weights adjustment is multiplied by 5 for Dealer Buys.

2.4.7 Save Trades Records

To construct a baseline price in Section 3.6.2., transaction cost and market adjusted prices of trades from the last 5 CUSIP*seconds may be saved, i.e., trade t-1 to t-5. In order to half the memory and reduce the sample, the most recent X trades per CUSIP may be kept, since for thin bonds a longer past history is necessary. Performance improves with X until X hits about 5000. All trades may be saved from last year and the last 5000 trades older than 1 year. This reduces the sample by about 40%. Also, when calculating out of sample TCs and MAs for the issue-level scaling, if it's month t, keep all trades from t-1 to t-12, and then the 5000 most recent from t-13 to the beginning of the sample data.

2.4.8 Error Handling

The following describes how the system handles situations when certain parameters are missing. There are two possible exemplary scenarios of missing parameters:

If a market level parameter(s) is (are) missing, the system may use the entire sets of coefficients from yesterday, and do the calculation with intraday trade information at real-time.

If a bond level parameter(s) is (are) missing, the system may stop generating model pricing for that specific bond, and select continuous pricing mode instead.

If some trade data or parameter(s) is (are) missing, the system may drop that trade for overnight regression, and count it as incomplete trade in the notifications.

2.5 Input Variables Creation

A series of primitive input variables are defined with initialized value as shown in Table 4 (some contents are for agencies):

TABLE 4

Primitive Input Variables (from raw data)

| Objective | Variable Name (in model) | Input (in Stata code) | Description/Function | Data Identity |
|---|---|---|---|---|
| Price | p | p | Price in points (Par = 100) | Trade |
| Side Indicator | $S_d$ | tt | $tt = \begin{cases} 1, & \text{if Dealer Sell} \\ 0, & \text{if Interdealer} \\ -1, & \text{if Dealer Buy} \end{cases}$<br>one of the variables in Regression 1 | Trade |
| Pair status indicator | P | dtt | $dtt = \begin{cases} 1, & \text{if interdealer trade that is paired with dealer sell} \\ 0, & \text{if unpaired interdealer trades} \\ -1, & \text{if interdealer trade that is paired with dealer buy} \end{cases}$<br>one of the variables in Regression 1 | Trade |
| Lotsize | lotsize | lotsize | Lotsize in $ | Trade |
| Rescaled trade size | $S_z$ | fq | $fq = Max\left(0, Min\left(1, \frac{Ln\left(\frac{1000000}{lotSize}\right)}{Ln(20)}\right)\right),$<br>one of the variables in Regression 1 | Trade |

TABLE 4-continued

Primitive Input Variables (from raw data)

| Objective | Variable Name (in model) | Input (in Stata code) | Description/Function | Data Identity |
|---|---|---|---|---|
| Side indicator * Rescaled trade size | $S_d * S_z$ | ttfq | TT * FQ, one of the variables in Regression 1 | Trade |
| Paired indicator * Rescaled trade size | $P * S_z$ | dttfq | DTT * FQ, one of the variables in Regression 1 | Trade |
| Executed Time | | dt | Execution Date-Time variable | Trade |
| Reported Time | | dt_report | The reported time of a trade; this is used to store date calculation results | Trade |
| Truncated TRACE Quantity Indicator | | MAquantityindicator | This indicates if the reported TRACE quantity is truncated; and "E" for estimated if truncated and "A" for actual if not. | Trade |
| Primary instrument ID | | piid | Categorical variable; aggregated a few cases of CUSIP or InstrumentID changes into a common identifier | Bond |
| Drop indicator | | a | a = 1 if ultimately cancelled (Created by Eric; used for tracking cancelled trades) | Trade |
| Group ID | | piida | Grouping of combinations of PIID and A (in TC model, all A = 1 observations are dropped, so this maps one-to-one to PIID) | Bond |
| Trade identifier | | n | Trade identifier (Created by Eric; used for disassembling and reassembling datasets) Note: Tradeset is ordered in increasing piid and n. may not be required, but may be included for Regression 7. | Trade |
| Numbers trades in PIIDA | | n1 | Numbers trades within values of PIIDA, in order of execution time (with ties broken by values of n) (used for counting the numbers trades with values of piida) | Trade |
| Numerical S&P rating | | SPrat | Numerical version of S&P rating (AAA = 20, AA+ = 19, BB+ = 10, CCC+ = 4, CCC = 3, CC = 0, D = −12) | Bond |
| Integer S&P rating | | intSP | Rating used to put bonds into the 30 cells, intSP = int((SPrat + 1)/3) Special Cases: (1) SPrat = 0 (corresponds to CC) and below may have intSP = 1 (the same as SPrat = 2-4); (2) SPrat = 20 (the AAAs) gets intSP = 6 (the same as AA− to AA+) Please see Appendix A for conversion between SPrat and intSP. | Bond |
| Rating | R | rat | Rating = 0 for bonds rated AA+ or above, 1 for bonds rated CC or below, and is linear in credit rating between as (S&P numerical − 3)/16, i.e., rat = 1−max(0, min(1, (SPrat − 3)/16)). R may be set to 0 in calculation of Agencies. | Bond |
| Year to Maturity | | ytm | Years to Maturity from execution date, the formula is (maturity_date-execution_date)/365.25 | Trade |
| Issue-Level Year to Maturity | | iytm | Year to maturity that is used to calculate maturity * credit cells, i.e., the issue-level ytm | Bond |
| Maturity (15 years) | $YTM_{15}$ | mat15 | mat15 = min(max(0, ytm), 15)/10, which is mat15 = 1 for bonds 15 years or more from maturity, 0 for bonds at maturity, and is linear in time to maturity in between | Trade |
| Maturity (10 years) | $YTM_{10}$ | mat10 | mat10 = min(max(0, ytm), 10)/10, which is mat10 = 1 for bonds 10 years or more from maturity, 0 for bonds at maturity, and is linear in time to maturity in between | Trade |

TABLE 4-continued

Primitive Input Variables (from raw data)

| Objective | Variable Name (in model) | Input (in Stata code) | Description/Function | Data Identity |
|---|---|---|---|---|
| Year and month | | yrmo | Year month variable (January 2009 = 200901) | Trade |
| Month Group | | yq | Groups months in the data (November 2008 = 107, June 2012 = 150) The minimum value for yq is configurable. | Trade |
| Number of months | | m | 1 to N numbering of months appearing in data, may be started from 1 and increasing by 1, no hole | Trade |
| Recent log HYG total return | lnHYG | lnHYG | Most recent ln(HYG total return index) as of execution time | Trade |
| Recent log IEI total return | lnIEI | lnIEI | Most recent ln(IEI total return index) as of execution time | Trade |
| Recent log LQD total return | lnLQD | lnLQD | Most recent ln(LQD total return index) as of execution time | Trade |
| Recent log TLT total return | lnTLT | lnTLT | Most recent ln(TLT total return index) as of execution time | Trade |
| Recent log AGZ total return | lnAGZ | | Most recent ln(AGZ total return index) as of execution time | Trade |
| Side = +1 indicator | $I_1^S(S_d)$ | ttpos | $ttpos = \begin{cases} 1, & \text{if } S_d = 1 \\ 0, & \text{otherwise} \end{cases}$, one of the variables in Regression 1 | Trade |
| Paired = +1 indicator | $I_1^P(P)$ | dttpos | $dttpos = \begin{cases} 1, & \text{if } P = 1 \\ 0, & \text{otherwise} \end{cases}$, one of the variables in Regression 1 | Trade |
| Side = +1 Indicator * Size | $S_z \times I_1^S$ | ttposfq | ttpos * fq, one of the variables in Regression 1 | Trade |
| Paired Indicator * Size | $S_z \times I_1^P$ | dttposfq | dttpos * fq, one of the variables in Regression 1 | Trade |
| Maturity * Rating | $R \times YTM_{15}$ | mat15rat | mat15 * rat | Trade |
| Side * Rating | $S_d \times R$ | ttrat | tt * rat, one of the variables in Regression 1 | Trade |
| Side * Maturity | $S_d \times YTM_{15}$ | ttmat15 | tt * mat15, one of the variables in Regression 1 | Trade |
| Side = +1 Indicator * Rating | $I_1^S \times R$ | ttposrat | ttpos * rat, one of the variables in Regression 1 | Trade |
| Side = +1 Indicator * Maturity | $I_1^S \times YTM_{15}$ | ttposmat15 | ttpos * mat15, one of the variables in Regression 1 | Trade |
| Side * Size * Rating | $S_d \times S_z \times R$ | ttfqrat | ttfq * rat, one of the variables in Regression 1 | Trade |
| Side * Size * Maturity | $S_d \times S_z \times YTM_{15}$ | ttfqmat15 | ttfq * mat15, one of the variables in Regression 1 | Trade |
| Side * Size * Maturity * Rating | $S_d \times S_z \times R \times YTM_{15}$ | ttfqmat15rat | ttfq * mat15 * rat, one of the variables in Regression 1 | Trade |
| Paired indicator * Size * Rating | $P \times S_z \times R$ | dttfqrat | dttfq * rat, one of the variables in Regression 1 | Trade |

TABLE 4-continued

Primitive Input Variables (from raw data)

| Objective | Variable Name (in model) | Input (in Stata code) | Description/Function | Data Identity |
|---|---|---|---|---|
| Paired indicator * Size * Maturity | $P \times S_z \times YTM_{15}$ | dttfqmat15 | dttfq * mat15, one of the variables in Regression 1 | Trade |
| Paired indicator * Size * Maturity * Rating | $P \times S_z \times R \times YTM_{15}$ | dttfqmat15rat | dttfq * mat15 * rat, one of the variables in Regression 1 | Trade |
| Side = +1 Indicator * Size * Rating | $I_1^S \times S_z \times R$ | ttposfqrat | ttpos * fq * rat, one of the variables in Regression 1 | Trade |
| Side = +1 Indicator * Size * Maturity | $I_1^S \times S_z \times YTM_{15}$ | ttposfqmat15 | ttpos * fq * mat15, one of the variables in Regression 1 | Trade |
| Side = +1 Indicator * Size * Maturity * Rating | $g_{21} \times R$ | ttposfqmat15rat | ttpos * fq * mat15 * rat, one of the variables in Regression 1 | Trade |
| Paired = +1 Indicator * Size * Rating | $I_1^P \times S_z \times R$ | dttposfqrat | dttpos * fq * rat, one of the variables in Regression 1 | Trade |
| Paired = +1 Indicator * Size * Maturity | $I_1^P \times S_z \times YTM_{15}$ | dttposfqmat15 | dttpos * fq * mat15, one of the variables in Regression 1 | Trade |

In order to calculate differences in regression equations, additional series of variables are created as the shown in Table 5.

TABLE 5

Additional Variables (for regression use)

| Inputs | Variable Name (in model) | Input (in Stata code) | Description/Function | Data Identity |
|---|---|---|---|---|
| Adjusted Weights | w | w | weight = $e^{-\frac{today-date\_of\_trade}{100}}$ <br><br> Adjusted Weights = $\frac{(Weight)}{0.8 + 0.3 * S_Z * \left(1 - \frac{ABS(S_d + P)}{2}\right) + 0.25 * ABS(S_d) - 0.15 * (S_d + P)}$ <br><br> Note: The weights are defined here, but in an exemplary embodiment may be used and created in the first difference calculation in the regression | Trade |

2.5.1 Input Data Requirements

Provided below are descriptions of some input data requirements in Table 4:

piid and n: Tradeset is ordered in increasing piid and n. This may not be required by the method, but may be utilized in Regression 7.

m may start from 1 and increasing by 1 consecutively unless some months are missing. It's not necessary to start from November 2008, i.e., November 2008=1, however, m may be set starting from 1 and increasing by 1 as months moving forward. There can be a hole if a month is missing. A safe guard may be added by java code to detect missing months.

The calculation formula of yq is yq=(Y−2000)×12+M, where Y is the year of "dt" and M is the month of "dt". The minimum value of "yq" is configurable, i.e., it's not necessary to be a fixed number. yq is not related to m. Also, a safe guard may be added on holes (if any) in yq that can accommodate missing months.

The creation and use of n1 can be described by three STATA commands:
  Sort piida dt n
  qby piida: replace (gen) n1=_n
  tsset piida na The system recreates n1 for Regression 7, i.e., value estimation, because: 1) some values in old "n1" may be eliminated by requiring "dt" being after May 2009; 2) some records with different old "n1" values may be merged by "collapse (sum). . . " But the system may also create n1 using the same algorithm used in the model (from Regression 1 to Regression 7), and this algorithm is consistent with the STATA code. Note: n1 is consistent from the step2 file through the rest of the transaction cost model. Between the step1 and step2 files, some observations may be dropped and n1 renumbered to keep consecutive (this is data prep stage). The regressions begin after step2 is saved and then reloaded the STATA code, and n1 is consistent until trades are collapsed to the CUSIP*second level in value estimation. Within each value of piida, n1 is the observation number when they are ordered by execution time and then n, which is an observation used to disassemble and reassemble the data. Ordering it by n with execution time ensures that ties are always broken the same way.

3. Model

This section describes how calculate the three components of the model are calculated in detail.

3.1 Transaction Cost Adjustment

Figure 3:
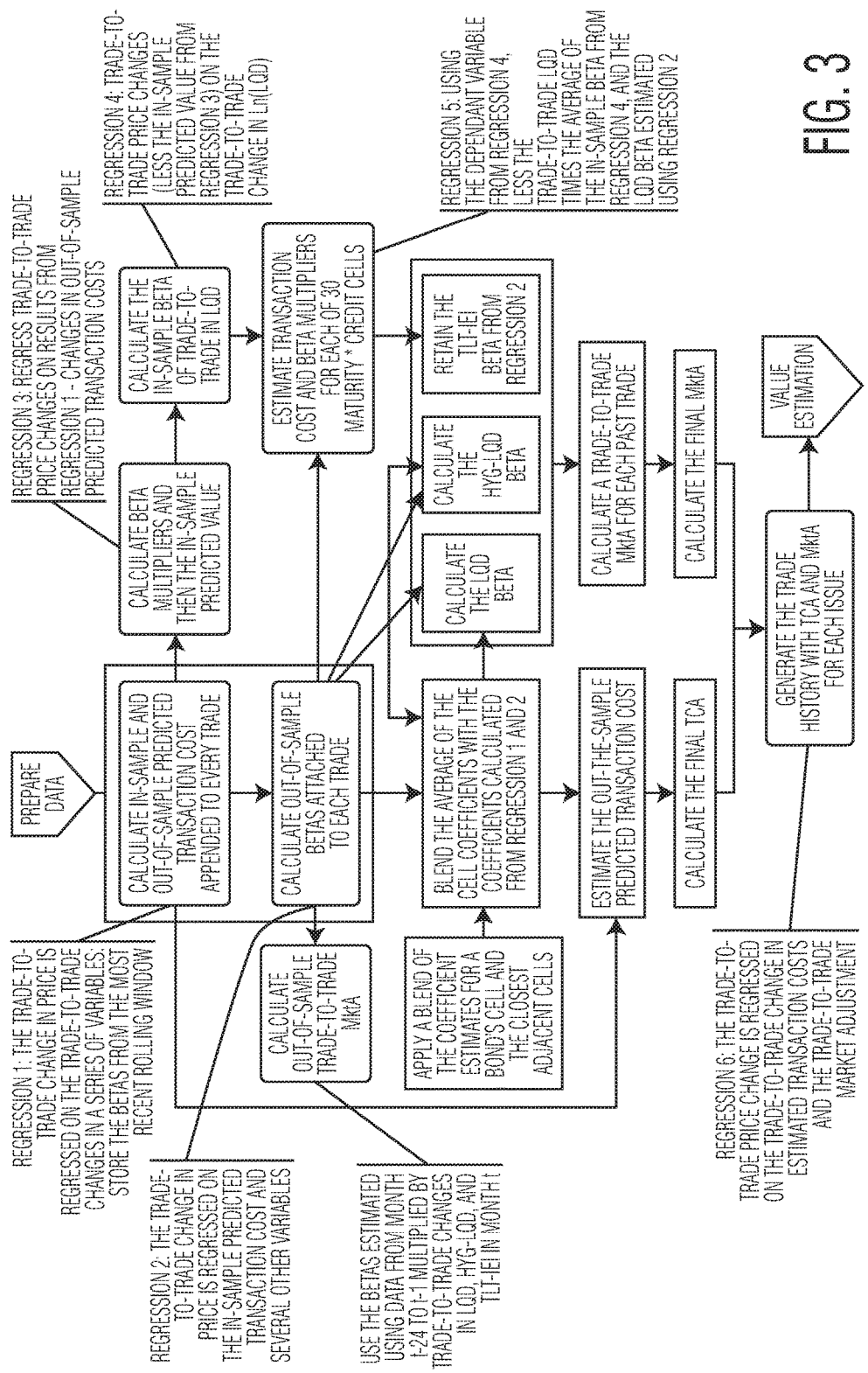
FIG. 3 depicts a flow chart showing the work flow of an exemplary trade history calculation.

FIG. 3 depicts a flow chart showing the work flow of an exemplary trade history calculation, which can be separated into two parts: transaction cost adjustment and market adjustment.

3.1.1 Regression 1: Calculate In-sample and Out-of-sample Transaction Costs

The trade-to-trade change in price Δp is regressed on the trade-to-trade changes in a series of variables designed to capture transaction costs. A single regression is run including all bonds and all trades from the prior 24 months. Observations are weighted as described in 2.4.3.

3.1.1.1. Basis functions: Variables Designed to Capture Transaction Costs in Regression 1

Excluding constant term, the number of basis functions is 24 (M=24, see Appendix E). The system identifies basis functions for Regression 1 as follows, omitting time dependency for state variables for saving typing:

$g_1(t_i, \ldots) = S_d$
$g_2(t_i, \ldots) = P$
$g_3(t_i, \ldots) = S_d \times S_z$
$g_4(t_i, \ldots) = P \times S_z$
$g_5(t_i, \ldots) = S_z$
$g_6(t_i, \ldots) = I_1^S$
$g_7(t_i, \ldots) = I_1^P$
$g_8(t_i, \ldots) = S_z \times I_1^S = g_5 \times g_6$
$g_9(t_i, \ldots) = S_z \times I_1^P = g_5 \times g_7$
$g_{10}(t_i, \ldots) = S_d \times R = g_1 \times R$
$g_{11}(t_i, \ldots) = S_d \times YTM_{15} = g_1 \times YTM_{15}$
$g_{12}(t_i, \ldots) = I_1^S \times R = g_6 \times R$
$g_{13}(t_i, \ldots) = I_1^S \times YTM_{15} = g_6 \times YTM_{15}$
$g_{14}(t_i, \ldots) = S_d \times S_z \times R = g_1 \times g_5 \times R$
$g_{15}(t_i, \ldots) = S_d \times S_z \times YTM_{15} = g_1 \times g_5 \times YTM_{15}$
$g_{16}(t_i, \ldots) = S_d \times S_z \times R \times YTM_{15} = g_{15} \times R$
$g_{17}(t_i, \ldots) = P \times S_z \times R = g_4 \times R$
$g_{18}(t_i, \ldots) = P \times S_z \times YTM_{15} = g_4 \times YTM_{15}$
$g_{19}(t_i, \ldots) = P \times S_z \times R \times YTM_{15} = g_{18} \times R$
$g_{20}(t_i, \ldots) = I_1^S \times S_z \times R = g_{12} \times S_z$
$g_{21}(t_i, \ldots) = I_1^S \times S_z \times YTM_{15} = g_8 \times YTM_{15}$
$g_{22}(t_i, \ldots) = g_{21} \times R$
$g_{23}(t_i, \ldots) = I_1^P \times S_z \times R = g_5 \times g_7 \times R$
$g_{24}(t_i, \ldots) = I_1^P \times S_z \times YTM_{15} = g_5 \times g_7 \times YTM_{15}$
$f_j(t_i, \ldots) = g_j(t_i, \ldots) - g_j(t_{i-1}, \ldots), j = 1, \ldots, 24$ 3.1.1.2. The Right-hand-side of the Regression The right-hand-side for this regression includes the 1st differences of prices. This regression is run on rolling 24-month windows of data. Coefficients from the regression run using data from t−24 months to t are applied to the variables in 3.1.1.1. from trades from month t, to yield an in-sample predicted transaction cost for each trade, see formula (3.1) below. They are also applied to the variables from trades from month t+1 to yield and out-of-sample predicted transaction cost, see formula (3.2) below.

3.1.1.3. Outputs: Transaction Costs Calculation

The output from this step is an in-sample and out-of-sample predicted transaction cost that may be appended to every past trade in the dataset. In addition, the betas from the most recent rolling window may be retained so they can be applied to newly arrived trades in real-time. The formula for in-sample transaction cost calculation is as follows:

$$C_{I\_Original}(t) = \sum_{j=1}^{24} \beta_j(t) \times g_j(S_d(s), P(s), S_z(s), R(s), YTM_{15}(s))_{s \leq t} \quad (3.1)$$

The formula for out-of-sample transaction cost calculation is as follows:

$$C_{O\_original}(t) = \sum_{j=1}^{24} \beta_j(t) \times g_j(S_d(s), P(s), S_z(s), R(s), YTM_{15}(s))_{s > t} \quad (3.2)$$

Both in-sample and out-of-sample predicted transaction costs are truncated to have a minimum of 5 basis points, and a maximum of 2.5 times a regression coefficient obtained from a simple version of the regression above, estimated in the same window as the following formula:

$C_o = \text{Sign}(S_d + P) * \max(0.05, \min(2.5 * \text{coef}, \text{Sign}(S_d + P) * C_{O\_original}))$, if $\text{ABS}(S_d + P) = 1$ (3.3)

$C_I = \text{Sign}(S_d + P) * \max(0.05, \min(2.5 * \text{coef}, \text{Sign}(S_d + P) * C_{I\_original}))$ if $\text{ABS}(S_d + P) = 1$ (3.4)

This last coefficient (coef) is obtained by regressing price changes on the first nine basis functions. The variables with 'pos' in the names may all be zero for dealer buys, resulting in five actual basis functions. And the system may take the coefficient on Side * Size, which is $\beta_3$ in the equation above, thus coef=$\beta_3$.

3.1.2 Regression 1 for Agency Bonds 3.1.2.1. Basis functions for Agency Bonds

For agencies, the model in 3.1.1.1. may lose some terms that involved credit and becomes a 16 parameter model with basis functions identified (M=15, see Appendix D) as the following:

$g_1(t_i, \ldots) = S_d$
$g_2(t_i, \ldots) = P$
$g_3(t_i, \ldots) = S_d \times S_z$
$g_4(t_i, \ldots) = P \times S_z$
$g_5(t_i, \ldots) = S_z$
$g_6(t_i, \ldots) = I_1^S$
$g_7(t_i, \ldots) = I_1^P$
$g_8(t_i, \ldots) = S_z \times I_1^S = g_5 \times g_6$
$g_9(t_i, \ldots) = S_z \times I_1^P = g_5 \times g_7$
$g_{10}(t_i, \ldots) = S_d \times YTM_{15} = g_1 \times YTM_{15}$
$g_{11}(t_i, \ldots) = I_1^S \times YTM_{15} = g_6 \times YTM_{15}$
$g_{12}(t_i, \ldots) = S_d \times S_z \times YTM_{15} = g_1 \times g_5 \times YTM_{15}$
$g_{13}(t_i, \ldots) = P \times S_z \times YTM_{15} = g_4 \times YTM_{15}$
$g_{14}(t_i, \ldots) = I_1^S \times S_z \times YTM_{15} = g_8 \times YTM_{15}$ $g_{15}(t_i, \ldots) = g_1^P \times S_z \times YTM_{15} = g_5 \times g_7 = YTM_{15}$
$f_j(t_i, \ldots) = g_j(t_i, \ldots) - g_{j(i-1)}, \ldots), j=1, \ldots, 15$

3.1.2.2. The Right-Hand-Side for Agency Bonds

The same as in 3.1.1.2, right-hand-side for Agency bonds includes 1$^{st}$ differences of prices.

3.1.2.3. Outputs for Agency Bonds

Keep the rest the same as in 3.1.1.3., and change equations (3.1) and (3.2) into $$C_{I\_Original\_agy}(t) = \sum_{j=1}^{15} \beta_j(t) \times g_j(S_d(s), P(s), S_z(s), YTM_{15}(s))_{s \leq t} \quad (3.5)$$

$$C_{O\_original\_agy}(t) = \sum_{j=1}^{15} \beta_j(t) \times f_j(S_d(s), P(s), S_z(s), YTM_{15}(s))_{s > t} \quad (3.6)$$

3.2 Market Adjustment

3.2.1 Regression 2: Calculate Out-of-sample Market Adjustment

The trade-to-trade change in price is regressed on the in-sample predicted transaction cost and several other variables capturing trade-to-trade changes in ETF prices and their interactions with bond characteristics.

3.2.1.1. Basis Functions: Variables Designed to Capture ETF Price Changes in Regression 2

Excluding constant term, the number of basis functions is 18 (M=18, see Appendix E). The system may omit time dependency for state variables as before but also may include it whenever necessary. Basis functions are more complex due to the 1st difference involvement. Basis functions may be identified as follows:

$g_1(t_i, \ldots) = \ln(LQD)$, $f_1(t_i, \ldots) = g_1(t_i, \ldots) - g_1(t_{i-1}, \ldots)$
$f_2(t_i, \ldots) = f_1 \times YTM_{10}(t_i)$
$f_3(t_i, \ldots) = f_1 \times R(t_i)$
$f_4(t_i, \ldots) = f_1 \times YTM_{10}(t_i) \times R(t_i)$
$f_5(t_i, \ldots) = f_1 \times H(t_i)$
$f_6(t_i, \ldots) = f_5 \times R(t_i)$
$f_7(t_i, \ldots) = f_5 \times YTM_{10}(t_i)$
$f_8(t_i, \ldots) = f_7 \times R(t_i)$
$g_9(t_i, \ldots) = \ln(HYG) - \ln(LQD)$, $f_9(t_i, \ldots) = g_9(t_i, \ldots) - g_9(t_{i-1}, \ldots)$
$f_{10}(t_i, \ldots) = f_9 \times YTM_{10}(t_i)$
$f_{11}(t_i, \ldots) = f_9 \times R(t_i)$
$f_{12}(t_i, \ldots) = f_9 \times YTM_{10}(t_i) \times R(t_i)$
$f_{13}(t_i, \ldots) = f_9 \times H(t_i)$
$f_{14}(t_i, \ldots) = f_{13} \times R(t_i)$
$f_{15}(t_i, \ldots) = f_{13} \times YTM_{10}(t_i)$
$f_{16}(t_i, \ldots) = f_{15} \times R(t_i)$
$g_{17}(t_i, \ldots) = \ln(TLT) - \ln(IEI)$, $f_{17}(t_i, \ldots) = [g_{17}(t_i, \ldots) + g_{17}(t_{i-1}, \ldots)] \times YTM_{20}(t_i, \ldots) \times I_A(t_i)$, where $I_A$ is A-rating or better indicator
$f_{18}(t_i) = C_{I\,Original}(t_i) - C_{IOriginal}(t_{i-1})$
H(t) is the high yield indicator that equals to 1 if it is high yield, otherwise it is 0.

3.2.1.2. The Right-hand-side of the Regression
The right-hand-side also includes 1st differences in prices.

3.2.1.3. Outputs: Out-of-sample Betas and Out-of-sample Market Adjustments

Coefficients from the data are used to estimate three betas for each bond, an LQD beta, an HYG-LQD beta, and a TLT-IEI beta. Let the three beta multipliers produced by the regression above (at the end of the repression window) be $\beta_{LQD}(t)$, $\beta_{HYG-LQD}(t)$, and $\beta_{TLT-IEI}(t)$ respectively. The beta is the sum of the coefficients multiplied by the relevant variable (divided by the ETF change) as follows:

$$\beta_{LQD}(t) = \sum_{j=1}^{8} \beta_j(t) \frac{f_j(s)_{s>t}}{f_1(s)_{s>t}} \quad (3.7)$$

$$\beta_{HYG-LQD}(t) = \sum_{j=9}^{16} \beta_j(t) \frac{f_j(s)_{s>t}}{f_9(s)_{s>t}} \quad (3.8)$$

$\beta_{TLT-IEI}(t) = \beta_{18}(t) \times YTM_{20}(s)_{s>t} \times R_A(s)_{s>t}$, for all bonds rated better than A and in 20 years of YTM, $\beta_{TLT-IEI}(t) = 0$ otherwise. (3.9)

The betas are then used out-of-sample to construct predicted market adjustments from one trade to the next from month t-24 to t-1. Then the out-of-sample market adjustment at t is calculated as follows:

$M_o(t,s) = \beta_{LQD}(t) \times (\ln(LQD(s)) \ln(LQD(s-1))) + \beta_{HYG-LQD}(t) \times (\ln(HYG(s)) - \ln(LQD(s)) - \ln(HYG(s-1)) + \ln(LQD(s-1))) +$, $s>t$ $\beta_{TLT-IEI}(\ln(TLT(s)) - \ln(IEI(s)) - \ln(TLT(s-1)) + \ln(IEI(s-1)))$ (3.10)

3.2.2 Regression 2 for Agency Bonds

3.2.2.1. Basis Functions for Agency Bonds

For agencies, the model in 3.2.1.1. may lose some terms that involved credit and becomes a 11 parameter model, also by using LQD and HYG-LQD take AGZ and IEI-AGZ instead as the following:

$g_1(t_i, \ldots) = \ln(AGZ)$, $f_1(t_i, \ldots) = g_1(t_i, \ldots) - g_1(t_{i-1}, \ldots)$
$f_2(t_i, \ldots) = f_1 \times YTM_{10}(t_i)$
$f_3(t_i, \ldots) = f_1 \times H(t_i)$
$f_4(t_i, \ldots) = f_3 \times YTM_{10}(t_i)$
$g_5(t_i, \ldots) = \ln(IEI) - \ln(AGZ)$, $f_5(t_i, \ldots) = g_5(t_i, \ldots) - g_5(t_{i-1}, \ldots)$
$f_6(t_i, \ldots) = f_5 \times YTM_{10}(t_i)$
$f_7(t_i, \ldots) = f_5 \times H(t_i)$
$f_8(t_i, \ldots) = f_7 \times YTM_{10}(t_i)$
$g_9(t_i, \ldots) = \ln(TLT) - \ln(IEI)$, $f_9(t_i, \ldots) = [g_9(t_i, \ldots) - g_9(t_{i-1}, \ldots)] \times YTM_{20}(t_i)$
$f_{10}(t_i) = C_{I\,Original}(t_i) - C_{I\,Original}(t_{i-1})$

3.2.2.2. The Right-hand-side for Agency Bonds
The same as in 3.2.1.2, right-hand-side for Agency bonds includes 1$^{st}$ differences of prices.

3.2.2.3. Outputs for Agency Bonds
Keep the rest the same as in 3.2.1.3., and change equations (3.7), (3.8) and (3.9) into the following:

$$\beta_{AGZ}(t) = \sum_{j=1}^{4} \beta_j(t) \frac{f_j(s)_{s>t}}{f_1(s)_{s>t}} \quad (3.11)$$

$$\beta_{IEI-AGZ}(t) = \sum_{j=5}^{8} \beta_j(t) \frac{f_j(s)_{s>t}}{f_5(s)_{s>t}} \quad (3.12)$$

$\beta_{TLT-IEI}(t) = \beta_9(t) \times YTM_{20}(s)_{s>t}$, for all bonds in 20 years of YTM, it is 0 other-wise. (3.13)

And the calculation of out-of-sample market adjustment changes into the following:

$M_{O\,agy}(t,s) = \beta_{AGZ}(t) \times (\ln(AGZ(s)) - \ln(AGZ(s-1))) + \beta_{IEI-AGZ}(t) \times (\ln(IEI(s)) - \ln(AGZ(s)) - \ln(IEI(s-1)) + \ln(AGZ(s-1))) + \beta_{TLT-IEI}(t) \times (\ln(TLT(s)) - \ln(IEI(s)) \ln(TLT(s-1)) + \ln(IEI(s-1)))$ (3.14)

3.3 Transaction Cost and Betas for Maturity*Credit Cells

This section is to run regressions that estimate transaction cost and beta multipliers for each of 30 maturity* credit cells. For each of the 30 cells and each of the rolling windows, three regressions below are run.

3.3.1 Regression 3: Calculate In-sample Predicted Value 3.3.1.1. Basis Function: Changes in Out-of-sample Predicted Transaction Costs from Regression 1

The sole basis function is $\Delta C_O = C_O(t_i) - C_O(t_{i-1})$ from Regression 1 formula (3.2) and truncated by formula (3.3).

The right-hand-side is again the price change $\Delta p$ 3.3.1.2. Regression Equation The first regression is a regression of trade-to-trade price changes on changes in out-of-sample predicted transaction costs from Regression 1. Therefore, this regression is a weighted line-fit calculated as follows:

$$\Delta p = \beta_0^P + \beta_1^P \cdot \Delta C_O \quad (3.15)$$

3.3.2 Regression 4: Calculate In-sample Beta 3.3.2.1. Basis Function: Trade-to-trade Change in Ln(LQD)

The sole basis function is $\Delta \ln(LQD)$

The right-hand-side is $\Delta p - \beta_1^P \cdot \Delta C_O$ 3.3.2.2. Regression Equation The second regression is a regression of trade-to-trade price changes (less the in-sample predicted value from Regression 3) on the trade-to-trade change in Ln(LQD). This regression is weighted line-fit calculated as follows:

$$\Delta p - \beta_1^P = \beta_0^l + \beta_1^l \cdot \Delta \ln(LQD) \quad (3.16)$$

3.3.3 Regression 5: Calculate CO and SE for a Bond's Cell 3.3.3.1. Basis Function: Trade-to-trade change in ETFs and In-sample Beta The sole basis function is $\Delta \ln(HYG) - \Delta \ln(LQD)$ The right-hand-side is $\Delta p - \beta_1^P \cdot \Delta C_o - 0.5 \cdot \beta_{LQD} \Delta \ln(LQD) - 0.5 \cdot \beta_1^l \cdot \Delta \ln(LQD)$ Here $\beta_{LQD}$ is from the 3.2.1.3., see formula (3.7).

3.3.3.2. Regression Equation

The third regression is a regression using the dependent variable from Regression 4, less the trade-to-trade in LQD times the average of the in-sample beta from the second regression and the LQD beta estimated in 3.2.1.3. This regression is the weighted line-fit calculated as follows:

$$\Delta p - \beta_1^P \Delta C_O - 0.5 \cdot \beta_{LQD} \cdot \Delta \ln(LQD) - 0.5 \cdot \beta_1^l \cdot \Delta \ln(LQD) = \beta_0^h + \beta_1^h \cdot [\Delta \ln(HYG) - \Delta \ln(LQD)] \quad (3.17)$$

3.3.3.3. Outputs: Standard Error for Bond's Cell

The details on standard error for coefficients are included in Appendix E. In addition, both coefficients and standard errors from the above three regressions are recorded for each cell and rolling window. Once the transaction cost and market adjustments are calculated in step 3.4. for time period T, the coefficients from the rolling window T-24 to T-1 can be discarded. All the coefficients for all 30 cells and ~40 rolling windows may be calculated, and then all the adjustments may be calculated. All 30 cell's coefficients for window T-24 to T-1 may also be calculated along with the adjustments for T, and then move onto the next rolling window. New rolling windows are determined every day, and thus 50 sets of coefficients instead of 24 are calculated over a 24-month past history.

3.3.4 Regression 3, 4, 5 for Agency Bonds 3.3.4.1. Regression 3 for Agency Bonds Steps and equations are the same as in section 3.3.1.

3.3.4.2. Regression 4 for Agency Bonds

Change ETF LQD into AGZ in each equation of section 3.3.2., and keep other calculations the same.

3.3.4.3. Regression 5 for Agency Bonds

Replace HYG-LQD by IEI-AGZ in each equation of section 3.3.3., and also use $\beta_{AGZ}$ instead of $\beta_{LQD}$ in related calculations.

3.4 Blend TCA and MktA with Bond's Cell CO and SE

In this section, estimated transaction costs and credit market betas from 3.1. and 3.2. are blended with those estimated in 3.3.

3.4.1 Blend of the CO for Bond's Cell

Cell-average transaction cost, cell-average betas, and cell-average standard error are calculated and then blended with outputs from TC model and Market Adjustment Model to produce blended transaction cost and blended betas. Let (ytm,R) be maturity-rating pair. For each calculation, the performance of this step occurs as follows:

1. Identify surrounding maturity-rating cells for (ytm,R) (see below for details).
2. Calculate surrounding cell-weights (see below for details).
3. Calculate surrounding-cell-averaged (with the weights calculated at last step) coefficients and standard errors: $\overline{\beta}_1^P$, $\overline{E}_P$, $\overline{\beta}_1^l$, $\overline{E}_l$, $\overline{\beta}_1^h$, and $\overline{E}_h$. All these quantities depend on (ytm,R).

This step is just for smoothing each cell-dependent quantity.

Calculate the global cell-average coefficients and standard errors over all 30 cells (averaging the results from the 3$^{rd}$ step). Since the 3$^{rd}$ step may not been implemented, this step is simply averaging "simple" results of cell-restricted regressions. For saving typing, we use the same notations for surrounding-cell-averages.

The three outputs are calculated as follows (using results from previous step):

1. Transaction costs: $tc = C_o \cdot (1 + (\overline{\beta}_1^P - 1) \cdot (0.8 - 0.3 \cdot \max(0, \min(1, 100 \cdot \overline{E}_P - 100))))$, $C_o$ is from (3.5). The output may be just $C_o$ if $\overline{E}_P > 0.1$ or $|\overline{\beta}_1^P - 1| > 0.5$.
2. LQD Beta: $\beta_l = \max(5, 0.4 \cdot (\beta_{LQD} + \overline{\beta}_1^l))$.
3. HYG-LQD Beta:

$$\beta_h = 0.8 \cdot \beta_{HYG\text{-}LQD} + 0.8 \cdot (\overline{B}_1^h - \beta_{HYG\text{-}LQD}) \cdot (1 - 0.2 \cdot \max(0, \min(4, \overline{E}_h))).$$

The adjacent cells are identified as follows. Given a point of pair of YTM and credit rating, the first thing to do is to identify adjacent cells. This is done according to its location relative to cell midpoints. Let $\{R_i\}_{i=1}^6$ be the set of credit ratings. Currently $R_1$ represents CCC or below, $R_6$ represents AA and above. Let $\{YTM_i\}_{i=0}^6$ be the set of midpoints of time-to-maturity ranges. Currently $YTM_0 = 0$, $YTM_1 = 1$, $YTM_2 = 3.5$, $YTM_3 = 6.5$, ..., $YTM_6$ represents 20+years. Given a point P=(R,Y) rating bounds and maturity bounds are determined for P i.e. $R_i$ and $R_{i+1}$ such that $R_i \leq R \leq R_{i+1}$; $YTM_j$ and $YTM_{j+1}$ such that $YTM_j \leq Y \leq YTM_{j+1}$. The adjacent cells for P may be the combination of rating bounds and maturity bounds. Note that either ranges $[R_i, R_{i+1}]$ and $[YTM_j, YTM_{j+1}]$ may shrink to a point, in that case the combination may have less than 4 cells.

Cell weight calculations are outlined as follows. There are two components to be calculated: YTM weight and credit rating weight. The YTM weight is calculated as $$w_{YTM} = \frac{|Y - YTM_k|}{YTM_{j+1} - YTM_j},$$

given that the range $[YTM_j, YTM_{j+1}]$ didn't shrink. Here $Y \in [YTM_j, YTM_{j+1}]$ and k=j or j+1 depending on which adjacent cell is calculating weight. The credit rating weight is calculated in similar manner where $$w_R = \frac{d(R, R_k)}{n_{i,i+1}}, n_{i,i+1}$$

is the distance between $R_i$ and $R_{i+1}$ given the range didn't shrink. Here $R \in [R_i, R_{i+1}]$ and $d(R, R_k)$ is distance between R and $R_k$, k=i or i+1 depending on which adjacent cell we are calculating weight. Distance between two credit ratings means the number upgrades (downgrades) needed traveling from one rating to the other. The cell weight is then the product of credit rating weight and YTM weight:

$$w_C = w_{YTM} \times w_R.$$

3.4.2 Blend of the CO for Agency Bonds

For agencies, 6 cells for the different maturities may be used and the coefficients from the 2 cells with nearest midpoints are blended.

3.4.3 Blend the Average of the Cell CO

For transaction costs, the out-of-sample predicted transaction cost from 3.1. is transformed into the rescaled transaction cost by the following equation:

$$tc = C_o \cdot (1 + (\bar{\beta}_1^P - 1) * (0.8 - 0.3 * \text{Max}(0, \text{Min}(1, \overline{E}_P * 100 - 100)))) \quad (3.18)$$

If the standard error is: $\overline{E}_P > 0.1$ or $|\bar{\beta}_1^P - 1| > 0.5$, then the cell-average coefficient $CO_A$ is discarded and the out-of-sample transaction cost from 3.1., $C_O$, is used instead.

3.4.4 Calculate New Betas 3.4.4.1. Calculate the new LQD Beta $$\beta_l = \text{Max}(5, \beta_{LQD} * 0.4 + \overline{B}_1^l * 0.4) \quad (3.19)$$

For agencies, slightly change equation (3.19) into:

$$\beta_a = \text{Max}(5, \beta_{AGZ} * 0.4 + \bar{\beta}_1^l * 0.4) \quad (3.20)$$

Calculate the new HYG-LQD Beta $$\beta_h = \beta_{HYG-LQD} * 0.8 + 0.8 * (\bar{\beta}_1^h - \beta_{HYG-LQD}) * (1 - 0.2 * \max(0, \min(4, \overline{E}_h))) \quad (3.21)$$

For agencies, slightly change equation (3.21) into:

$$\beta_l = \beta_{IEI-AGZ} * 0.8 + 0.8 * (\bar{\beta}_1^h - \beta_{IEI-AGZ}) * (1 - 0.2 * \max(0, \min(4, \overline{E}_h))) \quad (3.22)$$

3.4.4.2. Calculate the new TLT-IEI Beta
The TLT-IEI beta is simply retained from 3.2.1.3., formula (3.9):

$$\beta_m = \beta_{TLT-IEI}$$

$$= \begin{cases} \beta_{17} * YTM_{20} * R_A, & \text{for all bonds rated better than } A- \\ & \text{and in 20 years of maturity} \\ 0, & \text{for all bonds rated less than } A- \\ & \text{or within 10 years of maturity} \end{cases}$$

For agencies, use formula (3.13) instead.

3.4.5 Calculate New Market Adjustment $$etf2(t, s) = \beta_l(t) \times (1n(LQD(s)) - 1n(LQD(s-1))) + \beta_h(t) \times (1n(HYG(s)) - 1n(LQD(s)) - 1n(HYG(s-1)) + 1n(LQD(s-1))) + \beta_m(t) \times (1n(TLT(s)) - 1n(IEI(s)) 1 - 1n(TLT(s-1)) + 1n(IEI(s-1))) \quad (3.23)$$

And for agency bonds, change equation (3.23) into:

$$etf2(t, s) = \beta_{1\_agy}(t) \times (1n(AGZ(s)) - 1n(AGZ(s-1))) + \beta_{h\_agy}(t) \times (1n(IEI(s)) - 1n(AGZ(s)) - 1n(IEI(s-1)) + 1n(AGZ(s-1))) \beta_m(t) \times (1n(TLT(s)) - 1n(IEI(s)) - 1n(TLT9s-1)) + 1n(IEI(s-1))) \quad (3.24)$$

3.5 Calculate Final TCA and MktA

The final output of this section is a trade history with transaction costs and market adjustments adjusted by multipliers calculated from the above steps.

3.5.1 Regression 6: Calculate CO and SE for TCA and MktA 3.5.1.1. Basis Functions: Trade-to-trade Price Change, Trade-to-trade Change in Estimated TC and MktA The two basis functions are $\Delta tc$ and etf2

The right-hand-side is $\Delta p$ 3.5.1.2. Regression Equation

Rolling window regressions are run for each issue. Regressions are only run for 24-month windows with at least 20 trades. The trade-to-trade price change is regressed on the trade-to-trade change in estimated transaction costs and the trade-to-trade market adjustment.

This regression is the weighted line-fit:

$$\Delta p = \tilde{\beta}_0 + \tilde{\beta}_1 * w * \Delta tc + \tilde{\beta}_2 * w * etf2 \quad (3.25)$$

3.5.1.3. Outputs: TCA and MktA Coefficients and Standard Errors

Coefficients and standard errors are recorded for the transaction cost and market adjustments as $CO_{TCA}$, $CO_{MktA}$ and $SE_{TCA}$, $SE_{MktA}$. Let $\tilde{\beta}_1$ and $\tilde{\beta}_2$ be the two coefficients:

$$CO_{TCA}(t) = \tilde{\beta}_1(t) \quad (3.26)$$

$$CO_{MktA}(t) = \tilde{\beta}_2(t) \quad (3.27)$$

3.5.2 Calculate Final Transaction Cost Adjustment (TCA)

The final transaction cost adjustment is calculated as the step 12 adjustment tc multiplied by the factor as:

$$tc_3 = \quad (3.28)$$
$$tc * \left(1 + (\tilde{\beta}_1 - 1) * \max\left(0, \min\left(1, 0.5 - 0.25 * \ln\left(8 * \sqrt{\sigma^2(\tilde{\beta}_1)}\right)\right)\right)\right)$$

3.5.3 Calculate Final Market Adjustment (MktA)

Similarly, the final market adjustment is calculated using the step 12 betas multiplied by the factor as:

$$etf23 = \quad (3.29)$$
$$etf2 * \left(0.9 * \left(1 + (\tilde{\beta}_2 - 1) * \max\left(0, \min\left(1, 1 - 3 * \sqrt{\sigma^2(\tilde{\beta}_2)}\right)\right)\right)\right)$$

3.6 Value Estimation

Figure 4:
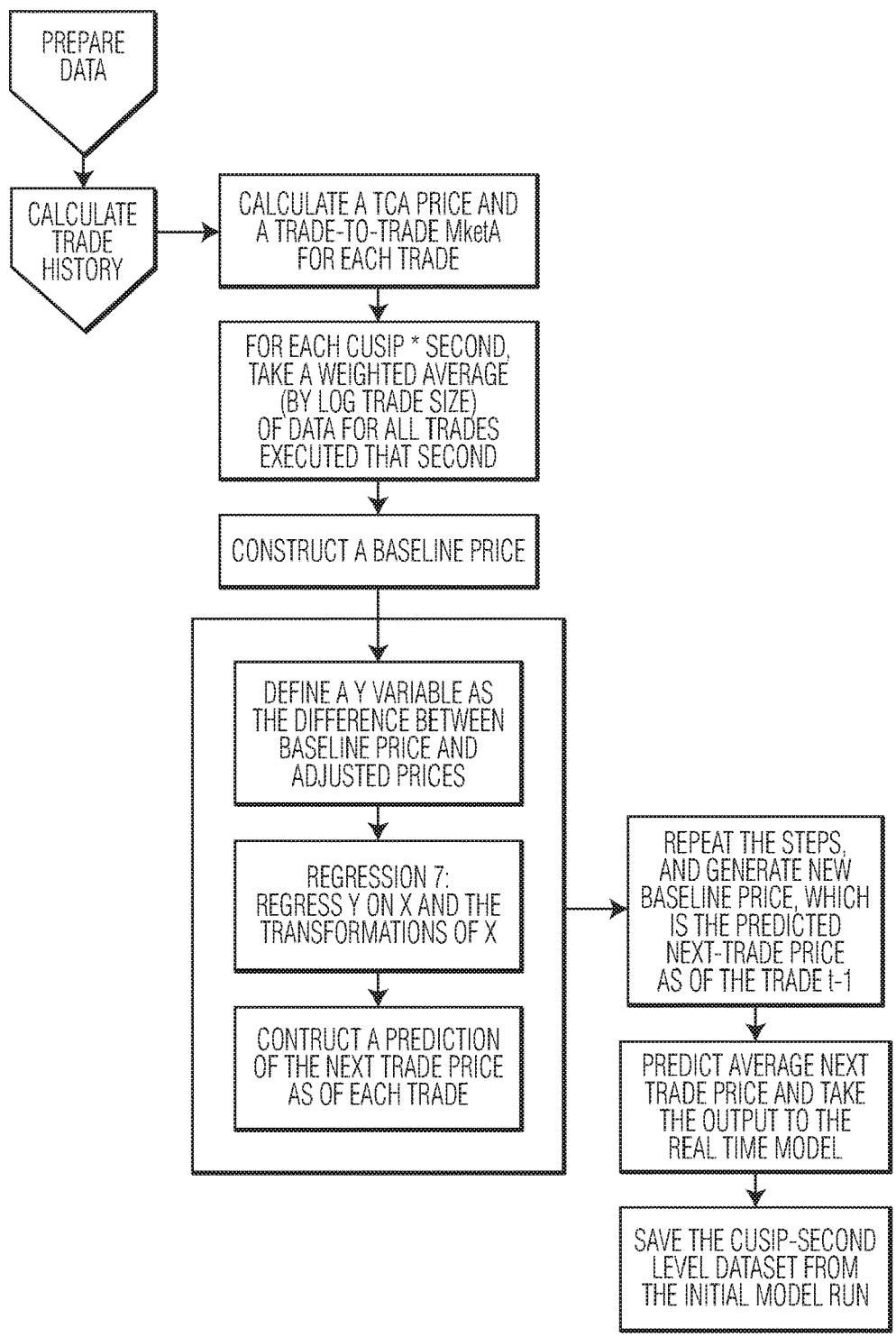
FIG. 4 depicts an exemplary flow chart of value estimation.

FIG. 4 depicts an exemplary flow chart of value estimation. In general, value estimation occurs in three steps:

Trades are reduced to the CUSIP * trade level and the average characteristics of trades executed during that second are calculated. Rescale all prices to current terms of transaction cost adjusted and market adjusted.

Construct a rolling average value estimate, where the valuation goes as:

new average=(new adjusted price) * w+(1−w) * (old average)

The rolling average is calculated and then recalculated in two iterations.

3.6.1 Reduce and weight trades to CUSIP * Second

3.6.1.1. Calculate TCA and MktA for Each Trade

For each trade, calculate a transaction cost adjustment by using formula (3.28), and a trade-to-trade market adjustment, using betas from Regression 6 in 3.5. multiplied by changes since the last trade. Cumulate the trade-to-trade market adjustments into a cumulative index. Transaction cost adjustment can be obtained by following steps below:

i. From overnight regression—Regression 1, the system may save 24 coefficients, $\beta_j$, j=1, . . . , 24. When a new trade comes in, using each coefficient times its related trade/bond feature variable, and then sums them up as:

$$C_{O\_original} = \beta_1 * S_d + \beta_2 * P + \beta_3 * S_d * S_z + \beta_4 * P * S_z + \beta_5 * S_z + \beta_6 * +I_1^S + \beta_7 * I_1^P + \beta_8 * S_z * I_1^S + \beta_9 * S_z * I_1^P + \beta_{10} * S_d * R + \beta_{11} * YTM_{15} + \beta_{12} * I_1^S * R + \beta_{13} * I_1^S * YTM_{15} + \beta_{14} * S_d * S_z * R + \beta_{15} * S_d * S_z * YTM_{15} + \beta_{16} * S_d * S_z * R * YTM_{15} + \beta_{17} * P * S_z * R + \beta_{18} * P * S_z * YTM_{15} + \beta_{19} * P * S_z * R * YTM_{15} + \beta_{20} * I_1^S * S_z * YTM_{15} + \beta_{22} * I_1^S * S_z * R * YTM_{15} + \beta_{23} * I_1^P * S_z * R + \beta_{24} * I_1^P * S_z * YTM_{15}$$

ii. By using the same trade feature variables, the truncation is calculated of out-of-sample predicted transaction costs by the following equation:

$$C_o(t) = \text{Sign}(S_d(t)+P(t)) * \max(0.05, \min(2.5 * \text{coef}(t), \text{Sign}(S_d(t)+P(t)) * C_{O\_original}(t))) \text{, if ABS}(S_d(t)+P(t))=1$$

where $\text{coef}(t)=\beta_3(t)$, which is from nine-parameter TC regression in Regression 1 iii. For each bond, by using the maturity * credit cells, blend the truncated out-of-sample predicted transaction costs generated above with cell coefficients from Regression 3-5:

$$tc = C_o \cdot (\bar{\beta}_1^P - 1) * (0.8 - 0.3 * \text{Max}(0, \text{Min}(1, \bar{E}_p * 100 - 100)))) \; C_o \text{ is from Section 3.1.1.}$$

$\bar{\beta}_1^P, \bar{E}_p$ are coefficients from Regression 3-5 iv. For each bond, use tc from the above times the issue-level multiplier to obtain the final transaction cost adjustment tc3:

$$tc_3 = tc * \left(1 + (\tilde{\beta}_1 - 1) * \max\left(0, \min\left(1, 0.5 - 0.25 * \ln\left(8 * \sqrt{\sigma^2(\tilde{\beta}_1)}\right)\right)\right)\right)$$

tc is from Section 3.4.3.

$\tilde{\beta}_1, \sqrt{\sigma^2(\tilde{\beta}_1)}$ are coefficients from Regression 6

Market adjustments are calculated using betas generated from overnight regression—Regression 2. Using these betas times, the ETF price changes and sums them up as the following steps shows:

$$etf2(t, s) = \beta_l \times (\ln(LQD(t)) - \ln(LQD(s))) + \beta_h \times (\ln(HYG(t)) - \ln(LQD(t)) - \ln(HYG(s)) + \ln(LQD(s))) + \beta_m \times (\ln(TLT(t)) - \ln(IEI(t)) - \ln(TLT(s)) + \ln(IEI(s)))$$ i.

where t is the time when a new trade comes in and triggers the model to update, while s is last model updated time ii. Market adjustments are adjusted by issue-level multiplier as:

$$etf23 = etf2 * \left(0.9 * \left(1 + (\tilde{\beta}_2 - 1) * \max\left(0, \min\left(1, 1 - 3 * \sqrt{\sigma^2(\tilde{\beta}_2)}\right)\right)\right)\right)$$

$\tilde{\beta}_2, \sqrt{\sigma^2(\tilde{\beta}_2)}$ are coefficients from Regression 6

3.6.1.2. Weight Trades by Executed Second

Trades are weighted by log trade size. Use $$\ln\left(\frac{Lotsize}{100}\right),$$

where lotsize is par value in dollars or use variable MAquantityindicator to weight the trades. For each CUSIP * second, a weighted average of data is determined for all trades executed that second, including the replace or cancelled ones.

Variables to be averaged:
Transaction cost adjusted price.
Interdealer trade indicator variable.
Unpaired interdealer trade indicator variable.
Log size.
Investment grade indicator.
Side+Paired.
Variables to be needed but may not vary within CUSIP * second:
Cumulative market adjustment.
Date and Time.

3.6.2 Construct a Rolling Average Value Estimate

3.6.2.1. Construct a Baseline Price

For a bond with trades at $\{t_i, i=1,2, \ldots, k\}$ during the 6 month window, use tc3 and etf23 developed above from Section 3.5.2. and 3.5.3., after weighted average if necessary, calculated as follows: $P_{adj}(t_i)=P(t_i)-tc3(t_i)$, i=1,2, . . . , k. Use the average of transaction cost and market adjusted prices from the last 5 CUSIP * seconds with trades. Define the baseline price as:

$$P5_{adj}(t_i) = \frac{P_{adj}(t_i) + P_{adj}(t_{i-1}) + P_{adj}(t_{i-2}) + P_{adj}(t_{i-3}) + P_{adj}(t_{i-4})}{5} \quad (3.30)$$

Define $Y=P_{adj}(t_{i+1})-P5_{adj}(t_{i-1})-\text{MktA}(t_{i-5},t_i)-etf23(t_{i+1})$ (3.31)

And: $X=P_{adj}(t_i)-P5_{adj}(t_{i-1})-\text{MktA}(t_{i-5}, t_i)$ (3.32)

where:

$\text{MktA}(t_{i-5}, t_i)=etf23(t_i)+0.8 * etf23(t_{i-2})+0.6 * etf23(t_{i-2})+0.4 * etf23(t_{i-3})+0.2 * etf23(t_{i-4})$ (3.33)

For Y only, trades that are eventually cancelled or replaced may not be considered.

3.6.2.2. Regression 7: Calculate the Prediction of the Next Trade Price

Variable definition:
$I_d$: Interdealer indicator
$U_d$: Unpaired interdealer indicator
$T_{d1}$: The log differences in time between trade t+1 and t
$T_{d2}$: The log differences in time between trade t and t−1

$IG_d$: Investment grade indicator
$T_s$: The average trade size
I: The indicator variable for trade t and t−1 occurring on the same calendar day
Sum: The sum of Side and Paired Inputs
The independent variable is
$f_1(X, \ldots) = X$
$f_2(X, \ldots) = X * I_d = f_1 * I_d$
$f_3(X, \ldots) = X * U_d = f_1 * U_d$
$f_4(X, \ldots) = X * T_{d1} = f_1 * T_{d1}$
$f_5(X, \ldots) = X * T_{d2} = f_1 * T_{d2}$
$f_6(X, \ldots) = X * IG_d = f_1 * IG_d$
$f_7(X, \ldots) = X * T_s = * f_1 * T_s$
$f_8(X, \ldots) = X * \text{Sum} = f_1 * \text{Sum}$
$f_9(X, \ldots) = X * \text{Sum} = f_1 * \text{Sum}$ The dependent variable is Y Regression Equation:

$$Y = A \cdot \beta = \sum_{j=1}^{9} \beta_j \times a_j \qquad (3.34)$$

Where:
A is a N×9 matrix with entry $a_j = f_j(X, \ldots)$ we recognizes that A is the design matrix.
β is a 9×1 column vector of coefficients.
Observations are equal weighted Outputs: Save the coefficients from this regression
Rolling window: For this regression, 6 month window is a sufficient length.

This regression produces one month ahead out-of-sample estimate, which is calculated as $$\hat{Y} = \sum_{j=1}^{9} \beta * x,$$

as well as one month ahead out-of-sample estimate is obtained as $\text{PredPrice}(t_i) = P5_{adj}(t_{i-1}) + \text{MktA}(t_{i-6}, t_{i-1}) + \hat{Y}$. During daily real-time evaluation, when new trades come in, the above calculation is repeated and the process is shown in Section 4.6.4., $\text{PredPrice}(t_i)$ is one way of mixing tc3 and etf23 to produce a model evaluation for time $t_i$.

3.6.2.3. Construct Prediction of the Next Trade Price

The coefficients from the above regression are used out of sample to construct a prediction of the next trade price as of each trade. Also, let Δt, the difference between t+1 and t, equal to one second. And save the coefficients from the last rolling window for use out-of-sample.

3.6.3 Repeat the Process for Rolling Average
3.6.3.1. Iterate the Processes for New Baseline Price In this step, 3.6.2. is repeated. For each iteration, the new baseline price is the predicted next-trade price as of trade t−1. And Y is the difference between the baseline price and trade t+1's transaction cost and market-adjusted prices in formula (3.31), and X is the difference between the baseline price and the predicted next-trade price as of trade t as in formula (3.32). Regression 7 is run to generate predicted next-trade prices as in formula (3.34), and save coefficients from the last rolling window for real-time use.

3.6.3.2. Average the Predicted Next-trade Price

When the predicted next-trade price is averaged from the first and second iterations, a 50-50 ratio is used out-of-sample as a measure of current value, adjusted for market movements since the last trade using the betas.

3.6.4 Outputs of Value Estimation

To take into the real time model, outputs from the above steps of value estimation are determined as follows:

For each bond
The predicted next-trade price from the most recent CUSIP * second with a trade.
The ETF values from the time of that trade.
The betas estimated in 3.4.
The coefficients used for transaction cost adjustment.
The coefficients from both iterations from the most recent rolling window.

3.7 Summary of Outputs in Section 3

Table 6 is a summary of outputs which are used in Section 4 for real time value estimation; Table 7 is the mapping of variable names used for calculation in real-time process in Section 4.

Contents in each column are listed below:
Objective describes calculation purpose, i.e., what variable is calculated here.
Variable Name (in model) is the name used in mathematical function.
Output (in Stata code) is the variable name in STATA coding and Methodology may use in Math Library coding.
Regression No./Function shows where the variable appears.
Coefficient Name is the name that the output name Methodology might use when they generate the coefficients from regression equations
Data Identity shows whether the variable is a trade data or a bond level data Related Sections shows the section where the variable is generated and used, TC—Transaction Cost Adjustment, MA—Market Adjustment, VE—Value Estimation, RT—Real Time Process.

TABLE 6

Outputs from Section 3

| Objective | Variable Name (in model) | Output (in Stata code) | Regression No./Function | Coefficient Name | Data Identity | TC | MA | VE | RT |
|---|---|---|---|---|---|---|---|---|---|
| Original out-of-sample predicted transaction costs without truncated | $C_{O\_original}$ | py3 (then replaced by the truncated transaction cost py3 below) | Regression 1 (3.2) | Reg1_Coef_tt, Reg1_Coef_dtt, Reg1_Coef_ttfq, Reg1_Coef_dttfq, Reg1_Coef_fq, Reg1_Coef_ttpos, Reg1_Coef_dttpos, Reg1_Coef_ttposfq, Reg1_Coef_dttposfq, | Market | √ | | | √ |

TABLE 6-continued

| | | | Outputs from Section 3 | | | | | |
|---|---|---|---|---|---|---|---|---|
| Objective | Variable Name (in model) | Output (in Stata code) | Regression No./Function | Coefficient Name | Data Identity | TC | MA | VE | RT |

| Objective | Variable Name (in model) | Output (in Stata code) | Regression No./Function | Coefficient Name | Data Identity | TC | MA | VE | RT |
|---|---|---|---|---|---|---|---|---|---|
| | | | | Reg1_Coef_ttrat, Reg1_Coef_ttmat15, Reg1_Coef_ttposrat, Reg1_Coef_ttposmat 15, Reg1_Coef_ttfqrat, Reg1_Coef_ttfqmat15, Reg1_Coef_ttfqmat15 rat, Reg1_Coef_dttfqrat, Reg1_Coef_dttfqmat 15, Reg1_Coef_dttfqmat 15rat, Reg1_Coef_ttposfqrat, Reg1_Coef_ttposfqmat 15, Reg1_Coef_ttposfqmat 15rat, Reg1_Coef_dttposfqrat, Reg1_Coef_dttposfqm at15 | | | | | |
| For Agency: Original out-of-sample predicted transaction costs without truncated | $C_{O\_original\_agy}$ | | Regression 1 (3.6) | Reg1agy_Coef_tt, Reg1agy_Coef_dtt, Reg1agy_Coef_ttfq, Reg1agy_Coef_dttfq, Reg1agy_Coef_fq, Reg1agy_Coef_ttpos, Reg1agy_Coef_dttpos, Reg1agy_Coef_ttposf q, Reg1agy_Coef_dttpos fq, Reg1agy_Coef_ttmat 15, Reg1agy_Coef_ttpos mat15, Reg1agy_Coef_ttfqm at15, Reg1agy_Coef_dttfqm at15, Reg1agy_Coef_ttposfq mat15, Reg1agy_Coef_dttpos fqmat15 | Market | √ | | √ |
| Truncated out-of sample transaction cost | $C_O$ | Py3 | Regression 1 (3.3) | Reg1_Coef9_ttfq | Market | √ | | √ |
| Cell-average coefficient CO | $\bar{\beta}_1^P$ | BldReg3_ Coef_spy3 | | BldReg3_Coef_spy3 | Bond | | | |
| Cell-average standard error SE | $\bar{E}_P$ | BldReg3_ Se_spy3 | | BldReg3_Se_spy3 | Bond | | | |
| Final LQD Beta calculated by using $\beta_{LQD}$ and the cell-average coefficient $\bar{\beta}_1^I$ | $\beta_I$ | beta_1 | Regression 2 (3.7) Regression 4 (3.16) (3.19) | $\beta_{LQD}$ is generated from Regression 2 (betaL1): Reg2_Coef_sLQD, Reg2_Coef_sLQDmat 10, Reg2_Coef_sLQDrat, Reg2_Coef_sLQDmat 10rat, Reg2_Coef_sLQDhy, Reg2_Coef_sLQDhy rat, Reg2_Coef_sLQDmat 10hy, Reg2_Coef_sLQDmat 10hyrat, | Bond | | √ | |

TABLE 6-continued

Outputs from Section 3

| Objective | Variable Name (in model) | Output (in Stata code) | Regression No./Function | Coefficient Name | Data Identity | TC | MA | VE | RT |
|---|---|---|---|---|---|---|---|---|---|
| For Agency: Final AGZ Beta calculated by using $\beta_{AGZ}$ and the cell-average coefficient $\bar{\beta}_1^a$ | $\beta_a$ | beta_a | Regression 2 (3.11) Regression 4 (3.20) | $\bar{\beta}_1^l$ is generated from Regression 4(col): Reg4_Coef_sLQD $\beta_{AGZ}$ is generated from Regression 2: Reg2agy_Coef_sAGZ, Reg2agy_Coef_sAGZ mat10, Reg2agy_Coef_sAGZ hy, Reg2agy_Coef_sAGZ mat10hy, $\bar{\beta}_1^l$ is generated from Regression 4: Reg4agy_Coef_sAGZ | Bond | | √ | | |
| Final HYG-LQD Beta calculated by using $\beta_{HYG-LQD}$ and the cell-average coefficient $\bar{\beta}_1^h$ | $\beta_h$ | beta_h | Regression 2 (3.8) Regression 5 (3.17) (3.21) | $\beta_{HYG-LQD}$ is generated from Regression 2 (betaH1): Reg2_Coef_sHL, Reg2_Coef_sHLhy, Reg2_Coef_sHLrat, Reg2_Coef_sHLhyrat, Reg2_Coef_sHLmat 10, Reg2_Coef_sHLmat 10hy, Reg2_Coef_sHLmat 10hyrat $\bar{\beta}_1^h$ is generated from Regression 5 (coh): Reg4_Coef_sHL | Bond | | √ | | |
| For Agency: Final IEI-AGZ Beta calculated by using $\beta_{IEI-AGZ}$ and the cell-average coefficient $\bar{\beta}_1^i$ | $\beta_i$ | beta_i | Regression 2 (3.12) Regression 5 (3.22) | Reg2agy_Coef_sIA, Reg2agy_Coef_sIAhy, Reg2agy_Coef_sIAm at10, Reg2agy_Coef_sIAm at10hy | Bond | | √ | | |
| Final TLT-IEI Beta, remained as the same as the original TLT-IEI Beta | $\beta_m$ | beta_m | Regression 2 (3.9) | Reg2_Coef_sLM10a | Bond | | √ | | |
| For Agency: Final TLT-IEI Beta, remained as the same as the original TLT-IEI Beta | $\beta_{m\_agy}$ | beta_m | Regression 2 (3.13) | Reg2agy_Coef_sLM 10a | Bond | | √ | | |
| Issue-level transaction cost coefficient | $\widetilde{\beta_1}$ | copi | Regression 6 (3.25) | Reg6_Coef_stc | Bond | √ | | | |
| Issue-level transaction cost standard error | $\sqrt{\sigma^2(\widetilde{\beta_1})}$ | sepi | Regression 6 (3.25) | Reg6_Se_stc | Bond | √ | | | |
| Issue-level market adjustment coefficient | $\widetilde{\beta_2}$ | coe | Regression 6 (3.25) | Reg6_Coef_seft2 | Bond | √ | | | |

TABLE 6-continued

Outputs from Section 3

| Objective | Variable Name (in model) | Output (in Stata code) | Regression No./Function | Coefficient Name | Data Identity | TC | MA | VE | RT |
|---|---|---|---|---|---|---|---|---|---|
| Issue-level market adjustment standard error | $\sqrt{\sigma^2(\widetilde{\beta_2})}$ | see | Regression 6 (3.25) | Reg6_Se_etf2 | Bond | | √ | | |
| Market adjustment multiplier estimated from COE | $(0.9 * (1 + (\widetilde{\beta_2} - 1) * \max(0, \min(1, 1 - 3 * \sqrt{\sigma^2(\widetilde{\beta_2})})))$ | emult | (3.29) | coe, see | Bond | | √ | | √ |
| Estimated value of Y by using the coefficients times variables coming with the trades | $\hat{Y}$ | py | Regression 7 (4.5) | Reg7_Coef_x, Reg7_Coef_udx, Reg7_Coef_dx, Reg7_Coef_xLnft, Reg7_Coef_xLnt, Reg7_Coef_xfq, Reg7_Coef_xig, Reg7_Coef_xsame, Reg7_Coef_xpos | Trade | | | √ | √ |
| New estimated value of Y₂ by using the overnight coefficients times variables coming with the trades | $\hat{Y}_2$ | py | Regression 7 (4.8) | Reg72-Coef_x2, Reg72-Coef_x2ud, Reg72-Coef_x2Lnft, Reg72-Coef_x2Lnt, Reg72-Coef_x2fq, Reg72-Coef_x2ig, Reg72-Coef_x2pos | Trade | | | √ | √ |

TABLE 7

Variables Mapping for Section 4

| Objective | Variable Name (in model) | Output (in Stata code) | Regression No./Function | Coefficient Name | Data Identity | TC | MA | VE | RT |
|---|---|---|---|---|---|---|---|---|---|
| Large dealer buy transaction cost | ldb | ldb | | py3, cop, sep | Trade | √ | | | √ |
| Issue-level large dealer buy transaction cost | ldb2 | ldb2 | | tc, copi, sep | Trade | √ | | | √ |
| Rescaled transaction cost | tc | tc | Regression 5 (3.18) | py3, cop, sep | Trade | √ | | | √ |
| Final transaction costs adjustment | tc₃ | tc₃ | (3.28) | tc, copi, sep | Trade | √ | | | √ |
| Rescaled market adjustment | etf2 | etf2 | Regression 5 (3.23) | beta_1, sLQD, beta_h, sHL, beta_m, sLM10a | Bond | | √ | | √ |
| Final market adjustment | eft23 | etf23 | (3.29) | etf2, emult | Bond | | √ | | √ |
| Adjusted price | $P_{adj}$ | adjp | | adjp = price − tpred2 | | | | | |
| Baseline price | $P5_{adj}$ | adjp5 | Regression 7 (3.30) | adjp5 = (adjp + l.adjp +l2.adjp + l3.adjp + l4.ajdp)/5 | Trade | | | √ | |
| Interdealer indicator | $I_d$ | dealer | Regression 7 (3.34) | dx = x * dealer Reg7_Coef_dx | Trade | | | √ | |
| Unpaired interdealer indicator | $U_d$ | udealer | | udx = x * udealer Reg7_Coef_udx | Trade | | | √ | |

TABLE 7-continued

Variables Mapping for Section 4

| Objective | Variable Name (in model) | Output (in Stata code) | Regression No./Function | Regression Coefficient Name | Data Identity | TC | MA | VE | RT |
|---|---|---|---|---|---|---|---|---|---|
| Log differences in time between trade t + 1 and t | $T_{d1}$ | ln(fs.dt/1000) | Regression 7 (3.34) | xlnft = x * ln(fs.dt/1000) Reg7_Coef_xLnft | Trade | | | √ | |
| Log differences in time between t and t − 1 | $T_{d2}$ | ln(s.dt/1000) | Regression 7 (3.34) | xlnft = x * ln(s.dt/1000) Reg7_Coef_xLnt | Trade | | | √ | |
| Investment grade indicator | $IG_d$ | Sprat > 10 | Regression 7 (3.34) | xig = x * (Sprat > 10) Reg7_Doef_xig | Trade | | | √ | |
| Average trade size | $T_s$ | w/trades | Regression 7 (3.34) | xfq = X * w/trades Reg7_Coef_xfq | Trade | | | √ | |
| The indicator variable for trade t and t − 1 occurring on the same calendar day | I | dofc(dt)==dofc(l.dt) | Regression 7 (3.34) | xsame = x * (dofc(dt)==dofc(l.dt)) Reg7_Coef_xsame | Trade | | | √ | |
| Sum of Slide and Paired | Sum | pos | Regression 7 (3.34) | xpos = x * pos Reg7_Coef_xpos | Trade Trade | | | √ √ | |
| Difference between the baseline price and the predicted next-trade price as of trade t | X | x | Regression 7 (3.32) | adjp, etfpred2, adjp5, cetfpred2 | | | | √ | |
| Difference between the baseline price and trade t + 1's transaction cost and market-adjusted prices | Y | y | Regression 7 (3.31) | Reg7_Coef_x, Reg7_Coef_udx Reg7_Coef_dx Reg7_Coef_xLnft Reg7_Coef_xfq Reg7_Coef_xig Reg7_Coef_xsame Reg7_Coef_xpos | Trade | | | √ | |
| Estimated value of Y by using the coefficients times variables coming with the trades | $\hat{Y}$ | py | Regression 7 (4.5) | | Trade | | | √ | √ |
| Prediction of transaction cost and market adjusted price | PredPrice(t) | pprice | Regression 7 (4.6) | adjp5, etfpred2 | Trade | | | √ | √ |
| New difference between the baseline price and the predicted next-trade price | $X_2$ | x2 | Regression 7 (4.7) | pprice | Trade | | | √ | √ |
| New difference between the baseline price and trade t + 1's | $Y_2$ | y2 | Regression 7 | Note: adjp, pprice, etfpred2 Reg72_Coef_x2, Reg72_Coef-x2ud, Reg72_Coef-x2Lnft, Reg72_Coef-x2fq, | Trade | | | √ | √ |

TABLE 7-continued

Variables Mapping for Section 4

| Objective | Variable Name (in model) | Output (in Stata code) | Regression No./Function | Coefficient Name | Data Identity | TC | MA | VE | RT |
|---|---|---|---|---|---|---|---|---|---|
| transaction cost and market-adjusted prices | | | | Reg72_Coef-x2ig Reg72_Coef-x2pos | | | | | |
| New estimated calue of $Y_2$ by using the overnight coefficients times variables coming with the new trades | $\hat{Y}_2$ | py2 | Regression 7 (4.8) | | Trade | | | √ | √ |
| New prediction of transaction cost and market-adjusted prices | PredPrice2 | pprice2 | Regression 7 (4.9) | pprice, etfpred2, py2 | Trade | | | √ | √ |
| Model Bid Price | Model Bid Price | mbid (this variable may not be included in coding) | (4.11) | Model Mid Price, ldb (or ldb2 or ldb3) | Trade | | | √ | √ |
| Model Mid Price | Model Mid Price | mmid (this variable may not be included) | (4.10) | pprice, pprice 2 | Trade | | | √ | √ |
| Model Ask Price | Model Ask Price | mask (this variable may not be included) | (4.12) | Model Mid Price, Model Bid Price | Trade | | | √ | √ |

4. Daily Real-Time Process

Figure 5:
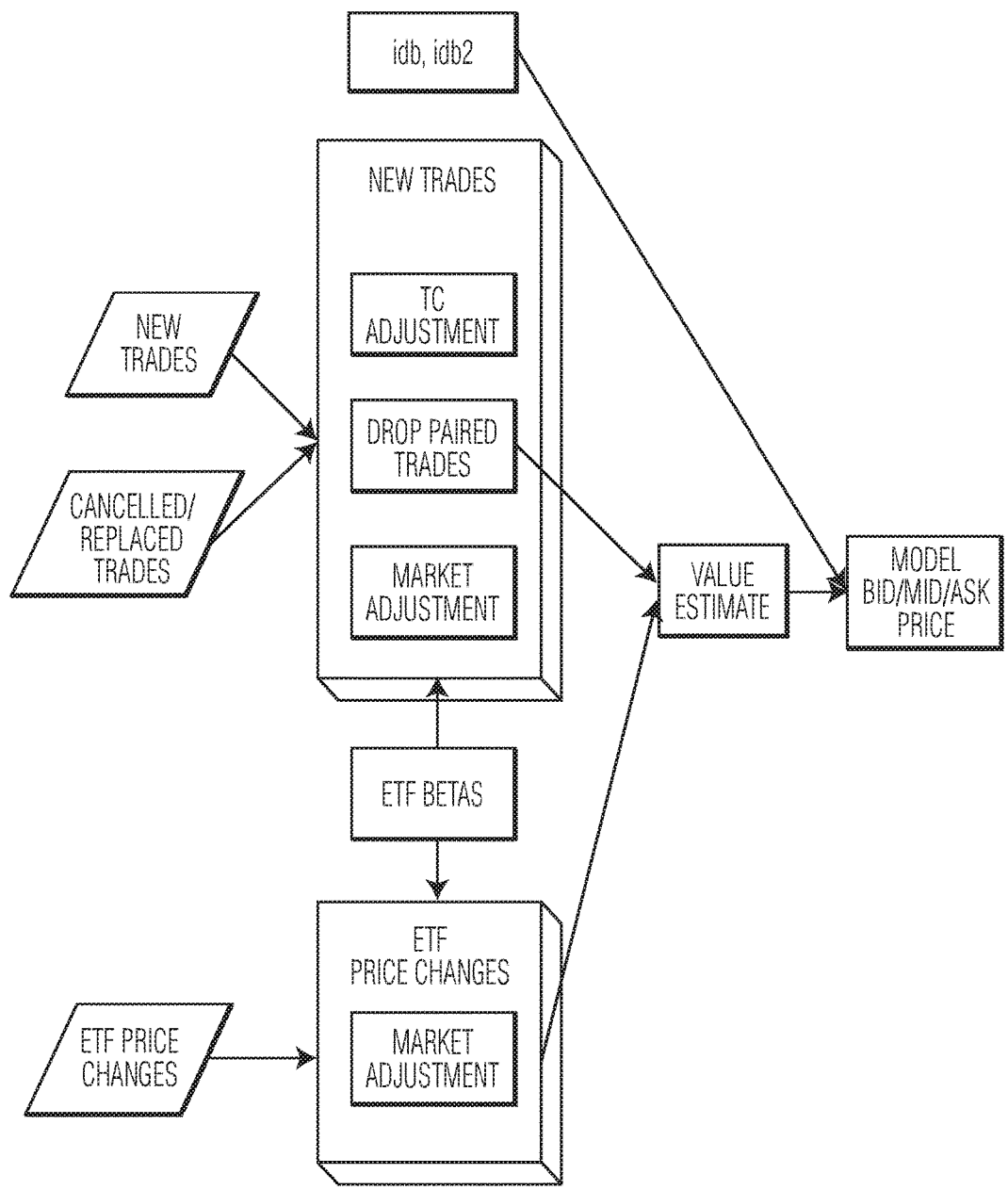
FIG. 5 depicts an exemplary workflow for the real model value estimation.

The real time model value estimation may be run in response to three triggers—new trades, cancelled/replaced trades, or in response to ETF price changes. FIG. 5 depicts an exemplary workflow for the real model value estimation. The logic of the above process is as the following:

- At the beginning of each day, use overnight regression (Regression 1, Regression 3, Regression 6) to calculate ldb (tc for large dealer buy only) and ldb2 (tc3 for large dealer buy only), by setting variables of trade features $S_d=-1$, $S_z=0$, and p=0 (In Stata code, the variables are set as tt=−1, fq=0, dtt=0). ldb and ldb 2 are calculated regardless of whether a large dealer buy trade to transaction cost adjusted is obtained, and they are used to generate bid model price from the mid model price. Calculation details are described in Section 4.4.
- At the beginning of each day, overnight regression may be used—Regression 2 to calculate out-of-sample betas, and blend these betas with cell-level betas. Save these ETF betas for calculation of market adjustments and keep betas consistent intraday. Betas calculations are in Section 4.5.
- Model pricing is updated in the following two scenarios:
  - New Trades: When a new trade comes in, the value estimation model may be updated with the new trade features, i.e., using coefficients from overnight regression to multiply the trade feature variables and calculate transaction cost adjusted prices, drop paired trades, and calculate market adjusted prices (Note: no need to run any regression in real-time process). Also, to determine if cancelled/replaced trades occur, and if so, update the value estimation model as if triggered by a new trade. Calculation details are in Section 4.6..
  - ETF Price Changes: When ETF price changes, the transaction costs adjustment keeps the same, and only market adjustment may be updated by adding the updated market adjustment to the most recent value estimate, i.e., the most recent model mid-price. Calculation details are in Section 4.7..
- With tc and market-adjusted trade prices updated when the above two scenarios occur, these adjusted trade prices are used to generate model bid/mid/ask price together with ldb or ldb2 which have been calculated in the first step.

Details and calculation methods of the above process is described in the following sections.

4.1 Minimum Requirements of Intraday Calculation

Intraday Model prices are to be calculated for the universe of bonds which:

(a) Have TRACE trades, and (b) Are not matured—OR—are matured but are in default Overnight regression includes matured securities which have TRACE trades within the TRADE-WINDOW (where the window is currently 4 years). To calculate the first model price, at least six trades may be used to run the overnight regression. And to generate model price at real-time, besides these six trades, the seventh trade may need to happen the next day to trigger the intraday calculation on model price. For example, there are several possible cases:

With at least six trades today, and the overnight regression is run by using these trades and saving the coefficients.

The next day, calculate the first model price cannot be calculated until a new trade comes in.

With at least six trades today, and the overnight regression is run by using these trades and saving the coefficients. The next day, there may not be a new trade but the ETF price changes. In this case, the first model price still cannot be calculated.

The first model price may only be calculated when there is at least six trades today, and the overnight regression is run by using these trades and save the coefficients. With the seventh trade the next day (or several days later), the coefficients to generate the first model price can be used.

4.2 Collapse Trades to CUSIP*Second Level

Trades are reduced to the CUSIP*second level. Calculate the average characteristics of trades executed each second, for each CUSIP. For each CUSIP*second, take a weighted average of data for all trades executed that second (including those that are eventually replaced or cancelled). Trades are weighted by $$\ln\left(\frac{Lotsize}{\$100}\right).$$

The variables to be averaged are:
Transaction cost adjusted price.
Interdealer trade indicator variable.
Unpaired interdealer trade indicator variable.
Log size—See Section—4.6.4.4. for calculation details as variable "Average Trade Size."
Investment grade indicator.
Side+Paired.
Variables that are needed but may not vary within CUSIP*second are:
Cumulative market adjustment.
Date and Time.

4.2.1 Aggregated Trade Variables

As shown above, trades are reduced to the CUSIP*second level. If multiple trades occurred in one second, results of aggregated trade are published within that second, i.e., weight-averaged aggregation of all trades in that second. Here is the list of the aggregated trade variables:
Transaction cost adjusted price: calculated in Section 4.4.4.2. by using the weight 1n(lotsize/$100).
Aggregated trade price: when trade price is displayed on the bond-level screen, it may be the aggregated trade price, i.e., weight-averaged trade price of all the trades in that second.
Trade-to-trade price change: this is calculated by using aggregated trade price on CUSIP*second level.
Model price: there is only one model price for each second and trades are aggregated before calculating model price.

4.3 Overnight Regression Run

There are seven additional parameters used an exemplary overnight regression code, which are based on input variable "yq":
int minM—the minimum of month for regression rolling window and available regression coefficients. This is the minimum value for "yq", currently it is 109. To provide room for regression, minM may be at least two months later than the 1$^{st}$ data available month, e.g., if the 1$^{st}$ month in which data is available is 107(=1+106) then minM may be at least 109. And minM is configurable.
int fromM—the smallest "yq" value for over-night regression run e.g. 109. It can be greater than 109 but cannot be smaller than 109.
int toM—the largest "yq" value for over-night regression run e.g. 150.
int outputMktM—value of month the regression coefficients are required. It is usually the same value as "toM" i.e. the latest regression coefficients. (month-index for market level coefficients)
int outputBndM—month-index for bond level coefficients
m1Reg7—month-index for Regression 7 step 1 coefficients
m2Reg7—month-index for Regression 7 step2 coefficients
Calculation and relationship of the above seven additional parameters:
minM=min(yq)
fromM=min(yq)
toM=max(yq)
outputMktM=max(yq)
outputBndM=max(yq)
m1Reg7=max(yq)
m2Reg7=max(yq)

4.4 Calculate ldb and ldb2 ldb and ldb2 may only be updated once daily, i.e., ldb and ldb2 may be calculated at the beginning of each day and keep them the same the rest of the day regardless of whether a new trade is obtained during the day or whether there is large dealer buy trade intraday. ldb and ldb2 can be generated by the following sections. ldb and ldb2 are special case for tc and tc3, i.e., they are tc and tc3 only for large dealer buy trades. So the base calculation and formula used are the same as to tc and tc3, for large dealer buy trades, some of the terms may be zero and cancelled in the calculation.

4.4.1 Calculate Out-of sample Transaction Cost

From overnight regression—Regression 1, 24 coefficients have been saved:
$\beta_j$, j=1, . . . , 24. Set the values of all trade feature variables in the regression equation as:
$S_d$=−1 (tt=−1)
$S_z$=0 (fq=0)
P=0 (dtt=0)
$I_1^s$32 0 (ttpos=0)
$I_1^P$=0 (dttpos=0)
For each bond, using each coefficient times its related trade/bond feature variable, and then sums them up as (this equation has been simplified from equation (3.2) by plugging in the above variables to cancel several terms):
$C_{O_{original}}$=−Reg1_Coef_tt −Reg1_Coef_ttrat * R −Reg1_Coef_ttmat15 * $YTM_{15}$ 4.4.1.1. Truncate Out-of-sample Transaction Cost Keep the trade feature variables constant as:
$S_d$=−1 (tt=−1)
$S_z$=0 (fq=0)
p=0 (dtt=0)
$I_1^s$=0 (ttpos=0)
$I_1^P$=0 ($d_{ttpos}$=0)
Calculate the truncation of out-of-sample predicted transaction costs by the following equation:

$$C_o=(-1) * \max(0.05,\min(2.5 * Reg1\_Coef9\_ttfq, -C_{O\_original}))$$

where Reg1_Coef9_ttfq is from the nine-parameter TC regression in Regression 1 (Take regression of the first nine independent variables, and use the coefficient on Side * Size)

4.4.1.2. Blend the Cell Coefficients (Calculate ldb)

For each bond, by using the maturity * credit cells, blend the truncated out-of-sample predicted transaction costs generated above with cell coefficients from Regression 3:

ldb=$C_O$ * (1+(BldReg3_Coef_spy3−1) * (0.8−0.3 * Max(0,Min(1,BldReg3_Se_spy3 * 100 −100 ))))

$C_O$ is from the above, Section 4.4.2.

BldReg3_Coef_spy3 and BldReg3Se_spy3 are cell-average coefficient and standard error blended with Regression 3 Coefficient/Standard Error and the bond's cell weightings.

4.4.1.3. Calculate Final Transaction Cost Adjustment (Calculate ldb2)

For each bond, use tc from the above times the issue-level multiplier to obtain the final transaction cost adjustment tc3:

ldb2=ldb * (1+(Reg6_Coef_stc−1) * max(0, min(1, 0.5−0.25 * 1n(8 * Reg6_Se_stc)))) ldb is from the above, Section 4.4.3.

Reg6_Coef_stc and Reg6_Se_stc are coefficient and standard error from Regression 6.

4.5 Calculate Betas

From overnight regression—Regression 2, 18 coefficients have been saved:

$\beta_j$, j=1, . . . , 18. Use these coefficients to calculate out-of-sample betas at the beginning of each day, and keep them consistent on intraday trades. Please see Appendix F for calculation details, ETF betas may be generated overnight. These Bond Betas may be used to calculate market adjustments, i.e., etf2 and etf23, in Section 4.6. and Section 4.7.. Bond Betas (beta_1, beta_m, beta_h) may also be needed in Model Pricing Phase Two for calculation of squared change of etf2 and etf23.

4.6 Updating in Response to New Trades 4.6.1 Calculate Transaction Cost Adjustment After a new trade or group of new trades occurs, the prices are transaction cost adjusted using the coefficients from the transaction cost model, i.e., Regression 1. Calculate the transaction cost adjustment by using the coefficients from overnight regression, multiplying the new trade features and summing them up. The process is similar as ldb and ldb2 calculation in Section 4.4., and the only difference is new trade feature variables are used in the calculation, instead of setting their values into constants.

4.6.2 Calculate Out-of-sample Transaction Cost

From overnight regression—Regression 1, saved 24 coefficients have been saved: $\beta_j$, j=1, . . . , 24. When a new trade comes in, using each coefficient times its related trade/bond feature variable, and then sums them up as:

$C_{O_{original}}$=Reg1_Coef_tt * $S_d$ +Reg1_Coef_dtt * P +Reg1_Coef_ttfq * $S_d$ * $S_z$ +Reg1_Coef_dttfq * P * $S_z$ +Reg1_Coef_fq * $S_z$ +Reg1_Coef_ttpos * $I_1^S$ +Reg1_Coef_dttpos * $I_1^P$ +Reg1_Coef_ttposfq * $S_z$ * $I_1^S$ +Reg1_Coef_dttposfq * $S_z$ * $I_1^P$ +Reg1_Coef_ttrat * $S_d$ * R + Reg1_Coef_ttmat15 * $S_d$ * $YTM_{15}$ + Reg1_Coef_ttposrat * $I_1^S$ * R + Reg1_Coef_ttposmat15 * $I_1^S$ * $YTM_{15}$ + Reg1_Coef_ttfqrat * $S_d$ * $S_z$ * R + Reg1_Coef_ttfqmat15 * $S_d$ * $S_z$ * $YTM_{15}$ + Reg1_Coef_ttfqmat15rat * $S_d$ * $S_z$ * R * $YTM_{15}$ + Reg1_Coef_dttfqrat * P * $S_z$ * R + Reg1_Coef_dttfqmat15 * P * $S_z$ * $YTM_{15}$ + Reg1_Coef_dttfqmat15rat * P * $S_z$ * R * $YTM_{15}$ +Reg1_Coef_ttposfqrat * $I_1^S$ * $S_z$ * R + Reg1_Coef_ttposfqmat15 * $I_1^S$ * $S_z$ * $YTM_{15}$ + Reg1_Coef_ttposfqmat15rat * $I_1^S$ * $S_z$ * R * $YTM_{15}$ +Reg1_Coef_dttposfqrat * $I_1^P$ * $S_z$ * R +Reg1_Coef_dttposfqmat15 * $I_1^P$ * $S_z$ * $YTM_{15}$ 4.6.3 For Agencies: Calculate Out-of-sample Transaction Cost For Agencies, the 15 parameter regression model is used in Regression 1, instead of the 24 parameter in IG/HY as above, i.e., $\beta_j$, j=1, . . . , 15. The 15 parameter regression model may only remove terms with rating variable R from the 24 parameter regression model in Section 3.1..1.1., thus, coefficients from the 15 parameter overnight regression model may be used and do the arithmetic calculation as:

$C_{O_{original}}$=Reg1agy_Coef_tt * $S_d$ +Reg1agy_Coef_dtt * P +Reg1agy_Coef_ttfq * $S_d$ * $S_z$ +Reg1agy_Coef_dttfq * P * $S_z$ +Reg1agy_Coef_fq * $S_z$ +Reg1agy_Coef_ttpos * $I_1^S$ +Reg1agy_Coef_dttpos * $I_1^P$ * If +Reg1agy_Coef_ttposfq * $S_z$ * $I_1^P$ +Reg1agy_Coef_dttposfq * $S_z$ * $I_1^P$ +Reg1agy_Coef_ttmat15 * $S_d$ * $YTM_{15}$ +Reg1agy_Coef_ttposmat15 * $I_1^S$ * $YTM_{15}$ +Reg1ag_Coef_ttfqmat15 * $S_d$ * $S_z$ * $YTM_{15}$ +Reg1agy_Coef_dttfqmat15 * P * $S_z$ * $YTM_{15}$ +Reg1agy_Coef_ttposfqmat15 * $I_1^S$ * $S_z$ * $YTM_{15}$ + Reg1agy_Coef_dttposfqmat15 * $I_1^P$ * $S_z$ * $YTM_{15}$ 4.6.4 Truncate Out-of-sample Transaction Cost By using the same trade feature variables, calculate the truncation of out-of-sample predicted transaction costs by the following equation:

$C_o$=Sign($S_d$+P) * max(0.05,min(2.5 * Reg1_Coef9_ttfq,Sign($S_d$+P) * $C_{O\_original}$)), if ABS ($S_d$+P)=1 where Reg1_Coef9_ttfq is from the nine-parameter TC regression in Regression 1(Take regression of the first nine independent variables, and use the coefficient on Side * Size)

If ABS($S_d$+P)≠1, truncation may not need to be performed to the out-of-sample transaction cost, $C_o=C_{O\_original}$.

4.6.5 Blend the Cell Coefficients (Calculate tc̃)

For each bond, by using the maturity * credit cells, blend the truncated out-of-sample predicted transaction costs generated above with cell coefficients from Regression 3-5:

tc=$C_O$·(1+(BldReg3_Coef_spy3−1) * (0.8−0.3 * Max(0,Min(1,BldReg3_Se_spy3 * 100−100))))

$C_O$ is from the above, Section 4.6.1.3.

BldReg3_Coef_spy3 and BldReg3_Se_spy3 are cell-average coefficient and standard error blended with Regression 3 Coefficient/Standard Error and the bond's cell weightings.

4.6.6 Calculate Final Transaction Cost Adjustment (Calculate tc3)

For each bond, use tc from the above times the issue-level multiplier to obtain the final transaction cost adjustment tc3:

$tc_3$=tc * (1+(Reg6_Coef_stc−1) * max(0,min(1,0.5− 0.25 * 1n(8 * Reg6_Se_stc))))

tc is from the above, Section 4.6.1.4.

Reg6_Coef_stc and Reg6_Se_stc are coefficient and standard error from Regression 6

4.6.6.1. Assumption: Paired Clients Trades are dropped in real time

Paired clients trades are dropped as 2.3.2. defined as the following: an interdealer trade is identified as paired if it shares the same CUSIP, with execution time in the same second, and lot size with a client trade. Then client trades that are paired with interdealer trades are dropped, but the interdealer trade is retained.

4.6.6.2. Calculate Market Adjustment for the Trade

After calculated transaction cost adjustment has been calculated when a new trade occurs, market adjustment is calculated by using ETF price changes (ETF price differences between current ETFs and ETFs at last trade time).

4.6.7 Calculate Market Adjustments Using Betas from Regression 2

Market adjustments are calculated by using betas generated from overnight regression, i.e., $\beta_l$, $\beta_h$, $\beta_m$. Using these betas times the ETF price changes and sums them up as the following equation shows:

etf2(s,s−1)=β$_l$×(1n(LQD(s))−1n(LQD(s−1))) +β$_h$×(1n(HYG(s))−1n(LQD(s))−1n(HYG(s−1))+1n(LQD(s−1))) +β$_m$×(1n(TLT(s))−1n(IEI(s))−1n(TLT(s−1))+1n(IEI(s−1)))

where s is the time when new trade occurs, and s−1 is the time when last trade occurs.

4.6.8 For Agencies: Calculate Market Adjustments Using Betas from Regression 2

Similarly as Section 4.6.3.1. above, for agencies, only replace ETF tickers in the equation as:

etf2$_{agy}$(s, s−1)=β$_a$×(1n(AGZ(s))1n(AGZ(s−1))) +β$_i$×(1n(IEI(s))−1n(AGZ (s))−1n((s−1))+1n(AGZ(s−1))) +β$_m$×(1n(TLT(s))−1n(IEI(s))−1n(TLT(s−1))+1n(IEI(s−1)))

where s is the time the new trade occurs, and s−1 is the time the last trade occurs.

4.6.9 Calculate Issue-Level Market Adjustments

Market adjustments are adjusted by issue-level multiplier as:

etf23(s,s−1)=etf2(s,s−1) * (0.9 * (1+ (Reg6_Coef_etf2(t)−1) * max(0, min(1,1−3 * Reg6_Se_etf2(t)))))

where t is the time when overnight regression runs, s is the time when new trade occurs, and s−1 is the time when last trade occurs etf2 is from the above, Section 4.6.3.1. Reg6_Coef_etf2,Reg6_Se_etf2 are coefficient and standard error from Regression 6

4.6.9.1. Update Value Estimation for the Trade

For a bond with trades at {s, s−1,s−2,s−3,s−4,s−5} during the 6 month window, tc3 and etf23 are generated as above to calculate transaction cost and market adjusted prices in value estimation process. Please see Section 3.6.2.2. for the definition of 6 month window in Regression 7.

In value estimation, all trades are reduced to the CUSIP*second level. In other words, the log differences in time below are set to seconds.

4.6.10 Collapse Multiple Trades at CUSIP*Second

As Section 4.2. shows, when new trades come in, multiple trades are collapsed at CUSIP*second level in the first step. This implies that there may be only one adjusted price for each CUSIP*second level. For each atomic trade, the adjusted price can be calculated as:

P$_{adj}$(s)=p(s)−tc3(s)

If multiple trades occurred in the same second, they may be collapsed in the same second into an average price. For example, assuming there are i trades occurred at the same second s, then the calculation of adjusted price at time s shown as above may be:

$$P_{adj}(s) = \frac{\ln\left(\frac{lotisize(1)}{\$100}\right)*(p(1)-tc3(1)) + \ln\left(\frac{lotisize(2)}{\$100}\right)*(p(2)-tc3(2)) + \ldots + \ln\left(\frac{lotisize(i)}{\$100}\right)*(p(i)-tc3(i))}{\ln\left(\frac{lotisize(1)}{\$100}\right) + \ln\left(\frac{lotisize(2)}{\$100}\right) + \ldots + \ln\left(\frac{lotisize(i)}{\$100}\right)} \quad (4.2)$$

4.6.11 Define Adjusted Price and Baseline Price

A baseline price is calculated as the simple average of transaction cost and market adjusted prices from the last 5 CUSIP*seconds with trades:

$$P5_{adj}(s) = \frac{P_{adj}(s) + P_{adj}(s-1) + P_{adj}(s-2) + P_{adj}(s-3) + P_{adj}(s-4)}{5}, \quad (4.3)$$

where adjusted price P$_{adj}$(s) are obtained as Section 4.6.4.1. above. Adjusted price may be saved for all observed trades for the use of calculating a baseline price.

4.6.12 Define Price Difference X

Define a variable X as the difference between trade t's transaction cost and market-adjust price and the baseline price. X is calculated as:

X=P$_{adj}$(s)−P5$_{adj}$(s−1)−MktA(s−5,s)  (4.4)

Where:

MktA(s=5,s)=etf23(s,s−1) +0.8 * etf23(s−1, s−2) +0.6 * etf23(s2, s3) +0.4 * etf23(s−3, s−4) +0.2 * etf23(s−4, s−5)  (4.5)

4.6.13 Calculate Estimated Value of Predicted Price Difference Y

Define a variable Y as the difference between trade t+1's transaction cost and market-adjusted price and the baseline price. Y is estimated by running Regression 7 on a set of independent variables. After a new trade occurs, using coefficients from overnight regression—Regression 7 multiplies related variables as the estimated value of Y (Note coefficients are saved from last night and held constant throughout each day, which is the same as other coefficients from Regression 1-6), denoted as $$\hat{Y} = \sum_{j=1}^{9} \hat{\beta}_j \times a_j.$$

The detailed equation is as the following:

Ŷ=Reg7_Coef_x * X +Reg7_Coef_dx * X * I$_d$ +Reg7_Coef_udx * X * U$_d$ + Reg7_Coef_xLnft * X * T$_{d1}$ +Reg7_Coef_xLnt * X * T$_{d2}$ +Reg7_Coef_xig * X * IG$_d$ +Reg7_Coef_xfq * X * T$_s$ + Reg7_Coef_xsame * X * I +Reg7_Coef_xpos * X * Sum  (4.6)

where the independent variables in the above regression are defined as:

I$_d$-Interdealer trade indicator variable =

$$\begin{cases} 1, \text{if the trade is an interdealer trade} \\ 0, \text{otherwise} \end{cases}$$

U$_d$-Unpaired interdealer trade indicator variable =

$$\begin{cases} 1, \text{if the trade is an unpaired interdealer trade} \\ 0, \text{otherwise} \end{cases}$$

T$_{d_1}$—Log differences in time between trade t+1 and t, defined in Stata code 1n(fs.dt/1000), this is defined on the CUSIP*second level, so the difference in time is measured in seconds; trade t+1 is the current time when new trade comes in, and trade t is the most recent trade before this new trade. (Note: execution time dt is measured in milliseconds (so fs.dt/1000 has the unit of seconds), and if they are not on the same trading day, appropriate rules of conversion may be applied, i.e., 1 day=24 * 60 * 60 seconds. According to an embodiment, this variable is coded as double Td1=log(T2−T1), where T2 and T1 are absolute trade execution times in seconds)

Note: Td1 is the log differences between next trade t+1 and the current trade t, except for the last row when (t+1) is current "calculation time" presented in the file as timestamp.

Figure 6:
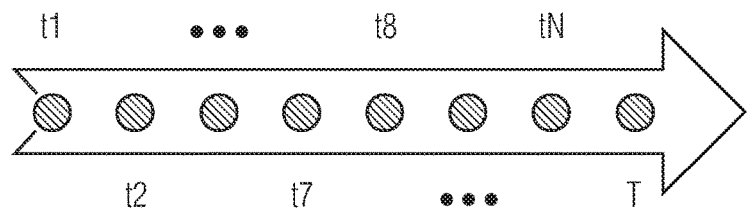
FIG. 6 depicts an exemplary timeline for when model price is triggered to be updated at some time T.

FIG. 6 depicts an exemplary timeline for when model price is triggered to be updated at some time T, and all the previous trades may be collapsed to CUSIP*seconds level to obtain the aggregated trades happened at t1, . . . , tN (tN<T).

First model price is available from the seventh trade at t7. So Td1 for t7 is defined as log(t8−t7), . . . Td1 for tN−1 is log(tN−tN−1). And for tN, Td1 is defined as log(T−tN), where T is the current "calculation time". And this is defined as what the bond price would be if there was a trade at the current calculation time T. In addition, model price at T equals to model price tN+market adjustment from tN to T, i.e., 1n(ETF(T)−1nETF(tN)). For example, there is a trade occurred at 9:55:00, then model price gets updated at 9:55:01. At the evaluation time, say 10:00:00, the new model price may be the updated model price at 9:55:01 plus market adjustment between 9:55:01 and 10:00:00.

Implementation Note: Td1 is set to be zero for all trades including the last one, which may use the following formula:

Td1_t=1n((t+1)−t)=1n(1)=0(hardcoded to be 0)
Td2 =1n(−s)

$T_{d_2}$—Log differences in time between trade t and t−1, defined in Stata code 1n(s.dt/1000), this is also defined on the CUSIP*second level, and the difference in time is measured in seconds; trade t is defined as the most recent trade before this new trade at current time, and trade t-1 is the last trade before the most recent trade $IG_d$-Investment Grade indicator variable =

$$\begin{cases} 1, \text{ if the trade is an } investmetn \text{ grade trade} \\ 0, \text{ otherwise} \end{cases}$$

$T_s$—Average trade size (Aggregated lotsize). This is defined and calculated as $$T_s = \frac{\sum w_i}{n},$$

where n equals the number of trades occurred in the same CUSIP*second, and $$w = \ln\left(\frac{lotsize}{100}\right), \text{ and}$$

$$w = \ln\left(\frac{lotsize}{100}\right) + \ln(2) \text{ if } lotsize = 5000000 \text{ or } lotsize = 1000000,$$

and MAquantityindicator="E" (this is defined in Section 2.5., MAquantityindicator indicates if the reported TRACE quantity is truncated, and "E" for estimated if truncated) Note: lotsize may be truncated at $5M and $1M, and weighted it as if it really was twice that size. The Stata code for this process is:
/* Log linear weight with a bonus for truncated values */
gen w=1n(lotsize/100)
replace w=w+1n(2) if
(lotsize==500000|lotsize==1000000)
&MAquantityindicator=="E" drop MAquantityindicator So if a lotsize is at $5M or $1M with a "E" as estimated if truncated, the weight formula as w=w +1n(2) is used.
The weights in MP1 and MP2 may use the similar weight calculation in all CUSP*second averaging.

$I$-Indicator variable for trade $t$ and $t − 1$ occurring on the same calendar day =

$$\begin{cases} 1, \text{ if trade } t \text{ and } t − 1 \text{ occurring on the same calendar day} \\ 0, \text{ otherwise} \end{cases}$$

Sum−Sum of Side and Paired=$S_d$+P=tt+dtt
Calculate Predicted Price

Now, since the estimated value Y was calculated in previous section 4.6.4.4., the predicted price can be obtained:

$$PredPrice(s)P5_{adj}(s, s-1)+MktA(s-5s)+\hat{Y} \quad (4.7)$$

Where:

MktA(s5,s)=etf23(s, s−1) +0.8 * etf23(s−1,
s−2) +0.6 * etf23(s−2, s−3) +0.4 * etf23(s−3,
s−4) +0.2 * etf23(s−4, s−5)

Note: For Y only, trades that are eventually cancelled or replaced are not considered.
4.6.14 Calculate New Price Difference $X_2$ and New Predicted Price Construct a new baseline price and average the predicted next-trade price as the following:

$X_2$=PredPrice(s)−PredPrice(s−1), predicted price
PredPrice(s) is obtained from the above, Section
4.6.4.3. (4.8)

Then this new price difference $X_2$, and the coefficients from overnight regression are used in Regression 7 to generate a new estimated value of Y, denoted as $\hat{Y}_2$. The detailed equation is as the following:

$\hat{Y}_2$=Reg72Coef_x2 * $X_2$ +Reg72_Coef_x2ud * $X_2$ *
$U_d$ +Reg72_ x2Lnft * $X_2$ * $T_{d1}$ +
Reg72_Coef_x2Lnt * $X_2$ * $T_{d2}$ +
Reg72_Coef_x2ig * $X_2$ * $IG_d$ +
Reg72_Coef_x2fq * $X_2$ * $T_s$ +
Reg72_Coef_x2pos * $X_2$* Sum (4.9)

where the independent variables in the above regression are defined as:

$U_d$- Unpaired interdealer trade indicator variable =

$$\begin{cases} 1, \text{ if the trade is an unpaired interdealer trade} \\ 0, \text{ otherwise} \end{cases}$$

$T_{d_1}$—Log differences in time between trade t+1 and t, defined in Stata code 1n(fs.dt/1000)
$T_{d_2}$—Log differences in time between trade t and t−1, defined in Stata code 1n(s.dt/1000)

$IG_d$-Investment Grade indicator variable =

$$\begin{cases} 1, \text{ if the trade is an } investmetn \text{ grade trade} \\ 0, \text{ otherwise} \end{cases}$$

$T_s$—Average trade size
Sum−Sum of Side and Paired=$S_d$ +P=tt +dtt

A new predicted price, denoted as PredPrice2(s) is obtained in the following:

$$\text{PredPrice2}(s) = \text{PredPrice}(s-1) + \text{etf23}(s-1,s)\hat{Y}_2(s) \quad (4.10)$$

4.6.15 Calculate Model Mid Price

Model Mid price equals to the average of the predicted next-trade price. A 50-50 ratio is used out-of-sample as a measure of current value for prediction of as the formulae shows:

$$\text{Model Mid Price} = 0.5 * \text{PredPrice}(s) + 0.5 * \text{PredPrice2}(s) \quad (4.11)$$

4.6.16 Calculate Model Bid Price $$\text{Model Bid Price} = \text{Model Mid Price} + \text{ldb3} \quad (\text{ldb3} < 0) \quad (4.12)$$

ldb and ldb2 have calculated in previous section, Section 4.4.. In (4.12), and ldb3=max(−0.26,min(−0.035,ldb)). ldb3 is used in Model Bid Price calculation. 4.6.17 Calculate Model Ask Price $$\text{Model Ask Price} = 2 * \text{Model Mid Price} - \text{Model Bid Price} \quad (4.13)$$

4.7 Update in Response to ETF Price Changes

Another trigger for updating the value estimation in model pricing is ETF price changes. In an exemplary embodiment, ETF data sampled every 15 minutes or more frequent by tick may be used during regular equity trading hours (this may be configurable). If no new trade occurred, but only ETF price differs between different time stamps when the ETF prices are checked, only market adjustment is required to update in this case, i.e., use the same transaction cost adjustment from the most recent trade to update the value estimation in model pricing. In an embodiment, ETF data sample time every 15 minutes may be used, this may be switched to every 5 minutes. As frequent as practical may be used for the production version. In Omega, ETF price may be sampled every 15 minutes. In addition, this quantity is calculated whenever a new trade is observed. To differentiate it from the model bid/mid price generated in Section 4.6. above, where model prices are triggered by new trades, it may be denoted as Model Pred Bid/Mid Price. This may be used in Model Pricing Phase Two as well as in back testing. To do so, view the trade time as a new ETF price change time, denoted as s below.

4.7.1.1. ETF Price Time Window

If the ETF price corresponding to trade time s is not available, use the following default rules to decide which ETF may be used, as also discussed in Section 2, Input Data Preparation:

For the time range of ETFs, the previous ETF may be used, regardless of how far it is. So if there is a trade at 3 am, the most recent ETF closing price may be used. If bond market was open but stock market was closed, the most recent close price, which maybe 1 day or 1.5 day ago, may be used.

For Fair Value, opening price may be avoided. In an exemplary embodiment, use 9:30 snap (which may be the open or may be a few second later) and this may be a better predictor of future prices than the local close. It may be that for bond trades occurring right around 9:30, it is better to append the 9:35 ETF prices.

In an exemplary embodiment, the ETF suspect prices may be excluded, instead the ETF price 5 minutes before (or the most recent one) may be used.

4.7.1.2. Calculate Market Adjustments Using Betas from Regression 2

This follows the same steps in Section 4.6.3.1.-4.6.3.3., using ETF price changes to calculate market adjustments. Market adjustments are calculated by using betas generated from overnight regression—Regression 2 and blended with issue-level betas. Using these betas times the ETF price changes and sums them up as the following equation shows:

$$\text{etf2}(s,s-1) = \beta_l \times (1n(\text{LQD}(s)) - 1n(\text{LQD}(s-1))) + \beta_h \times (1n(\text{HYG}(s)))1n(\text{LQD}(s))1n(\text{HYG}(s-1)) + 1n(\text{LQD}(s-1))) + \beta_m \times (1n(\text{TLT}(s)) - 1n(\text{IEI}(s))) - 1n(\text{TLT}(s-1)) + 1n(\text{IEI}(s-1)))$$

where s is the time when the new ETF prices are checked which triggers the model to update,
while s−1 is the last time ETF prices were checked.

4.7.1.3. For Agencies: Calculate Market Adjustments Using Betas from Regression 2

For agencies, only replace ETF tickers in the above equation as:

$$\text{etf2}_{agy}(s,s-1) = \beta_a \times (1n(\text{AGZ}(s)) - 1n(\text{AGZ}(s-1))) + \beta_i \times (1n(\text{IEI}(s)) - 1n(\text{AGZ}(s)) - 1n(\text{IEI}(s-1)) + 1n(\text{AGZ}(s-1))) + \beta_m \times (1n(\text{TLT}(s)) - 1n(\text{IEI}(s)))31 \ 1n(\text{TLT}(s-1)) + 1n(\text{IEI}(s-1)))$$

where s is the time when the new ETF prices were checked, which triggers the model to update, while s−1 is the last time ETF prices were checked.

4.7.1.4. Update Value Estimation for ETF Price Change

If the model is updated by ETF price changes, only market adjustments may be added that have been calculated above to model mid price (obtained and saved from Section 4.6.) of the most recent trade as:

$$\text{Model Pred Bid Price}(s) = \text{Model Bid Price}(t) + \text{etf2}(s,t) = \text{Model Bid Price}(t) + \text{beta} * (\ln \text{ETF}(s) - \ln \text{ETF}(t)) \quad (4.14)$$

$$\text{Model Pred Mid Price}(s) = \text{Model Mid Price}(t) + \text{etf2}(s,t) = \text{Model Mid Price}(t) + \text{beta} * (\ln \text{ETF}(s) - \ln \text{ETF}(t)) \quad (4.15)$$

where s is the time when we check the new ETF prices, and t is the most recent value estimation. etf2 is calculated by using three betas and its matched ETF prices, shown as in Section 4.6.3.

4.8 An Example of Time Series in Value Estimation

When value estimation is updated by new trades or ETF price changes at real time, calculate the log time difference between current time (t+1) and the most recent trade time (t). When running regressions using historical data, the log time difference can be defined as the next trade time (t+1) and the most recent trade time (t), since the next trade time (t+1) in the history data is known. For example, for real-time calculation, if the most recent trade was at 10:00:00 and it is now 10:00:01, the log may be set to a difference between t+1 and t as log(1) in this case. If the model at 10:00:03 is updated, it may be changed to log(3). And so on.

4.9 Reconstruct the Value Estimate for Cancelled/Replaced Trades

After a cancellation or replacement as stated in 2.3.3., the value estimate may be reconstructed without the cancelled trade or with the new data for the replaced trade (trades are sorted using execution time). This requires going back to the last trade before the cancelled/replaced trade, and then recalculating the value estimates.

5. GUI Design and Functionality

5.1 Model Top Menu

Figure 7:
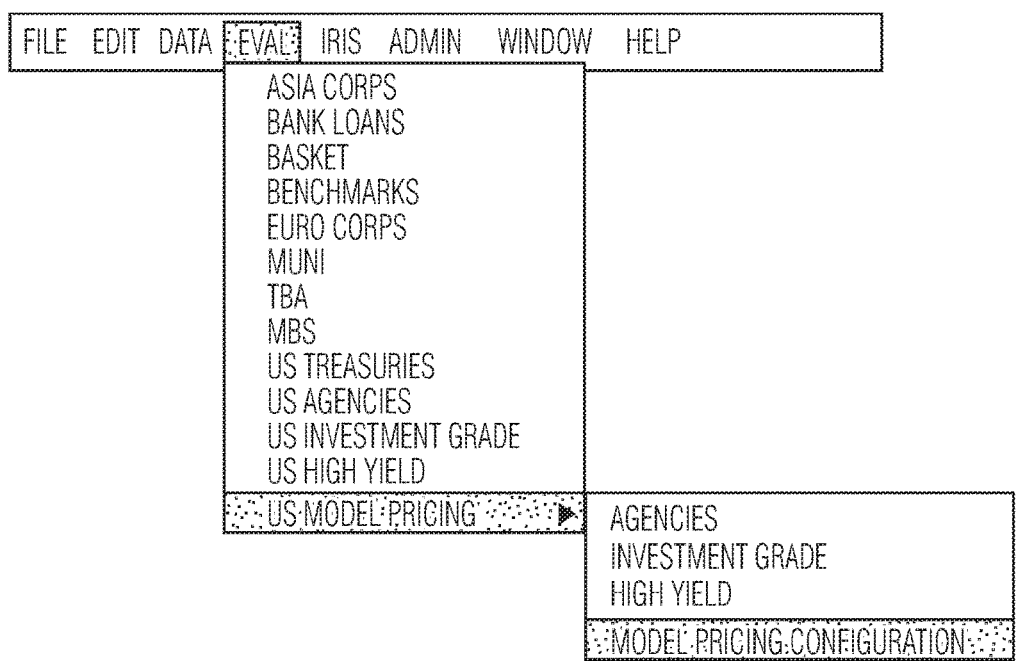
FIG. 7 depicts an exemplary menu.

FIG. 7 depicts an exemplary menu. From the top menu of Omega, the user can choose Eval and then find US Model Pricing. Under Model Pricing, there are four submenus priced separately: agencies, investment grade, and high yield bonds; also, Model Pricing Configurations (sectors can be chosen on configuration screens). More options may be added to the sub-menu under each category at Phase Two, for example, Notifications, Inbox, Confidence Interval (Quality Checks), if necessary.

5.2 Worksheet Enhancements

In Worksheet Enhancements, new fields are added into the existing bond-level worksheet under Sector in IG and HY or Ticker in Agencies. This may be applied to real-time pricing and 3PM/4PM snap pricing.

New Fields: Model Bid/Mid Spread, Model Bid Price, Model Mid Price, Model/Eval Diff, New fields in the screen are defined by the fields in the table below:

| Field | GUI Name | Model Variable Name | Data Range | Example |
|---|---|---|---|---|
| Model Bid/Mid Spread | Model Bid Spread Model Mid Spread | | | |
| Model Bid Price | Model Bid Price | Model Bid Price = Model Mid Price + ldb (or ldb2 or ldb3), ldb is the large dealer buy transaction cost estimated by the model (ldb2 is the large dealer buy transaction cost predicted from the TC model with the issue-level multiplier, and ldb3 = min (0, ldb2) | Positive floating number | |
| Model Mid Price | Model Mid Price | Model Mid Price = 0.5 * PredPrice(s) + 0.5 * PredPrice2(s) | Positive floating number | |
| Model/Eval Diff | Model/Eval Diff | This is the difference between Model Mid Price and Evaluation Mid Price | | |
| Model 3PM Bid/Mid Price | Model 3PM Bid Price, Model 3PM Mid Price, | | | |
| Model 4PM Bid/Mid Price | Model 4PM Bid Price, Model 4PM Mid Price, | | | |
| Model 3PM/4PM Bid/Mid Spread | Model 3PM Bid Spread Model 3PM Mid Spread Model 4PM Bid Spread Model 4PM Mid Spread | | | |

Note: Model 3 PM/4 PM price/spread is the model price/spread under the mode 3 PM or 4 PM. The model price may be copied at 3 pm and 4 pm to this field. No evaluator action is required for this.

5.2.1.1. IG/HY Worksheet Enhancements

FIG. 8 depicts an exemplary Investment Grade Worksheet Enhancements screen and a High Yield Worksheet Enhancements screen, which are the same.

5.2.1.2. Agency Worksheet Enhancements

Figure 9:
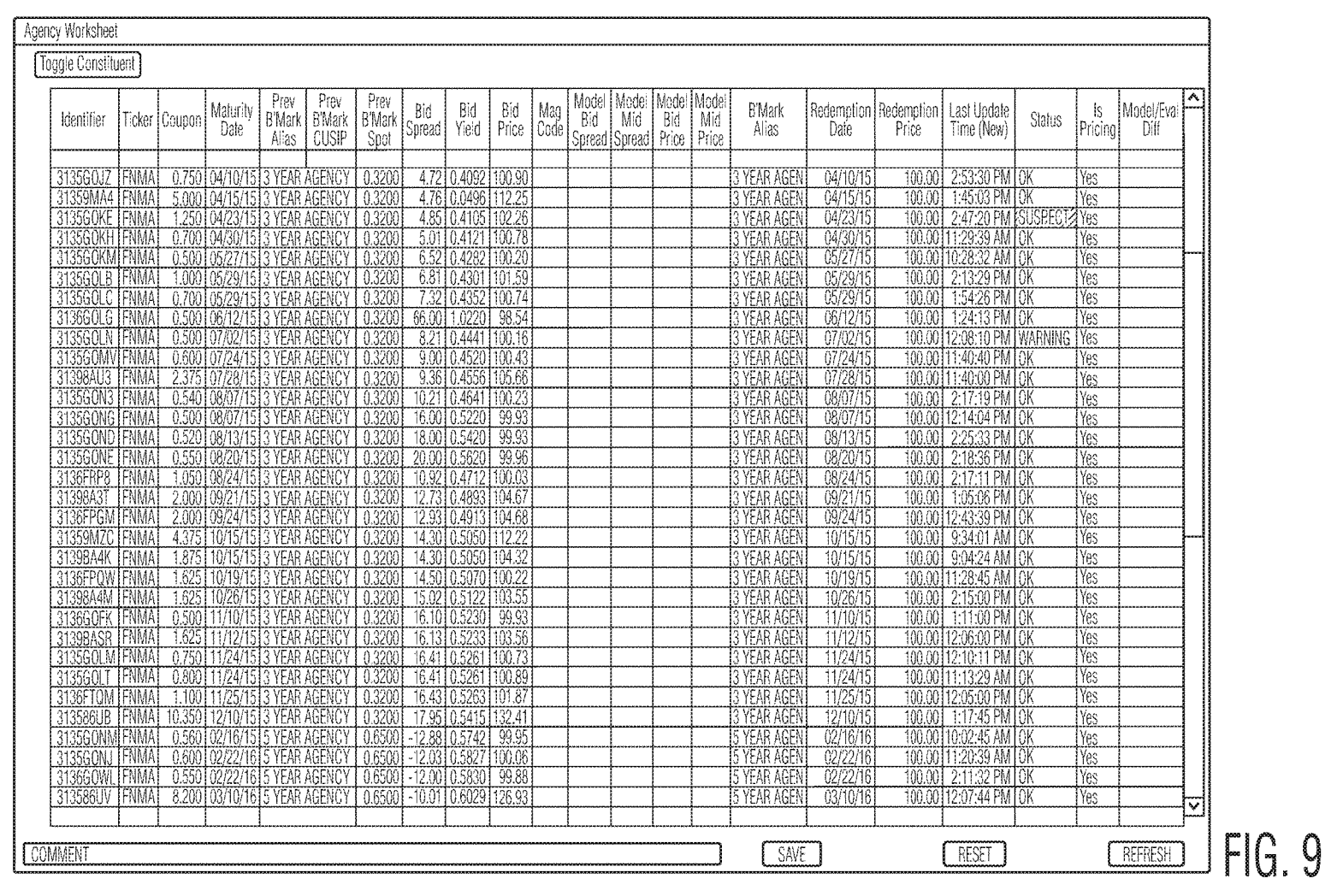

FIG. 9 depicts an Agency Worksheet screen. Similarly as USIG Worksheet, new fields in Section 5.2. are added onto Agency Worksheet screen. There are three modes on Dashboard: Real Time, 3 PM, and 4 PM. In each mode, there are one set of fields to show model price:
Model (3 PM or 4 PM) Bid/Mid Spread
Model (3 PM or 4 PM) Bid/Mid Price
Model/Eval Diff 5.3 Trade Data Enhancements In Trade Data Enhancements, new fields are added into the existing trade-level grids for each security in IG and HY or each Identifier in Agencies. This is applied to real-time pricing (3 pm/4 pm snap pricing is acceptable but not required). New Fields: Model Side Indicator, Model Paired Indicator, Model Paired, Model Trade-to-trade Change in Price Ap, Model Updated Time, Model Bid/Mid/Ask Price, Model Observation Weights, Model Out-of-sample TC, Model Truncated Out-of-sample TC, Model Rescaled TC, Model Final TC New fields in the screen are defined by the fields in the table below:

| Field | GUI Name | Model Variable Name | Data Range | Example |
|---|---|---|---|---|
| Model Side Indicator | Model Side Indicator | $I_i^S (S_d)$ | 0 or 1 | 1 |
| Model Paired Indicator | Model Paired Indicator | $I_i^P (P)$ | 0 or 1 | 0 |
| Model Paired Reported Time | Model Paired Trade Reported Time | P dt_report | −1, 0 or 1 Date and time (mm/dd/yyyy hh:mm:ss) | −1 11/10/2008 14:46:00 |
| Model Observation Weights | Mdl. Observation Weights | w (calculation is defined in Section 2.4.3.) Note: this is weight adjustments defined in Table 5 | Positive floating number | 4.86E−05 |
| Model Out-of-sample TC | Mdl. Out-of-sample TC | $C_{O\_original}$ | | |
| Model Truncated Out-of-sample TC | Mdl. Truncated Out-of-sample TC | $C_O$ | | |
| Model Rescaled TC | Mdl. Rescaled TC | tc | Floating number | 0.644615 |
| Model Final TC | Mdl. Final TC | $tc_3$ | Floating number | 0.666422 |

When collapsing trade level data to CUSIP*second, atomic trade level data may be published in the above fields. Trades occurred in the same second may share the same executed time (or reported time), and the same transaction costs as used in aggregated values in the calculation of transaction costs. However, they may show their individual Side Indicator, Paired
Indicator, Weights, etc.

5.3.1.1. IG/HY Trade Data Enhancements

Figure 10:
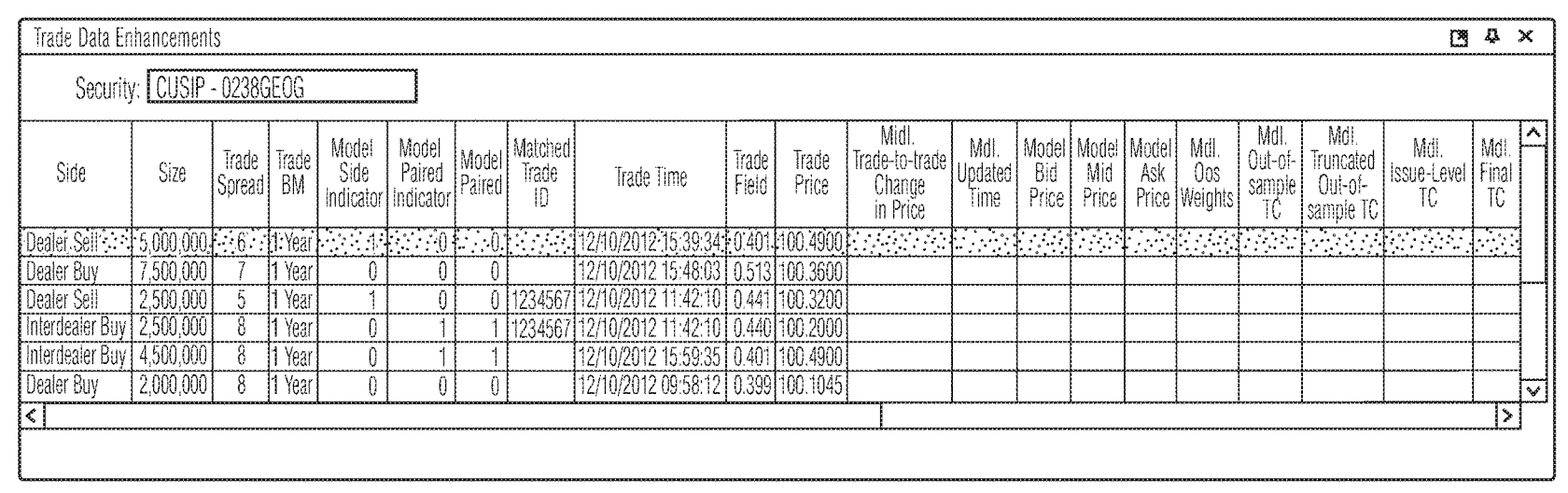

FIG. 10 depicts exemplary Investment Grade and High Yield screens, which have the same Trade Data Enhancements screen.

5.3.1.2. Agency Trade Data Enhancements

FIG. 11 depicts an exemplary trade data enhancement screen.

5.4 Model Pricing Configurations

Configuration screens described herein work under the whole model.

5.4.1.1. Data Preparation

FIG. 12 depicts an exemplary model pricing configuration screen for data preparation. On the top of the screen, sectors can be switched between: Corp (which includes IG and HY), and Agencies (shown as AGY in the dropdown box).

5.4.1.2. Transaction Cost Adjustment

FIG. 13 depicts an exemplary model pricing configuration screen for transaction cost adjustment. Similarly, on the top of the screen, sectors can be switched between: Corp (which includes IG and HY), and Agencies (shown as AGY in the dropdown box).

5.4.1.3. Market Adjustment

FIGS. 14 and 15 depict exemplary model pricing configuration screens for market adjustment. The tab of market adjustment configurations are applied to each of the three pricing methods, i.e., IG, HY and Agency. On the top of the screen, sectors can be switched between: Corp (which includes IG and HY), and Agencies (shown as AGY in the dropdown box).

6. Output Files

The output files in this section provide data analysis for Model Pricing, especially supporting Methodology to check the performance of the model. At 10 am, 12 pm, 3 pm and 4 pm each day, it may publish out two files (in Excel.csv format): one is the bond-level output file, and the other is the trade-level output file.

6.1 Bond-Level Output File

The bond-level output file may contain all the statistics data for each certain security: Model Price (Bid/Mid/Ask Price), New Price (Bid/Mid/Ask Price), Difference in Prices, Last 5 Trades' Price, Last 5 Transaction Cost Adjustments, Transaction Cost Coefficients, Market Adjustment Coefficients, Value Estimate Coefficients. This file includes all the regression results generated while running the model. Table 8 shows all the available fields in the bond-level output file.

TABLE 8

Available Fields of Bond-level Output File
Available Fields

| Sector | Security ID | Security Description |
|---|---|---|
| Model Bid Price | Model Mid Price | Model Ask Price |
| New Bid Price | New Mid Price | New Ask Price |
| Diff in Bid Price | Diff in Mid Price | Diff in Ask Price |
| Last Trade Price | Last Second Trade Price | Last Third Trade Price |
| Last Fourth Trade Price | Last Fifth Trade Price | Last Transaction Cost Adj |
| Last Second Transaction Cost Adj | Last Third Transaction Cost Adj | Last Fourth Transaction Cost Adj |
| Last Fifth Transaction Cost Adj | Reg1_Coef_tt | Reg1_Coef_dtt |
| Reg1_Coef_ttfq | Reg1_Coef_dttfq | Reg1_Coef_fq |
| Reg1_Coef_ttpos | Reg1_Coef_dttpos | Reg1_Coef_ttposfq |
| Reg1_Coef_dttposfq | Reg1_Coef_ttrat | Reg1_Coef_ttmat15 |
| Reg1_Coef_ttposrat | Reg1_Coef_ttposmat15 | Reg1_Coef_ttfqrat |
| Reg1_Coef_ttfqmat15 | Reg1_Coef_ttfqmat15rat | Reg1_Coef_dttfqrat |
| Reg1_Coef_dttfqmat15 | Reg1_Coef_dttfqmat15rat | Reg1_Coef_ttposfqrat |
| Reg1_Coef_ttposfqmat15 | Reg1_Coef_ttposfqmat15rat | Reg1_Coef_dttposfqrat |
| Reg1_Coef_ ttposfqmat15 | Reg2_Coef_sLQD | Reg2_Coef_sLQDmat10 |
| Reg2_Coef_sLQDrat | Reg2_Coef_sLQDmat10rat | Reg2_Coef_sLQDhy |
| Reg2_Coef_sLQDhyrat | Reg2_Coef_sLQDmat10hy | Reg2_Coef_sLQDmat10hyrat |
| Reg2_Coef_sHL | Reg2_Coef_sHLmat10 | Reg2_Coef_sHLrat |
| Reg2_Coef_sHLmat10rat | Reg2_Coef_sHLhy | Reg2_Coef_sHLhyrat |
| Reg2_Coef_sHLmat10hy | Reg2_Coef_sHLmat10hyrat | Reg2_Coef_sLM10a |
| Reg3_Coef_spy3 | Reg3_Se_spy3 | Reg4_Coef_col |
| Reg4_Se_sel | Reg5_Coef_coh | Reg5_Se_seh |
| Reg6_Coef_stc | Reg6_Se_stc | Reg6_Coef_etf2 |
| Reg6_Se_etf2 | Reg7_Coef_x | Reg7_Coef_dx |
| Reg7_Coef_udx | Reg7_Coef_xLnft | Reg7_Coef_xLnt |
| Reg7_Coef_xig | Reg7_Coef_xfq | Reg7_Coef_xsame |
| Reg7_Coef_xpos | Reg72_Coef_x2 | Reg72_Coef_x2ud |
| Reg72_Coef_x2Lnft | Reg72_Coef_x2Lnt | Reg72_Coef_x2ig |
| Reg72_Coef_x2fq | Reg72_Coef_x2pos | Years-To-Maturity |
| Last Trade Adjusted Price Padj1 | Last Second Trade Adjusted Price Padj2 | Last Third Trade Adjusted Price Padj3 |
| Last Fourth Trade Adjusted Price Padj4 | Last Fifth Trade Adjusted Price Padj5 | Last 5 Average TCMA Price P5adj |
| X | X2 | PredPrice |
| PredPrice2 | | |

Last Trade Price is the most recent aggregated trade price, i.e., if there are multiple trade occurred in one second, Last Trade Price may display the weight-averaged aggregation of all trades in that 1 second. Years-To-Maturity may be calculated based on the most recent trade. In addition, all the coefficients from overnight regressions keep the same for each day.

6.2 Trade-Level Output File

Each trade-level output file may include all the trades' data processed by the model in one day by the published time, and fields in this file are the same as columns shown in Trade Data Enhancements for IG/HY and Agencies, respectively. Table 9 shows all the available fields in the trade-level output file:

TABLE 9

Available Fields of Trade-level Output File
Available Fields

| Side | Size | Trade Spread |
|---|---|---|
| Trade BM | Trade Time | Time Applied |
| Model Side Indicator | Model Paired Indicator | Matched Trade ID |
| Model Updated Time | Trade Yield | Trade Price |
| LQD Price | HYG Price | TLT Price |
| IEI Price | Model Paired | |

7. Data Dependencies

TRACE data with the reporting party side variable is available back to November, 2008, and for agencies available from 2010, and these are the dates when the data start. To count the maximum years' of historical data estimates are used by working backwards through the code as the following:

An estimate of pprice2 for July 2013 use estimates of pprice from January 2013 to June 2013 (this is the second value estimation step).

Estimates of pprice from January 2013 use estimates of transaction costs (tc3 and etf23) from July 2012 to December 2012 (this is the first value estimation step).

Estimates of tc3 and etf23 from July 2012 use estimates of tc and etf2 from July 2010 to July 2012 (this is the issue-level TC and MA multiplier step).

Estimates of tc and etf2 from July 2010 could use py3 from July 2008 to July 2010 (this is the issue-level TC and MA step).

An estimate of py3 from July 2008 could have used data from July 2006 to July 2008 (this is the market-wide TC step).

The above shows that if an estimation of everything with the maximum possible data is desired, 7 years of data, which will be available in early 2016, is needed. However, the minimum requirement on the length of historical data required for real time model is 3 years (including calculation of transaction cost from Regression 1) in order to generate all regression coefficients. But the more data we have, the better quality the model has. So Omega may be programmed to discard data that is 7+ years old.

7.1 Reference Data

Bond reference data for investment grade and high yield bonds may be required, including the bond attributes of maturity date, currency, the flag of TRACE eligible data, etc. Also, it may identify that the bond is not convertibles, convertible preferreds, preferreds, or index-linked notes.

7.2 TRACE Trade History

The TRACE trades data with 3 years history may be available in Omega as the rolling window of the regressions in Section 3.

7.3 Real-time TRACE trade feed

During the day, the real-time TRACE trade feed may also be available in Omega for the real-time value estimation process.

7.4 ETF Price History

Also, three-year daily ETF prices in real-time ticking may be available, and the tickers that are used in the model are LQD, HYG, IEI, and TLT.

7.5 ETF Price Real-Time Ticking Feeds

During the day, the real-time ticking feeds for the above four ETFs may also be needed in Omega for real-time value estimation process.

7.6 Data Migration

As stated herein, this length of historical data may be sufficient to run the model and generate all regression coefficients.

8. Configurations

The following table shows what is configured at model level:

| Name | Description/Functions with configurable parameters | Data Object | Section | Default |
|---|---|---|---|---|
| Minimum Trades for A Bond | The minimum number of trades for a bond to calculate the averages in the model | Integer at least equals to 6 | 1.2. | 6 |
| Weights Adjustment | Function (2.2) $$\text{Adjusted Weights} = \frac{\text{Weight}}{0.8 + 0.3 * S_Z * \left(1 - \frac{\text{ABS}(S_d + P)}{2}\right) + 0.25 * \text{ABS}(S_d) - 0.15 * (S_d + P)}$$ | | 2.4.3. | 0.8, 0.3, 0.25, 0.15 |
| Truncated In-sample and Out-of-sample Predicted Transaction Costs | Functions (3.3) and (3.4) $C_o(t + 1) = \text{Sign}(S_d(t + 1) + P(t + 1)) * \max(0.05, \min(2.5 * \text{coef}(t), \text{Sign}(S_d(t + 1) + P(t + 1)) * C_{O\_original}(t + 1)))$, if ABS $(S_d(t + 1) + P(t + 1)) = 1$ $C_l(t + 1) = \text{Sign}(S_d(t + 1) + P(t + 1)) * \max(0.05, \min(2.5 * \text{coef}(t), \text{Sign}(S_d(t + 1) + P(t + 1)) * C_{I\_original}(t + 1)))$, if ABS$(S_d(t + 1) + P(t + 1)) = 1$ | | 3.1.1.3. | 0.05, 2.5 |
| Rescaled Transaction Cost | Function (3.18) $tc = C_O \cdot (1 + (\overline{\beta}_1^p - 1) * (0.8 - 0.3 * \text{Max}(0, \text{Min}(1, \overline{E}_p * 100 - 100))))$ | | 3.4.3. | 0.8, 0.3 |
| New LQD Beta | Function (3.19) $\beta_l = \text{Max}(5, \overline{\beta}_{LQD} * 0.4 + \overline{\beta}_1^l * 0.4)$ | | 3.4.4.1. | 5, 0.4 |
| New HYG-LQD Beta | Function (3.21) $\beta_h = \beta_{HYG-LQD} * 0.8 + 0.8 * (\overline{\beta}_1^h = \beta_{HYG-LQD}) * (1 - 0.2 * \max(0, \min(4, \overline{E}_h)))$ | | 3.4.4.2. | 0.8, 0.2, 4 |

-continued

| Name | Description/Functions with configurable parameters | Data Object | Section | Default |
|---|---|---|---|---|
| Final Transaction Cost Adjustment | Function (3.28) $tc_3 =$ $tc * (1 + (\bar{\beta_1} - 1) * \max(0, \min(1, 0.5 - 0.25 * \ln(8 * \bar{E_p}))))$ | | 3.5.2. | 0.5, 0.2, 8 |
| Final Market Adjustment | Function (3.29) $etf23 = etf2 * \left(0.9 * \left(1 + (\bar{\beta_2} - 1) * \max\left(0, \min\left(1, 1 - 3 * \sqrt{\sigma^2(\bar{\beta_2})}\right)\right)\right)\right)$ | | 3.5.3. | 0.9, 3 |

9. Notifications

No notifications may be required for Phase One. Once the confidence measure is implemented in Phase Two, notifications may be performed.

10. Appendix A: Ratings Mapping Between Agencies and IDC Bucket

| IDC Ratings Bucket | S&P | S&P Numerical | intSP | R (rat) | Moody's | Fitch | Description |
|---|---|---|---|---|---|---|---|
| AA or Higher | AAA | 20 | 6 | 0 | Aaa | AAA | Prime |
| AA or Higher | AA+ | 19 | 6 | 0 | Aa1 | AA+ | High grade |
| AA or Higher | AA | 18 | 6 | 0.0625 | Aa2 | AA | |
| AA or Higher | AA- | 17 | 6 | 0.125 | Aa3 | AA- | |
| A | A+ | 16 | 5 | 0.1875 | A1 | A+ | Upper |
| A | A | 15 | 5 | 0.25 | A2 | A | medium |
| A | A- | 14 | 5 | 0.3125 | A3 | A- | grade |
| BBB | BBB+ | 13 | 4 | 0.375 | Baa1 | BBB+ | Lower |
| BBB | BBB | 12 | 4 | 0.4375 | Baa2 | BBB | medium |
| BBB | BBB- | 11 | 4 | 0.5 | Baa3 | BBB- | grade |
| BB | BB+ | 10 | 3 | 0.5625 | Ba1 | BB+ | Non- |
| BB | BB | 9 | 3 | 0.625 | Ba2 | BB | investment |
| BB | BB- | 8 | 3 | 0.6875 | Ba3 | BB- | grade speculative |
| B | B+ | 7 | 2 | 0.75 | B1 | B+ | Highly |
| B | B | 6 | 2 | 0.8125 | B2 | B | speculative |
| B | B- | 5 | 2 | 0.875 | B3 | B- | |
| CCC or Lower | CCC+ | 4 | 1 | 0.9375 | Caa1 | CCC | Substantial risks |
| CCC or Lower | CCC | 3 | 1 | 1 | Caa2 | | Extremely speculative |
| CCC or Lower | CCC- | 2 | 1 | 1 | Caa3 | | In default |
| CCC or Lower | CC | 1 | 1 | 1 | Ca | | with little |
| CCC or Lower | C | 0 | 1 | 1 | | | prospect for recovery |
| CCC or Lower | D | -12 | 1 | 1 | C | DDD | In default |
| NR | | 0 | 1 | 1 | | | Not rated |

In an exemplary embodiment, if there are 2 or more ratings that do not map into the same bucket, take the median rating if all 3 ratings from the rating agencies are present; and if there are ratings from 2 rating agencies, use the rule S&P>Moodys>Fitch to predict transaction costs in this model. For Fitch's CCC, use numerical value 4, and for Moody's Ca use numerical value 1, which means the higher numerical rating is used for ratings that have more than one numerical values.

For unrated bonds, currently they are getting SPrat=0. However, in an exemplary embodiment, an approximate rating may be calculated from the spread to Treasures, on a fairly infrequent basis, e.g. once a month or so. If there are no ratings, the user may choose from the issue's yields. In an exemplary embodiment, with no ratings the user could infer a rating from the spread to Treasures. Each day the user could calculate, for example, a kernel smoothed median rating as a function of yield spreads, created cutoffs, and classify the unrated bonds accordingly.

11. Appendix B: Getting TRACE Data

This section provides how the user obtains TRACE data as a reference, however, it is not required. The user may merge two files to get TRACE data—one that includes all variables disseminated by TRACE and use the name "Fat TRACE" for this file, and one that includes additional variables created by MarketAxess, and this is called as "Skinny". Variables are created and used as the follows from the files in the parenthesis:

IssuepriceID (Both)
Sequencenumber (Both)
Cusip (Skinny) and InstrumentCusip (Fat)
Report Date and Time (Fat) and FirstReportTime (Skinny)
Effective Date and Time (Fat) and TransactionTime (Skinny)
TradeAction (Skinny) and CancelFlag and CorrectionFlag (Fat)
Price (Both)
Reporting Party Side (Skinny) and Trade_Type (Fat)
Quantity (Fat) and Lotsize (Skinny)
Is_Suspect (Both)

SpecialPrice (Fat)
QuantityIndicator (Fat)
SalesCondCode (Fat)
SecondModifier (Fat)

AsOfFlag (Both)
CommissionFlag (Fat)
W1Flag (Fat)

12. Appendix C: Variable Dictionary

| \multicolumn{4}{c}{Variables in GCAT files} | | | |
|---|---|---|---|
| price | double | %9.0 g | Price in points (par = 100) |
| lotsize | long | %12.0 g | lotsize in $ |
| spread | double | %8.0 g | Spread to treasuries as calculated by Market Axess (not used) |
| yield | double | %9.0 g | Yield as calculated by Market Axess (not used) |
| dt | double | % tc | Execution Date-Time variable (in Stata, milliseconds since Jan. 1, 1960, but should be outputted in CSYs in a textual format) |
| cusip | str8 | %9 s | 8-digit CUSIP |
| piid | long | %12.0 g | Categorical variable: aggregated a few cases of CUSIP or instrumentID changes into a common identifier |
| ytm | float | %9.0 g | Years to Maturity from c |
| yld | float | %9.0 g | Not used |
| sprat | str4 | %9 s | S&P credit rating (or rating estimated from Moodys/Fitch rating) in text |
| SPrat | byte | %8.0 g | Numerical version of S&P rating (AAA = 20, AA+ = 19, BB+ = 10, CCC+ = 4, CCC = 3, CC = 0, D = −12 |
| bigsubset | str4 | %9 s | Aggregation of the subset variable provided by IDC (not used) |
| lnHYG | float | %9.0 g | Most recent ln(HYG total return index) as of execution time |
| lnIEF | float | %9.0 g | Most recent ln(IEF total return index) as of execution time |
| lnIEI | float | %9.0 g | Most recent ln(IEI total return index) as of execution time |
| lnLQD | float | %9.0 g | Most recent ln(LQD total return index) as of execution time |
| lnTLT | float | %9.0 g | Most recent ln(TLT total return index) as of execution time |
| n1 | float | %9.0 g | Numbers trades within values of PIIDA, in order of execution time (with ties broken by values of n) |
| yrmo | long | %8.0 g | Year month variable (January 2009 = 200901) |
| benchiagt | float | %9.0 g | Not used |
| tt | float | %9.0 g | =+1 for dealer sells; −1 for dealer buys; 0 for interdealer |
| dtt | byte | %8.0 g | =0 for client trades and unpaired interdealer trades; +1 for ID trades paired with dealer sell; −1 for paired with dealer buy (paired = same CUSIP, second, lotsize) |
| fq | float | %9.0 g | Truncated log-linear function of lotsize (=0 for <=$50k, =1 for >=$1M, log-linear in between) |
| ttfq | Float | %9.0 g | TT*FQ |
| dttfq | float | %9.0 g | DTT*FQ |
| by | float | %9.0 g | Not used |
| spr | float | %9.0 g | Not used |
| n | long | %12.0 g | Trade identifier (created by me; used for disassembling and reassembling datasets) |
| a | float | %9.0 g | =1 If ultimately cancelled |
| piida | float | %9.0 g | Grouping of combinations of PIID and A (in TC model, all A = 1 observations are dropped, so this maps one-to-one to PIID) |
| m | float | %9.0 g | 1 to N numbering of months appearing in data (November 2008 = 1, January 2012 = 44) |

| \multicolumn{4}{c}{Variables in TPBED5 files} | | | |
|---|---|---|---|
| price | double | %9.0 g | As above |
| dt | double | %tc | As above |
| cusip | str8 | %9 s | As above |
| piid | long | %12.0 g | As above |
| ytm | float | %9.0 g | As above |
| SPrat | byte | %8.0 g | As above |
| lnHYG | float | %9.0 g | As above |
| lnIEF | float | %9.0 g | As above |
| inIEI | float | %9.0 g | As above |
| inLQD | float | %9.0 g | As above |
| inTLT | float | %9.0 g | As above |
| n1 | float | %9.0 g | As above |
| tt | byte | %9.0 g | As above |
| dtt | byte | %8.0 g | As above |
| fq | float | %9.0 g | As above |

| | | | |
|---|---|---|---|
| n | long | %12.0 g | As above |
| a | byte | %9.0 g | As above |
| piida | int | %9.0 g | As above |
| betam | float | %9.0 g | Beta estimated for TLT-IEI factor |
| tc | float | %9.0 g | Trading cost estimated from weighted average of market-level and cell-level models |
| betal | float | %9.0 g | Beta estimated for LQD factor |
| betah | float | %9.0 g | Beta estimated for HYG-LQD factor |
| etf2 | float | %9.0 g | Market adjustment from last trade calculated using betam, betah, betal |
| yq | float | %9.0 g | A variable that groups months in the data (November 2008 = 107, June 2012 = 150) |
| w | float | %9.0 g | Weight used in regressions |
| p | float | %9.0 g | Counter of unique values of PIID (also used as a counter of unique values of gcat (credit* maturity ceil) earlier in code) |
| copi | float | %9.0 g | Issue-level transaction cost coefficient |
| sepi | float | %9.0 g | Issue-level transaction cost standard error |
| coe | float | %9.0 g | Issue-level market adjustment coefficient |
| see | float | %9.0 g | Issue-level market adjustment standard error |
| tc3 | float | %9.0 g | Trading cost estimated from TC and COPI |
| emult | float | %9.0 g | Market adjustment multiplier estimated from COE |
| etf23 | float | %9.0 g | ETF2*EMULT |

| Other important variables | |
|---|---|
| TTPOS | =1 if dealer sell |
| DTTPOS | =1 if paired with dealer sell |
| TTPOSFQ | TIPOS*FQ |
| DTTPOSFQ | DTTPOS*FQ |
| PY0 | Out of sample predicted transaction cost from 9 parameter market-level model |
| PY3 | Out of sample predicted transaction cost from 24 parameter market-level model |
| PY3b | Partly in-sample predicted transaction cost from 24 parameter market-level model |

The other variables should be obvious from the code (e.g., interaction terms), but feel free to ask any questions

13. Appendix D: Regression Framework and Formulae

In this Appendix regression framework is described in general and regression formulae applied to TC model and Market Adjustment in specific. Note that all regressions involved may be weighted regressions. Also note that the design matrix and the right-hand-side of regressions include $1^{st}$ differences, except for the constant term in design matrix.

13.1 Assumptions and General Settings

A few assumptions as basis of framework are made and describe general settings for TC model and Market Adjustment applications. Regressions are run in rolling windows. The generic form of a rolling window is [t−24,t] with t being a time unit in month. Observations come with execution times $\{t_i\}$. The execution times are also used to calculate $1^{st}$ differences. Let $p_t$ denote the price at execution time t. Then the $1^{st}$ difference for price is calculated according to the follows:

$$p_{t_i} - p_{t_{i-1}} = \Delta p_i \in \Delta p \Leftrightarrow t_{i-1} < t_i; t_i, t_{i-1} \in [t-24, t];$$
$$(t_{i-1}, t_i) \cap [t-24, t] = 0 \quad (12.1)$$

$(t_{i-1}, t_i) \cap [t-24, t] = 0$ means there is no execution between $t_{i-1}$ and $t_i$. $1^{st}$ differences for other quantities are also calculated according to rules above. The $1^{st}$ difference calculations are based on grouping according to certain id's.

13.2 Regression Formulae and Components

The following notations are defined:
Let $f_j(t_i, \ldots)$ be the $j^{th}$ basis function at time $t_i$.
Let $q_k(t_i, \ldots)$ be the $k^{th}$ function that constitute the right-hand-side of the regression, k=1, ..., K
Let $c_k$ be constants, k=1, ..., K
Let M be the number of basis functions.
Let N be the number of observations.
Let A be the design matrix of regression.
Let H be the right-hand-side of regression.
Let W be the weight-matrix.
Let $\Omega$ be the inverse of W.
Generic element in A is in the following form:

$$a_{i,j} = f_j(t_i, \ldots), i=1, \ldots, N, j=1, \ldots M$$

Generic element in H is in the following form:

$$h_i = \sum_{k=1}^{K} c_k q_k(t_i, \ldots)$$

Generic element in W is in the following form:
$$w_i = w(t_i)$$

The coefficients of regression, $\beta$, an M-vector is given by the solution of the following linear equations:

$$[D^T D] \cdot \beta = D^T H, \text{ where } D = W \cdot A \quad (12.2)$$

A constant term in basis functions $f_j$ was not included but it may be included in (12.2).

13.3 Standard Errors for Coefficients

Standard error for non-constant coefficient can be calculated in terms of design matrix and the weight matrix. The formula of standard error calculation is:

$$\sigma^2(\beta_j) = \sum_{i=1}^{N} \sigma_i^2 \left(\frac{\partial \beta_j}{\partial h_i}\right)^2, \text{ with } w = \frac{1}{\sigma} \quad (12.3)$$

This formula reduces to $\sigma^2(\beta_j)=C_{j,j}$, in general, covariance of $\beta_i$ and $\beta_j$ is $C_{i,j}$. Here $C=(D^TD)^{-1}$. The standard error for $\beta_j$ is $\sqrt{C_{j,j}}$.

14. Appendix E: Derive Y Estimated Value 14.1 Calculate Estimated Value of Predicted Price Difference Y Define a variable Y as the difference between trade t+1's transaction cost and market-adjusted price and the baseline price. Y is estimated by running Regression 7 on a set of independent variables. After a new trade occurs, using coefficients from overnight regression—Regression 7 multiplies related variables as the estimated value of Y, denoted as $\hat{Y}=$ $$\sum_{j=1}^{9} \hat{\beta}_j \times a_j.$$

The detailed equation is as the following:

$$\hat{Y}=\text{Reg7\_Coef\_}x * X + \text{Reg7\_Coef\_}dx * X * I_d + \text{Reg7\_Coef\_}udx * X * U_d + \text{Reg7\_Coef\_}x\ln\text{ft} * X * T_{d1} + \text{Reg7\_Coef\_}x\ln\text{t} * X * T_{d2} + \text{Reg7\_Coef\_}xig * X * IG_d + \text{Reg7\_Coef\_}xfq * X * T_s + \text{Reg7\_Coef\_}xsame * X * I + \text{Reg7\_Coef\_}xpos * X * \text{Sum}$$

14.2 Calculate Predicted Price

Variable Y is defined as the difference between trade t+1's transaction cost and market-adjusted price and the baseline price, which can be expressed in equation as:

$$Y=P_{adj}(t_{i+1})-P5_{adj}(t_{i-1})-\text{MktA}(t_{i-5},t_i)-\text{etf23}(t_{i+1})$$

Now, since the estimated value Y in previous section 4.4.1.3. has been calculated, the predicted price can be obtained according to the following:

$$\text{PredPrice}(t_i)=P_{adj}(t_{i+1})-\text{etf23}(t_{i+1})=P5_{adj}(t_{i-1})+\text{MktA}(t_{i-6},t_{i-1})+\hat{Y}$$

where:

$$\text{MktA}(t_{i-5},t_i)=\text{etf23}(t_i)+0.8 * \text{etf23}(t_{i-1})+0.6 * \text{etf23}(t_{i-2})+0.4 * \text{etf23}(t_{i-3})+0.2 * \text{etf23}(t_{i-4})$$

For Y only, trades that are eventually cancelled or replaced are not considered.

14.3 Calculate New Price Difference X2 and New Predicted Price

Construct a new baseline price and average the predicted next-trade price as the following:

$X_2=\text{PredPrice}(t_i)-\text{PredPrice}(t_{i-1})$, predicted price $\text{PredPrice}(t_i)$ is obtained from 4.4.1.4. as above Use this new price difference $X_2$, and the coefficients from overnight regression—Regression 7 to generate a new estimated value of Y, denoted as $\hat{Y}_2$. The detailed equation is as the following:

$$\hat{Y}_2=\text{Reg72\_Coef\_}x2 * X_2+\text{Reg72\_Coef\_}x2ud * X_2 * U_d+\text{Reg72\_Coef\_}x2\ln\text{ft} * X_2 * T_{d1}+\text{Reg72\_Coef\_}x2\ln\text{t} * X_2 * T_{d2}+\text{Reg72\_Coef\_}x2ig * X_2 * IG_d+\text{Reg72\_Coef\_}x2fq * X_2 * T_s+\text{Reg72\_Coef\_}x2pos * X_2 * \text{Sum}$$

$Y_2$ in the following equation is defined as:

$$Y_2=P_{adj}(t_{i+1})-\text{PredPrice}(t_{i-1})-\text{etf23}(t_{i+1})$$

A new predicted price, denoted as $\text{PredPrice2}(t_i)$ is determined in the following:

$$\text{PredPrice2}(t_i)=\text{PredPrice}(t_{i-1})+\text{etf23}(t_i)+\hat{Y}_2(t_i)$$

15. Appendix F: Calculate ETF Betas 15.1 Calculate Out-of-sample Betas

From overnight regression—Regression 2, saved 18 coefficients have been saved:

$\beta_j$, j=1, . . . , 18. Use these coefficients to calculate out-of-sample betas at the beginning of each day, and keep them consistent on intraday trades.

$$\beta_{LQD}=\text{Reg2\_Coef\_sLQD} +\text{Reg2\_Coef\_sLQDmat10} * \text{YTM}_{10}+ \text{Reg2\_Coef\_sLQDrat} * R + \text{Reg2\_Coef\_sLQDmat10rat} * \text{YTM}_{10}+ \text{Reg2\_Coef\_sLQDhy} * H + \text{Reg2\_Coef\_sLQDhyrat} * H * R + \text{Reg2\_Coef\_sLQDmat10hy} * H * \text{YTM}_{10}+ \text{Reg2\_Coef\_sLQDmat10hyrat} * H * \text{YTM}_{10} * R$$

$$\beta_{HYG-LQD}=\text{Reg2\_Coef\_sHL} + \text{Reg2\_Coef\_sHLmat10} * \text{YTM}_{10}+ \text{Reg2\_Coef\_sHLrat} * R+\text{Reg2\_Coef\_sHLmat10rat} * \text{YTM}_{10}+ \text{Reg2\_Coef\_sHLhy} * H+\text{Reg2\_Coef\_sHLhyrat} * H * R+\text{Reg2\_Coef\_sHLmat10hy}* H * \text{YTM}_{10}+\text{Reg2\_Coef\_sHLmat10hyrat}* H * \text{YTM}_{10}$$

$$\beta_{TLT-IEI} - \text{Reg2\_Coef\_sLM10a} * \frac{\min(20, \max(0, ytm - 10))}{20} * (SPrat \geq 14 \,\&\, SPrat \sim =.)$$

15.2 Calculate Issue-Level Betas

Use the above out-of-sample betas and cell-level betas from Regression 4 and Regression 5 to calculate the new betas as:

$$\beta_l=\text{Max}(5,\beta_{LQD} * 0.4+\text{Reg4\_Coef\_sLQD} * 0.4)$$

$$\beta_h=\beta_{HYG-LQD} * 0.8+0.8 * (\text{Reg5\_Coef\_sHL}-\beta_{HYG-LQD}) * (1-0.2 * \max(0-0.2 * \max(0, \text{Reg5\_Se\_sHL})))$$

$$\beta_m = \beta_{TLT-IEI} = \begin{cases} \text{Reg2\_Coef\_sLM10a} * \frac{\min(20, \max(0, ytm - 10))}{20} * \\ (SPrat \geq 14 \, SPrat \sim =.) \\ 0, \text{ for all bonds rated less than } A - \\ \text{or within 10 years of maturity} \end{cases}$$

1. Phase Two Overview

Exemplary embodiments described herein provide the business requirements for implementing Phase Two of the Model Pricing. Except as otherwise stated, section numbers and appendices referred to within Phase Two refer to Phase Two section numbers and appendices. Model Pricing Phase Two embodiments may include:

Developing an automated confidence measure that allows assessment of reliability of model prices produced in Phase One Providing exemplary functionality and controls for using the model price in market data ranking as one of the data sources among quotes, trades and evaluations 1.1 Products in Scope Phase Two covers products that produced a trade-based model price in Phase One, namely US Agency (AGN), Investment Grade (IG) and High Yield (HY) bonds. As described herein, Phase Two securities may have the same scope as implemented in Phase One, and may:

Be USD denominated

Be TRACE eligible

Have at least 'n' trades in a 2-year trade history, where 'n' is configurable (initially set to 6). n=6 is a reasonable starting point since it is the minimum requirement to calculate adjusted price in Section 4.

Not be a convertible bond, preferred stock, convertible preferred, or index linked note The number of bonds covered at least one embodiment described herein regarding Model Pricing Phase Two is 11,917 in total, as shown in Table 10. In an exemplary embodiment, separate quotes-based and issuer-level models may be integrated into this functionality.

TABLE 100

Model Pricing Phase Two Scope

|  | IG | HY | Total |
|---|---|---|---|
| Universe* | 22,951 | 5,316 | 28,267 |
| Traded on TRACE | 11,097 | 1,528 | 12,625 |
| Trade model prices | 10,527 | 1,390 | 11,917 |
| No trade model, but either quote model or trade model for issuer | 6,726 | 2,089 | 8,815 |
| Quote model | 2,355 | 870 | 3,225 |
| Trade model for issuer | 5,074 | 1,623 | 6,697 |
| Quote model only for issuer | 2,601 | 990 | 3,591 |
| No models for any issue | 4,057 | 1,159 | 5,216 |

Universe includes all corporate bonds with attribute data that, during 2013H1, were evaluated by IDC. Agencies, CBOs, CDs, Converts, Discount Notes, Equities, Index-linked Notes, Preferred Stock, Par Bonds, Treasuries may be excluded.

2. Confidence/Quality Measure (Phase Two)

In an exemplary embodiment, an estimate of a 25-75 confidence interval surrounding an estimate of a bond's value is provided. This interval may be defined as a symmetric interval around the value estimate such that 50 percent of future trades are going to fall into. In other words, an estimate of 50% quantile through regression and an estimate 25% and 75% based on the 50% quantile estimate is provided. See Section 3 and Section 4 for calculation details.

Figure 16:
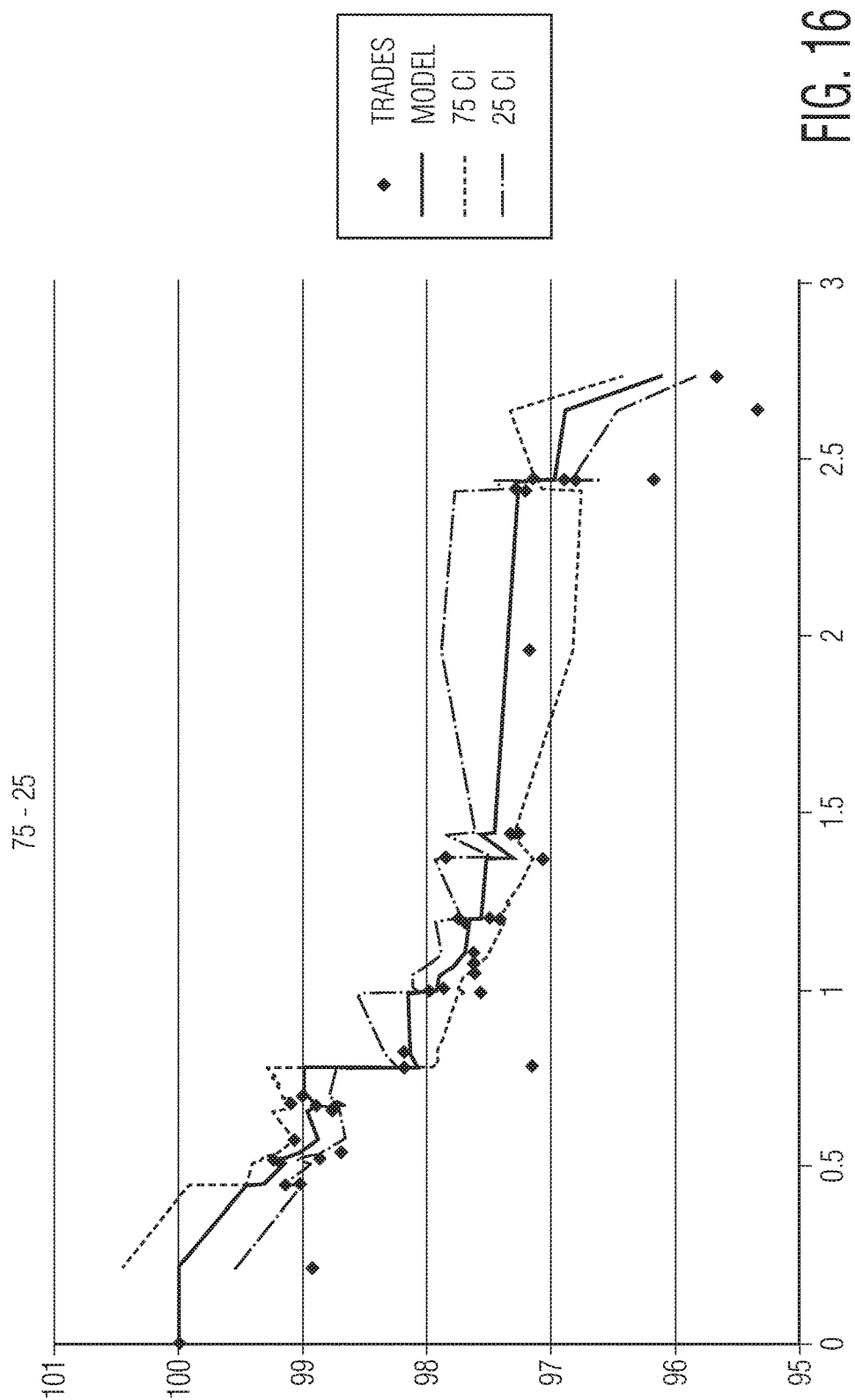
FIG. 16 depicts an exemplary graph of a 75-25 confidence interval.

FIG. 16 depicts an exemplary graph of a 75-25 confidence interval. The 25 and 75 graph-lines lines in FIG. 16 are the configurable values and we can alter their values in later step.

The output of confidence/quality measure below may generate a confidence interval width. Narrow intervals express greater confidence in the model price than wider intervals. The graph below illustrates the relationship between the confidence interval range and trade activity. From the graph, confidence interval is narrower at the point where trading volume is active. This is because the model has more trading information when the security is liquid, and the user is confident at this model price with more trading information and activities.

After running the overnight regression each day, the width of the confidence interval over next trade is provided in the table below:

| Time since last trade | 75-25 interval | 90-10 interval | 95-5 interval | Ratios | |
|---|---|---|---|---|---|
| <1 min | +/−9 cents | +/−27 cents | +/−44 cents | 3× | 5× |
| 2 hours | +/−22 cents | +/−58 cents | +/−89 cents | 2.6× | 4× |
| 2 weeks | +/−80 cents | +/−180 cents | +/−400 cents | 2.3× | 5× |
| Normal dist |  |  |  | 1.9× | 2.4× |

This describes, for example at time since last trade is less than 1 minute, if model price is $100, then the 75-25 confidence interval may be 100±0.09, i.e., [99.91, 100.09]. The 90-10 and 95-5 confidence intervals are much wider than 75-25, due to fat tails. In an exemplary embodiment, using 75-25 may be preferred if confidence interval is over next trade price.

2.1 Basic Workflows

Confidence intervals may be estimated at the same frequency as value estimates. In particular, a series of rolling window regressions may be run each evening and the betas from these regressions are used next day to calculate a pre-trade value estimate and confidence interval as of the time each trade. The betas from the last rolling window are stored and used to create value estimates that can be updated in response to new trades or the passing of time without a new trade. Like value estimates, confidence intervals may depend on the elapsed time since the last trade and on market movements since the last trade, as captured by ETF movements. In particular, confidence intervals generally widen as time passes without a trade, both in response to the passage of time and in response to cumulative changes in ETFs.

2.1.1 Logic Flowchart of Model Pricing Phase One & Phase Two

Figure 17:
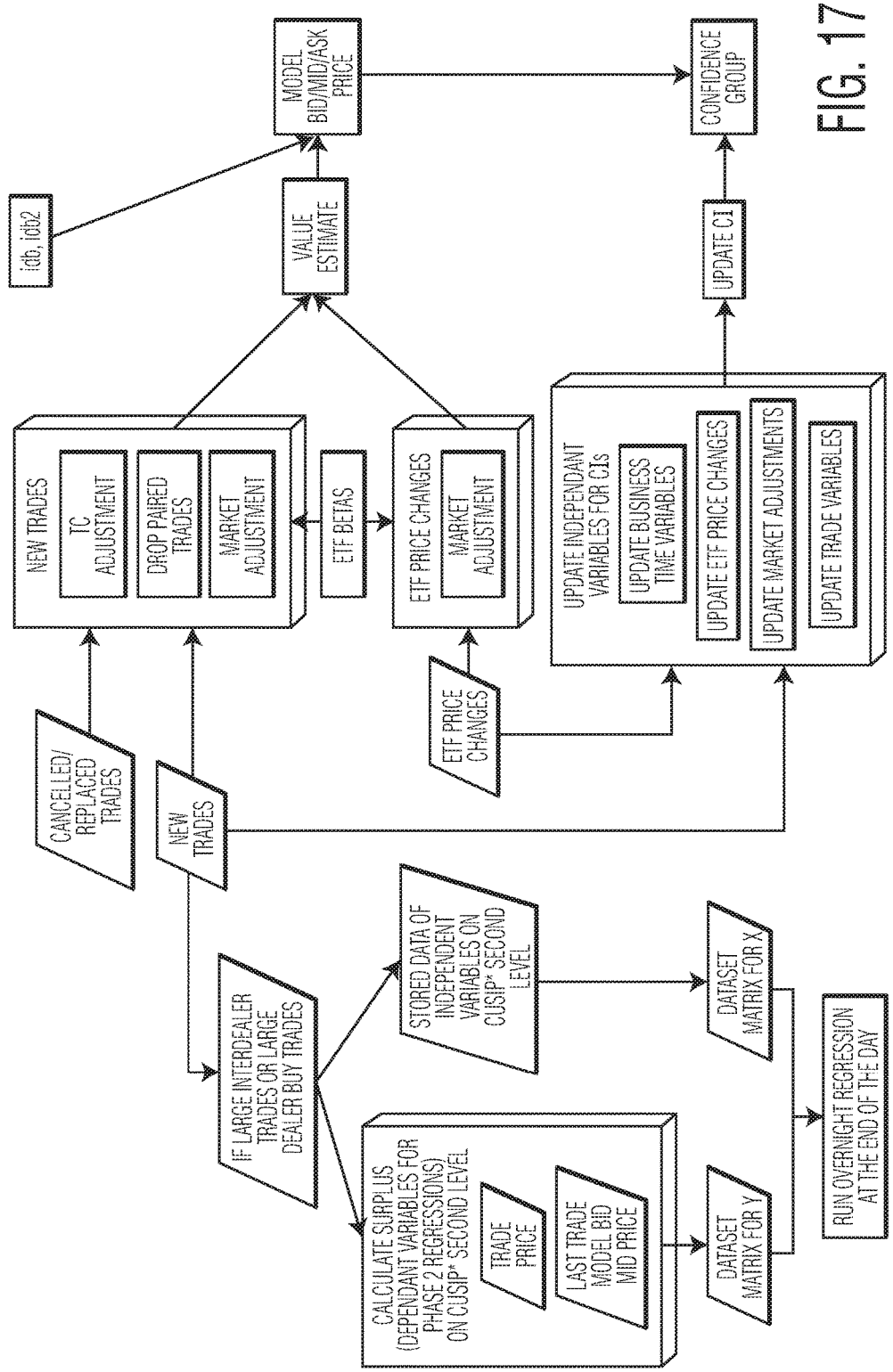
FIG. 17 depicts an exemplary flowchart showing the logic of real-time process of model pricing Phase One and Phase Two, and the connection between the two phases.

FIG. 17 depicts an exemplary flowchart showing the logic of real-time process of model pricing Phase One and Phase Two, and the connection between the two phases.

2.2 Data Preparation

This section describes data needed in order to run overnight regressions and to update real-time confidence intervals in Model Pricing Phase Two. Some of them have been calculated and obtained in Model Pricing Phase One.

2.2.1 Data Dependencies

The sample includes up to two years of past data (this much data is really necessary—quantile regressions need large samples). Similar as Data Dependencies of Phase One in section 7, two-year data of the following may be needed:

Reference Data

TRACE Trade History

Real-Time TRACE Trade Feed

ETF Price History

ETF Price Real-Time Ticking Feeds

Model Pred Mid/Bid Prices 2.2.2 Input Data Table

Table 11 shows variable names in regression functions, their variable names. There are two types of trades, defined as CUSIP * Second level, current trade and previous trade. The previous trade can be any type of trades, which includes small size trades. During out data time frame, the previous trade for the first trade of any CUSIP is defined as NULL.

For calculation of input data preparation, one way is to calculate these values for all trades on CUSIP * Second level first, aggregated multiple trades at each second. And then create two subsets: one for large dealer buy trades and the other for large interdealer trades. The previous trade of such a large trade can be either a large or a small size aggregated trade. To find the previous trade, one may go back one data element in time in the sorted data set with all trades. The current trade is the trade from to calculate surprise (calculation details in Section 2.2.3.4.), i.e., the dependent variable in quantile regression.

TABLE 11

| | | Variable Definition | | |
|---|---|---|---|---|
| Objective | Variable Names (in model) | Variable Names (in Stata code) | Coefficient Name | Data Description |
| Transaction-cost-and-market-adjusted future trade price (this is calculated in Model Pricing I) | $P_{adj}$ | f.adjp | | Not Directly Used |
| Estimated value (Model Pred Bid/Mid Price, this is calculated in Model Pricing I) | | | | For Current Trade |
| Surprise for large interdealer trades | $S_{id}$ | e2 | | For Current Trade |
| Surprise for large dealer buy trades, | $S_{db}$ | ebid2 | | For Current Trade |
| The integer for each business day | d | bday | | Between Current and Previous Trade |
| The execution time of each trade in "business time" | $d_{b,t}$ | adjtime | | Not Directly Used |
| The difference in business time between the next trade and the most recent trade | $\Delta t$ | fsadjt | CIQRegID_Coef_dt CIQRegDB_Coef_dt | Between Current and Previous Trade |
| The log difference in business time between the next and most recent trade | $\ln(\Delta t)$ | lnfsadjt | CIQRegID_Coef_lndt CIQRegDB_Coef_lndt | Between Current and Previous Trade |
| The log of one plus the difference in business day between the next and the most recent trade | $\ln(1 + \Delta d)$ | lnsbday | CIQRegID_Coef_lndbday CIQRegDB_Coef_lndbday | Between Current and Previous Trade |
| The squared change in the log LQD price between the next and most recent trade | $(\Delta \ln(LQD))^{\wedge 2}$ | fsLQD | CIQRegID_Coef_lnLQD CIQRegDB_Coef_lnLQD | Between Current and Previous Trade |
| The squared change in the log AGZ price between the next and most recent trade (only for Agency) | $(\Delta \ln(AGZ))^{\wedge 2}$ | fsAGZ | CIQRegID_Coef_lnAGZ CIQRegDB_Coef_lnAGZ | Between Current and Previous Trade |
| The squared change in the log HYG price between the next and most recent trade | $(\Delta \ln(HYG))^{\wedge 2}$ | fsHYG | CIQRegID_Coef_lnHYG CIQRegDB_Coef_lnHYG | Between Current and Previous Trade |
| The squared change in the log IEI price between the next and most recent trade (only for Agency) | $(\Delta \ln(IEI))^{\wedge 2}$ | fsIEI | CIQRegID_Coef_lnIEI CIQRegDB_Coef_lnIEI | Between Current and Previous Trade |
| The square of the market adjustment component used to update for market movements between the next and most recent trades | $(\Delta etfpred2)^{\wedge 2}$ | fetf22 | CIQRegID_Coef_etf23 CIQRegDB_Coef_etf23 | Between Current and Previous Trade |

TABLE 11-continued

| | Variable Definition | | | |
|---|---|---|---|---|
| Objective | Variable Names (in model) | Variable Names (in Stata code) | Coefficient Name | Data Description |
| The square of the market adjustment component used to update for market movements between the two most recent trades | $(\Delta etf2)^{\wedge 2}$ | etf22 | CIQRegID_Coef_etf2 CIQRegDB_Coef_etf2 | Between Current and Previous Trade |
| Indicator variable for the most recent trade having been a dealer buy or sell; Indicator variable for the most recent trade having been a client trade | $I_d$ | abstt | CIQRegID_Coef_indD CIQRegDB_Coef_indD | For Previous Trade |
| Indicator variable for the most recent trade having been a paired interdealer trade | $I_p$ | absdtt | CIQRegID_Coef_indP CIQRegDB_Coef_indP | For Previous Trade |
| The average value of the weight for the trades in the most recent CUSIP*second with a trade | $\overline{w}$ | fq | CIQRegID_Coef_w CIQRegDB_Coef_w | For Previous Trade |
| The number of trades in the most recent CUSIP*second with a trade | $N_t$ | trades | CIQRegID_Coef_Nt CIQRegDB_Coef_Nt | For Previous Trade |
| The square of the change in the baseline price $P_b$ for the most recent trade and for 5 trades ago | $(P5adj(t) - P5adj(t-5))^{\wedge 2}$ | s5a5 | CIQRegID_Coef_P5adj CIQRegDB_Coef_P5adj | For Previous Trade and 5 Trades Before It |
| YTM30 | $YTM_{30}$ | ytm | CIQRegID_Coef_ytm CIQRegDB_Coef_ytm | Bond |
| Sum of $\overline{w}$ variable for last 5 CUSIP*seconds with trades (t-1 to t-5) | $\overline{w}5$ | fq5 | CIQRegID_Coef_w5 CIQRegDB_Coef_w5 | For Previous Trade and 4 Trades Before It |
| The rating variable R | R | rat | CIQRegID_Coef_R CIQRegDB_Coef_R | Bond |
| The model-estimated transaction cost from the most recent large dealer buy (for large dealer buy trade, tc3 is denoted as ldb3; for large interdealer trade, tc3 is set as zero) | ldb3 (or ldb, if ldb2 is not available) ldb3 = min(0, ldb2) | ldb3 | CIQRegID_Coef_ldb3 CIQRegDB_Coef_ldb3 | For Previous Trade Valid ldb3 at Previous Trade Time |
| Intercept term of quantile regression in Section 3 | | | CIQRegID_beta0 CIQRegDB_beta0 | |

All input data passed to quantile regression (Section 3) may be aggregated trades but not atomic trades, on CUSIP*second level. It is acceptable if they are not real integers but with decimal points. For example, it is okay to have 0.667 under the column of indicator variable. In addition, when the input data compares two most recent trades, there is no requirement for the trade type, which means the trades are not only large dealer buy or interdealer trades, and they can be any size and type of trades.

2.2.3 Input Data Definition

This section defines input data in the table above in detail, and describes their calculations. Specifically, overnight regressions are run separately for two types of trades—large interdealer trades and large dealer buy trades. "Large" is defined as trades with size over $1,000,000. And two separate datasets are needed—one of large interdealer vs. model mid surprises, and one of large dealer buy vs. model bid surprises. Therefore, data and calculation results from Phase One of these two trades may be prepared and obtained before overnight regressions.

When a large interdealer trade or a large dealer buy trade comes in, store values of all the independent variables may be updated (required for overnight regressions in Section 3) of this trade. And set these values as a dataset of matrix, X, in the regression equation. To calculate the dependent variable, i.e., the surprise, only large interdealer and large dealer buy trade may be needed, thus, the dataset both for dependent variable and independent based on large interdealer and large dealer buy trade is set up. However, the confidence interval may be updated whenever a trade comes in at real time, regardless of large interdealer or large dealer buy trade. This means variables below may also be stored and used in real time calculation for the purpose of updating confidence intervals. But definition of distance in time may be different between data definition for overnight regression and data definition for real time calculation: all the time difference defined below for the purpose of overnight regression is the passage of time between two large interdealer trades (or two large dealer buy trades); while in real-time process, the passage of time may be defined as time distance between two any trades (regardless of large interdealer or large dealer buy trades). Also, the definition of indicator variable at real time for all trades may be different than the below: at real-time, it is defined the way as the table at Section 2.2.2.

In summary, here is the list of data needed to update and store when a large interdealer trade or a large dealer buy trade arrives (data of these two types of trades may be stored separately):

Trade price, trade size: these two are used for calculation of average adjusted trade price in Section 2.2.3.3.

$S_{id}$, $S_{db}$, Surprises: this is the dependent variable of the overnight regression, and this may be a data set (matrix Y) including all the large interdealer trades or large dealer buy trades information during the day based on CUSIP*second level.

Execution time of the trade: executed time of this large interdealer trade (or large dealer buy trade).

Business day and business time: calculation of these two is based on execution time of the trade, and calculation functions are in the following section 2.2.3.6.

$\Delta t$, The difference in business time between this large interdealer trade (or large dealer buy trade) and the most recent large interdealer trade (or large dealer buy trade).

$\ln(\Delta t)$, The log difference in business time between this large interdealer trade (or large dealer buy trade) and the most recent large interdealer trade (or large dealer buy trade).

$\ln(1+\Delta d)$, The log of one plus the difference in business day between the next large interdealer (or large dealer buy) trade and most recent large interdealer (or large dealer buy) trade.

$(\Delta \ln(LQD))^2$, The squared change in the log LQD price between this large interdealer trade (or large dealer buy trade) and most recent large interdealer (or large dealer buy) trade.

$(\Delta \ln(AGZ))^2$, The squared change in the log AGZ price between this large interdealer trade (or large dealer buy trade) and most recent large interdealer (or large dealer buy) trade (only for Agency).

$(\Delta \ln(HYG))^2$, The squared change in the log HYG price between this large interdealer trade (or large dealer buy trade) and most recent large interdealer (or large dealer buy) trade.

$(\Delta \ln(IEI))^2$, The squared change in the log IEI price between this large interdealer trade (or large dealer buy trade) and most recent large interdealer (or large dealer buy) trade (only for Agency).

$(etf23)^2$, The square of the market adjustment component used to update for market movements between this large interdealer trade (or large dealer buy trade) and most recent large interdealer trades (or large dealer buy trades); this is etf23 in Model Pricing Phase One, and calculation equations are in Model Pricing Section 4.6.3.3.

$(etf2)^2$, The square of the market adjustment component used to update for market movements between the two most recent large interdealer (or large dealer buy) trades (the two previous trades before this new large interdealer or large dealer buy trade).

$I_d$, $I_p$, Indicator variable for whether this is a large interdealer or large dealer buy trade.

$N_t$, The number of trades at this executed second when the large interdealer or large dealer buy trade arrives (multiple trades could occur at the same executed second along with this large interdealer or large dealer buy trade); see more details at Section 2.2.3.8.

$\overline{w}$, The average value of the weight for the trades in the executed second when this recent large interdealer or large dealer buy trade arrives; calculation details are in the following section 2.2.3.9.

$YTM_{30}$, The year to maturity of the security, definition is at Section 2.2.3.11.

$(P5adj(t)-P5adj(t-5))^2$, The square of the change in the baseline price for this large interdealer trade or large dealer buy trade and for 5 trades (large interdealer or large dealer buy trade) ago ldb3, or ldb2 or ldb if ldb3 is not available, The model-estimated transaction cost from the most recent large dealer buy trade; for large interdealer trades, set ldb3=0, i.e., their transaction costs are set to zero In the above items, from $\Delta t$ to ldb3 together with the bond's rating variable R, all these variables may be included in the dataset as matrix X working as independent variables for the overnight regression at the end of the day. For agency, replace ETF tickers LQD with AGZ, HYG with IEI both in overnight regressions and in real-time calculation process.

2.2.3.1. Collapse Multiple Trades at CUSIP*Second

Similarly as Model Pricing Phase One, the data is collapsed to the CUSIP*second level in Phase Two as well. This means if multiple trades occurred in the same second, they are collapsed in the same second into an average price. For example, there is one model bid/mid price or average adjusted trade price for an executed second with a trade or multiple trades. Same as Phase One, trades are ordered within each issue based on execution time. For cases with multiple trades executed in a given second, trades are ordered by IssuePriceID. This is also the reason that in output files at Section 6, columns such as model prices, adjusted trade prices, etc., are displayed in bond-level output file but not trade-level output file. The result of these columns is aggregated trade result if multiple trades occurred in the execution second. In other words, a model price or adjusted price is not calculated for each trade but for per second.

2.2.3.2. Model Bid/Mid Prices

In Phase One, when new trade comes in or ETF price changes, model price is updated triggered by these two factors, and thus new model bid/mid price is produced. Model bid/mid price is stored whenever the model updates. To calculate the dependent variable for overnight regression, the model bid/mid price is sued right before the large interdealer trade or large dealer buy trade occurred, i.e., the last updated model bid/mid price before the large interdealer trade or large dealer buy trade comes in.

2.2.3.3. Average Adjusted Trade Price

Whenever a large interdealer trade or large dealer buy trade comes in, this average adjusted trade price is calculated by using the equation below. At real time, the average transaction-cost-adjusted price is within each second with a trade. For each CUSIP*second, take a weighted average of data for all large interdealer trades or large dealer buy trades executed that second. For example, at time t, there are T large interdealer trades at the executed second t denoted as $t_i i=1,2, \ldots T$, the calculation is done as the following:

$$P_{adj} = \frac{\ln\left(\frac{lotsize(t_1)}{100}\right)*(p(t_1)-tc3(t_1)) + \ln\left(\frac{lotsize(t_2)}{100}\right)*(p(t_2)-tc3(t_2)) + \ldots + \ln\left(\frac{lotsize(t_T)}{100}\right)*(p(t_T)-tc3(t_T))}{\ln\left(\frac{lotsize(t_1)}{100}\right) + \ln\left(\frac{lotsize(t_2)}{100}\right) + \ldots + \ln\left(\frac{lotsize(t_T)}{100}\right)} \quad (2.1)$$

where $lotsize(t_i)$ is the size of large interdealer trade i, $P(t_i)$ is the trade price of trade i, $tc3(t_1)$ is the transaction cost of trade i.

In an exemplary embodiment, use ln(lotsize/100) weight averaging consistently for any aggregation in Phase One and Phase Two. Save this average adjusted trade price for the purpose of calculating dependent variable, i.e., the surprise, for overnight regression.

2.2.3.4. Surprise

After the average adjusted trade price is obtained for each large interdealer trade or large dealer buy trade, the difference is calculated between this average adjusted trade price and model price on CUSIP*second level, i.e., the surprise. Save all the values of surprise on CUSIP*second level during the day, and set up a dataset for it as matrix, Y, in the regression equation. This is used as the dependent variable in the quantile regression in Section 3.

For large interdealer trades, model mid price is used to calculate the surprise as the squared difference between the average large interdealer trade price at CUSIP * second t+1 and the mid model price after CUSIP*second t, updated for the market change between t and t+1. t+1 is current time if a large interdealer trade arrives now, and t is the most recent model mid price updated by t+1.

For large dealer buy trades, model bid price is used to calculate the surprise as the squared difference between the average large client trade price at CUSIP * second t+1 and the bid model price after CUSIP*second t, updated for the market change between t and t+1. t+1 is current time if a large dealer buy trade arrives now, and t is the most recent model bid price updated by t+1.

Model mid price and model bid price are calculated in Model pricing Phase One Section 4, and this price is updated whenever a new trade comes in, regardless of whether it is large interdealer trade or dealer buy trade or not. Then calculate the difference between the average adjusted trade price (in Section 2.2.3.3.) and the estimated value (model bid/mid price). Call this the surprise, and calculate its square as the following equation shows:

$$S_{id}(t+1)^2 = (P_{avg}(t+1) - \text{Model Pred Mid Price}(t+1))^2 \quad (2.2)$$

$$S_{db}(t+1)^2 = (P_{avg}(t+1) - \text{Model Pred Bid Price}(t+1))^2 \quad (2.3)$$

Thus, $S_{id}$—the surprise of all interdealer trades is difference between next price and mid model; $S_{db}$—the surprise of all dealer buys is the difference between next price and bid model. Model Pred Bid/Mid Prices are calculated in Model Pricing Phase One.

2.2.3.5. Execution Time

The time stamp of each trade, regardless of large interdealer or large dealer buy trade or not, of their execution time is used. Business time and business day may be calculated from this execution time.

2.2.3.6. Business Day and Business Time

The execution time of each trade, regardless of large interdealer or large dealer buy trade or not, is converted into "business time" in Model Pricing Phase Two. In order to calculate business time, business days (i.e., weekdays excluding bond market holidays) are numbered consecutively since the beginning of the sample. Then, business time equals to the integer for each business day added to $$\max(0, \min(1, [\text{seconds since 8 } AM \text{ } NY \text{ time}/3600/9)])).$$

Business time is denoted as t, and business day is denoted as d. Business time can be decimal, while business day can only be integer.

For example:

A trade at 12:30 PM on business day 3 would have business time 3.5.

A trade between 5 PM on business day 3 and before 8 AM on business day 4 would have business time 4.0.

Business time may adjust for daylight savings. Additionally, business days may be adjusted for holidays.

2.2.3.7. ETF Prices at Executed Time

In an exemplary embodiment, data is sampled every 15 minutes during regular equity trading hours to check ETF price changes, and this frequency could be increased in real time process. If ETF price changes from the previous 15 minutes when checked, the new ETF price is stored, at the same time model price from Phase One may be updated as market adjustments update between last updated time and now (triggered by ETF price changes).

In addition, current execution time is stored when with new ETF prices, and this execution time is converted into business time. Then the real time confidence interval can be updated based on this ETF price changes and the new business time.

2.2.3.8. Number of Trades

Count and save the number of trades, regardless of large interdealer or large dealer buy trade, in the most recent CUSIP*second with a large interdealer trade or large dealer buy trade, and this variable is denoted as $N_t$.

2.2.3.9. Average Weight

Calculate and save the average value of the weight for the trades in the most recent CUSIP * second (if multiple trades occurred at this executed second) with a large interdealer or large dealer buy trade as:

$$\overline{w} = \frac{\sum w}{\sum N_t} \quad (2.4)$$

where $$w = \ln\left(\frac{Lotsize}{\$100}\right),$$

and $N_t$ is defined as above.

2.2.3.10. Sum of Last 5 Average Weights

Calculate and save the sum of $\overline{w}$ variable for last 5 CUSIP*seconds with trades (t−1 to t−5) as:

$$\overline{w}5 = \overline{w}(t-1) + \overline{w}(t-2) + \overline{w}(t-3) + \overline{w}(t-4) + \overline{w}(t-5) \quad (2.5)$$

2.2.3.11. Years To Maturity

Use $YTM_{30}$ in confidence interval calculations. It is defined as:

$$YTM_{30} = \max(0, \min(30, ytm)) \quad (2.6)$$

where ytm is the years to maturity from Model Pricing Phase One. This calculation also equals to $10 \ast YTM_{10} + 20 \ast YTM_{20}$, where $YTM_{10}$ and $YTM_{20}$ are defined in Model Pricing Phase One ($YTM_{20} = \min(20, \max(0, ytm-10))/10$).

3. Quantile Regressions for Confidence Interval Calculation

This section describes the methodology of running quantile regressions for confidence intervals. The confidence interval overnight regression only considers two types of trades: large interdealer trades and large dealer buy trades. However, at real time updates of confidence interval model is triggered by any types of trades.

3.1 Estimate Confidence Interval

Once squared surprise is calculated for each CUSIP*second with large interdealer and or large dealer buy trades during the day as section 2.2.3.4. shows, a quantile regression is run with squared surprise as the matched dependent variable and the variables listed above in section 2.2.2. as the independent variables. Both the dependent variables and independent variables are dataset, i.e., two matrix (Y and X) including intraday data on CUSIP*second level. Two regressions may be needed here: one regression is run for large interdealer trades vs. model mid surprises and another for large dealer buys vs. model bid surprises. Observations are weighted by $$w = e^{-\left[\frac{today-day\ of\ trade}{3652.5}\right]} \quad (3.1)$$

Weighted observations in his quantile regression code may be used, though there is minimal difference and impact between weighted and unweighted observations in quantile regression.

Currently, there is a "weight" column in QRegression API code, but whether to implement it internally or not is pending. The quantile predicted by the regression is the 50th percentile.

3.1.1 Regression 1: Calculate Betas and Predicted Values

3.1.1.1. Basis functions: Variables Designed to Capture Confidence Intervals in Regression 1

Input data including datasets of dependent variable and independent variables can be obtained from Section 2. Regressions are run separately by using two different datasets—one of large interdealer vs. model mid surprises, and one of large dealer buy vs. model bid surprises. The following independent variables are defined as for two consecutive trades of the same type, and time difference between two consecutive trades of the same type.

Excluding constant term, the number of basis functions is 16 (M=16, see Appendix A). Basis functions are identified as follows:

$g_1(t_i, \ldots) = \Delta t$, days apart in decimal, for two consecutive trades of the same type, $\Delta t$ and $\Delta d$ are different $g_2(t_i, \ldots) = \ln(\Delta t)$ $g_3(t_i, \ldots) = \ln(1+\Delta d)$, days apart in integer $g_4(t_i, \ldots) = (\Delta \ln(LQD))^2$, log change in price, squared $g_4(t_i, \ldots) = (\Delta \ln(AGZ))^2$, log change in price, squared, for Agency use AGZ instead of LQD $g_5(t_i, \ldots) = (\Delta \ln(HYG))^2$ $g_5(t_i, \ldots) = (\Delta \ln(IEI))^2$, for Agency use IEI instead of HYG $g_6(t_i, \ldots) = (etf23)^2$, etf23 change, squared (between current large interdealer/dealer buy trade and the most recent trade of the same type)

$g_7(t_i, \ldots) = (etf2)^2$, etf2 change, squared (between two previous trades of current large interdealer/dealer buy trade, the same type as the current large interdealer/dealer buy trade)

$g_8(t_i, \ldots) = I_d$, equals to 1 if trade t−1 is a large dealer buy trade; otherwise 0

$g_9(t_i, \ldots) = I_p$, equals to 1 if trade t−1 is a large paired interdealer trade; otherwise 0

$g_{10}(t_i, \ldots) = N_t$, this is an output from Section 2.2.3.8.

$g_{11}(t_i, \ldots) = \overline{w}$, this is an output from Section 2.2.3.9.

$g_{12}(t_i, \ldots) = \overline{w}5$, this is an output from Section 2.2.3.10.

$g_{13}(t_i, \ldots) = YTM_{30}$, this is an output from Section 2.2.3.11.

$g_{14}(t_i) = R$, same as Model Pricing Phase One $g_{15}(t_i) = (P5adj(t) - P5adj(t-5))^2$, baseline price is defined in the most recent Model Pricing Phase One Section 4.6.4.1.

$g_{16}(t_i, \ldots) = ldb3$, this is min(0, ldb2), where ldb2 is obtained from Model Pricing Phase One for large dealer buy trades $f(t_i, \ldots) = (S_{id})^2$ or $(S_{db})^2$, dependent variable Y

3.1.1.2. The left-hand-side of the regression

The left-hand-side for this regression includes the squared surprise for large interdealer/dealer buy trades. Similarly as regression in Phase One, this regression is run on rolling 24-month windows of data. Coefficients from the regression run using data from t−24 months to t are applied to the variables from trades from month t+1 to yield and out-of-sample predicted value, see section for predicted value calculation below.

3.1.1.3. Outputs: Betas and Out-of-sample Predicted Value

The output from this regression is the betas and predicted values calculated out of sample.

$$V_{pred} = \beta_0 + \sum_{j=1}^{16} \beta_j(t) \times g_j(s)_{s>t} \quad (3.2)$$

These predicted values are truncated at the $1^{st}$ and $99^{th}$ percentiles from the most recent month. A minimum of $(0.05\text{ points})^{0.2}$ is also applied, i.e., replace the value with $0.05^2$ if it is less than that. The square root of this predicted value, $\sqrt{V_{pred}}$, is the width of the 75-25 confidence interval around each value estimate (this square root of the predicted value is one-half of the confidence interval).

3.1.1.4. Intercept term of the regression

For quantile regression, the default may be in Stata, which use_const term. When doing prediction, include the intercept term, but use default method for prediction. So intercept term is included in quantile regression analysis. In an exemplary embodiment, the following codes from Stata .do file are used:
cap qreg e2 fsadjt lnfsadjt lnsbday ldb3 fsLQD fsHYG fetf22 etf22 abstt absdtt fq fq5 ytm rat s5a5 trades if f.tt==0&f.dtt==0&fs.dt>0&f. fq>9.2&m>='m'-24&m<'m' [aw=w], nolog
cap predict temp
cap replace p1=temp if m=='m'

3.2 Summary of Outputs

Table 12 below is the summary of outputs from Section 3 quantile regression, which are used in Section 4 for real time confidence interval update.

TABLE 12

Output Summary from Quantile Regressions

| Objective | Regression No./Function | Coefficient Name |
|---|---|---|
| Calculate predicted value and confidence interval for model mid price | Large Interdealer Trade Regression | CIQRegID_beta0 CIQRegID_Coef_dt CIQRegID_Coef_lndt CIQRegID_Coef_lndbday CIQRegID_Coef_lnLQD CIQRegID_Coef_lnHYG CIQRegID_Coef_etf23 CIQRegID_Coef_etf2 CIQRegID_Coef_indD CIQRegID_Coef_indP CIQRegID_Coef_w CIQRegID_Coef_w5 CIQRegID_Coef_Nt CIQRegID_Coef_P5adj CIQRegID_Coef_ytm CIQRegID_Coef_R CIQRegID_Coef_ldb3 |
| Calculate predicted value and confidence interval for model bid price | Large Dealer Buy Trade Regression | CIQRegDB_beta0 CIQRegDB_Coef_dt CIQRegDB_Coef_lndt CIQRegDB_Coef_lndbday CIQRegDB_Coef_lnLQD CIQRegDB_Coef_lnHYG CIQRegDB_Coef_etf23 CIQRegDB_Coef_etf2 CIQRegDB_Coef_indD CIQRegDB_Coef_indP CIQRegDB_Coef_w CIQRegDB_Coef_w5 CIQRegDB_Coef_Nt CIQRegDB_Coef_P5adj CIQRegDB_Coef_ytm CIQRegDB_Coef_R CIQRegDB_Coef_ldb3 |

4. Update Confidence Intervals in Real-Time

When new trades come in or ETF price changes, value estimates are updated as described at Section 4 in the Model Pricing Phase One, new values of the dependent and independent variables of the regression in 3.1.1. are calculated if necessary for new betas calculation, and the updated betas estimated from the prior evening are used to calculate the new confidence intervals as shown in 3.1.. Triggered by new trades or ETF price changes, both model price (value estimation) in the most recent Model Pricing Phase One at Section 4 and confidence interval may be updated. The new trade information may be used and new ETF prices may be used to re-calculate new model mid/bid price and new confidence interval. If the new trade is large interdealer or large dealer buy trades, then new values of the dependent and independent variables of the regression may be updated and stored for the overnight regression at the end of the day. Coefficient names are defined in Section 2.2.2.. Also, variable mapping between model and Stata coding are listed in the table at Section 2.2.2..

4.1 Update Independent Variables at Real-Time

After the coefficients from overnight regression at Section 3 are obtained, confidence interval is updated with new betas when new trades arrive or ETF price changes at real time.

4.1.1 Collapse Multiple Trades at CUSIP*Second

Similarly as Model Pricing Phase One, the data is collapsed to the CUSIP*second level in Phase Two real-time calculation as well. This means if multiple trades occurred in the same second, they are collapsed in the same second into an average price. For example, there may be only one model bid/mid price or average adjusted trade price for an executed second with a trade or multiple trades. This is also the reason that in output files at Section 6, columns such as model prices, adjusted trade prices, etc. are displayed in bond-level output file but not trade-level output file. The result of these columns is aggregated trade result if multiples trades occurred in the execution second. In other words, a model price or adjusted price is not calculated for each trade but for per second.

4.1.2 RT Input Data

Similarly as the list at Section 2.2.3., at real-time whenever new trades come in or ETF price changes, all independent variables are updated and the new confidence interval are re-calculated by using coefficients from overnight regressions.

In summary, here is the list of data that may be needed to update and store when new trade arrives:

Trade price, trade size: these two are used for calculation of average adjusted trade price in Section 2.2.3.3.; they are only stored and used if the new trade is a large interdealer or large dealer buy trade $S_{id}$, $S_{db}$, Surprises: this is the dependent variable of the overnight regression, and this may be a data set (matrix Y) including all the large interdealer trades or large dealer buy trades information during the day based on CUSIP*second level; this is only calculated and stored for large interdealer or large dealer buy trade Execution time of the trade: executed time of the new trade or new ETF price Business day and business time: calculation of these two is based on execution time of the trade, and calculation functions are in the following section 2.2.3.6.

$\Delta t$, The difference in business time between this new trade and the most recent trade $\ln(\Delta t)$, The log difference in business time between this new trade and the most recent trade $\ln(1+\Delta d)$, The log of one plus the difference in business day between this new trade and most recent trade $(\Delta \ln(LQD))^2$, The squared change in the log LQD price between this new trade and most recent trade $(\Delta \ln(AGZ))^2$, The squared change in the log AGZ price between this new trade and most recent trade (only for Agency)

$(\Delta \ln(HYG))^2$, The squared change in the log HYG price between this new trade and most recent trade $(\Delta \ln(IEI))^2$, The squared change in the log IEI price between this new trade and most recent trade (only for Agency)

$(etf23)^2$, The square of the market adjustment component used to update for market movements between this new trade and most recent trade; this is etf23 in Model Pricing Phase One, and calculation equations are in the most recent Model Pricing Section 4.6.3.

$(etf2)^2$, The square of the market adjustment component used to update for market movements between the two most recent trades (the two previous trades before this new trade)

$I_d$, $I_p$, Indicator variable for whether this is a client trade, a large dealer buy or a paired interdealer trade; definition of this indicator variables is in Section 2.2.2. table $N_t$, The number of trades at this executed second when this new trade arrives (multiple trades could occur at the same executed second along with this new trade); see more details at Section 2.2.3.8.

$\bar{w}$, The average value of the weight for the trades in the executed second when this new trade arrives; calculation details are in the following section 2.2.3.9.

$YTM_{30}$, The year to maturity of the security, definition is at Section 2.2.3.11.

$(P5adj(t)-P5adj(t-5))^2$, The square of the change in the baseline price for this new trade and for 5 trades ago tc3, or tc if tc3 is not available, The model-estimated transaction cost from the most recent trade (Note: For large interdealer trade, they may be simplified as large unpaired interdealer trade, which has zero transaction cost; so this variable may be removed from the calculation for large interdealer trade)

4.1.3 Update Independent Variables in RT Calculation

When new trade arrives or each ETF price changes, the intraday calculation is done by using the updated independent variables of the new trade (defined as above in 4.1.2.) or change of the ETF price $V_{pred}$=+CIQRegID_Coef_beta0+CIQRegID_Coef_dt * Δt +CIQRegID_Coef_lndt * ln(Δt) +CIQRegID_Coef_lndbday * ln(1+Δd) +CIQRegID_Coef_lnLQD * (Δln (LQD))², use +CIQRegID_Coef_lnAGZ * (Δln (AGZ))² in Agency +CIQRegID_Coef_ lnHYG * (Δln(HYG))², use + CIQRegID_Coef_lnIEI * (Δln(IEI))² in Agency +CIQRegID_Coef_etf23 * (etf23)²+
CIQRegID_Coef_etf2 * (etf2)²+
CIQRegID_Coef_indD * $I_d$+
CIQRegID_Coef_indP * $I_p$+CIQRegID_Coef_w * $\bar{w}$+CIQRegID_Coef_w5 * $\bar{w}$+CIQRegID_Coef_Nt * $N_t$+CIQRegID_Coef_P5adj * (P5adj(t)-P5adj(t-5))²+CIQRegID_Coef_ytm * YTM30+CIQRegID_Coef_R * R+CIQRegID_Coef_ldb3 * ldb3 (4.1)

where baseline price is defined as $$P5_{adj}(t) = \frac{P_{adj}(t) + P_{adj}(t-1) + P_{adj}(t-2) + P_{adj}(t-3) + P_{adj}(t-4)}{5},$$

and all the independent variables are defined in Section 2.2.2., Table 11.

4.1.4 Calculate the Width of CI

These predicted values are truncated at the $1^{st}$ and $99^{th}$ percentiles from the most recent month. A minimum of (0.05 points)$^{62}$ is also applied, i.e., replace the value with $0.05^2$ if it is less than that. The square root of this predicted value, $\sqrt{V_{pred}}$, is the width of the 75-25 confidence interval around each value estimate (this square root of the predicted value is one-half of the confidence interval). For interdealer trades, value estimate is the model mid price; and for dealer buy trades, value estimate is the model bid price.

5. Model Output Files

Similarly as in Model Pricing Phase One, at four times of each trading day (i.e. 10 am, 12 pm, 3 pm and 4 pm), two output files may be generated (in Excel .csv format): bond-level output file and trade-level output file. The output files provide data analysis for Model Pricing, especially supporting Methodology to check the performance of the model. New fields are added at the end of the existing tables from Model Pricing Phase One Section 6, and are highlighted below.

5.1 Bond-Level Output File

The bond-level output file may contain all the statistics data for each certain security, for Phase One it has: Model Price (Bid/Mid/Ask Price), New Price (Bid/Mid/Ask Price), Difference in Prices, Last 5 Trades' Price, Last 5 Transaction Cost Adjustments, Transaction Cost Coefficients, Market Adjustment Coefficients, Value Estimate Coefficients; for Phase Two it may add new columns as: Business Day, Confidence Intervals Coefficients. This file includes all the regression results generated while running the model. Table 13 below shows all the available fields in the bond-level output file:

TABLE 13

Available Fields of Bond-level Output File

Available Fields

| | | |
|---|---|---|
| Sector | Security ID | Security Description |
| Model Bid Price | Model Mid Price | Model Ask Price |
| New Bid Price | New Mid Price | New Ask Price |
| Diff in Bid Price | Diff in Mid Price | Diff in Ask Price |
| Last Trade Price | Last Second Trade Price | Last Third Trade Price |
| Last Fourth Trade Price | Last Fifth Trade Price | Last Transaction Cost Adj |
| Last Second Transaction Cost Adj | Last Third Transaction Cost Adj | Last Fourth Transaction Cost Adj |
| Last Fifth Transaction Cost Adj | Reg1_Coef_tt | Reg1_Coef_dtt |
| Reg1_Coef_ttfq | Reg1_Coef_dttfq | Reg1_Coef_fq |
| Reg1_Coef_ttpos | Reg1_Coef_dttpos | Reg1_Coef_ttposfq |
| Reg1_Coef_dttposfq | Reg1_Coef_ttrat | Reg1_Coef_ttmat15 |
| Reg1_Coef_ttposrat | Reg1_Coef_ttposmat15 | Reg1_Coef_ttfqrat |
| Reg1_Coef_ttfqmat15 | Reg1_Coef_ttfqmat15rat | Reg1_Coef_dttfqrat |
| Reg1_Coef_dttfqmat15 | Reg1_Coef_dttfqmat15rat | Reg1_Coef_ttposfqrat |
| Reg1_Coef_ttposfqmat15 | Reg1_Coef_ttposfqmat15rat | Reg1_Coef_dttposfqrat |
| Reg1_Coef_ttposfqmat15 | Reg2_Coef_sLQD | Reg2_Coef_sLQDmat10 |
| Reg2_Coef_sLQDrat | Reg2_Coef_sLQDmat10rat | Reg2_Coef_sLQDhy |

TABLE 13-continued

Available Fields of Bond-level Output File

Available Fields

| | | |
|---|---|---|
| Reg2_Coef_sLQDhyrat | Reg2_Coef_sLQDmat10hy | Reg2_Coef_sLQDmat10hyrat |
| Reg2_Coef_sHL | Reg2_Coef_sHLmat10 | Reg2_Coef_sHLrat |
| Reg2_Coef_sHLma10rat | Reg2_Coef_sHLhy | Reg2_Coef_sHLhyrat |
| Reg2_Coef_sHLmat10hy | Reg2_Coef_sHLmat10hyrat | Reg2_Coef_sLM10a |
| Reg3_Coef_spy3 | Reg3_Coef_spy3 | Reg4_Coef_col |
| Reg4_Se_sel | Reg5_Coef_coh | Reg5_Se_seh |
| Reg6_Coef_stc | Reg6_Se_stc | Reg6_Coef_etf2 |
| Reg6_Se_etf2 | Reg7_Coef_x | Reg7_Coef_dx |
| Reg7_Coef_udx | Reg7_Coef_xLnft | Reg7_Coef_xLnt |
| Reg7_Coef_xig | Reg7_Coef_xfq | Reg7_Coef_xsame |
| Reg7_Coef_xpos | Reg72_Coef_x2 | Reg72_Coef_x2ud |
| Reg72_Coef_x2Lnft | Reg72_Coef_x2Lnt | Reg72_Coef_x2ig |
| Reg72_Coef_x2fq | Reg72_Coef_x2pos | Years-To-Maturity |
| Last Trade Adjusted Price Padj1 | Last Second Trade Adjusted Price Padj2 | Last Third Trade Adjusted Price Padj3 |
| Last Fourth Trade Adjusted Price Padj4 | Last Fifth Trade Adjusted Price Padj5 | Last 5 Average TCMA Price P5adj |
| X | X2 | PredPrice |
| PredPrice2 | Business Day | CIReg1id_Coef_fsadjt |
| CIReg1id_Coef_Lnfsadjt | CIReg1id_Coef_Lnsbday | CIReg1id_Coef_fsLQD |
| CIReg1id_Coef_fsAGZ | CIReg1id_Coef_fsHYG | CIReg1id_Coef_fsIEI |
| CIReg1id_Coef_fetf22 | CIReg1id_Coef_etf22 | CIReg1id_Coef_abstt |
| CIReg1id_Coef_absdtt | CIReg1id_Coef_fq | CIReg1id_Coef_trades |
| CIReg1id_Coef_s5a5 | CIReg1id_Coef_ytm | CIReg1id_Coef_fq5 |
| CIReg1id_Coef_rat | CIReg1id_Coef_ldb3 | CIReg2db_Coef_fsadjt |
| CIReg2db_Coef_Lnfsadjt | CIReg2db_Coef_Lnsbday | CIReg2db_Coef_fsLQD |
| CIReg2db_Coef_fsAGZ | CIReg2db_Coef_fsHYG | CIReg2db_Coef_fsIEI |
| CIReg2db_Coef_fetf22 | CIReg2db_Coef_etf22 | CIReg2db_Coef_abstt |
| CIReg2db_Coef_absdtt | CIReg2db_Coef_fq | CIReg2db_Coef_trades |
| CIReg2db_Coef_s5a5 | CIReg2db_Coef_ytm | CIReg2db_Coef_fq5 |
| CIReg2db_Coef_rat | CIReg2db_Coef_ldb3 | |
| | | LID Surprise |
| LDB Surprise | Trade Execution Time | Trade Execution Time Difference |
| Trade Execution Time Log Difference | Business Day Log Difference | Squared Change of Log LQD Price |
| Squared Change of Log AGZ Price | Squared Change of Log HYG Price | Squared Change of Log IEI Price |
| Pred Squared Change of Market Adjustment | Squared Change of Market Adjustment | Weight Average |
| Trade Counts | Squared Change of Baseline Price Rating | YTM30 |
| Sum of Weight Average for Last 5 Trades | | Transaction Cost |

Note:
Last Trade Price is the most recent aggregated trade price, i.e., if there are multiple trade occurred in one second, Last Trade Price may display the weight-averaged aggregation of all trades in that 1 second. Years-To-Maturity may be calculated based on the most recent trade.
Trade Execution Time, Trade Execution Time Difference, Trade Execution Time Log Difference are in the format of business time (conversion method is at Section 2).
If the field is an aggregated trade variable, it may show the result after the most recent trade is occurred and averaged.

5.2 Trade-Level Output File

The daily trade-level output file includes all the trades' data processed by the model in one day, and fields in this file are the same as columns shown in Trade Data Enhancements for IG/HY and Agencies respectively. Table 14 below shows all the available fields in the trade-level output file:

TABLE 14

Available Fields of Trade-level Output File

Available Fields

| | | |
|---|---|---|
| Side | Size | Trade Spread |
| Trade BM | Trade Time | Time Applied |
| Model Side Indicator | Model Paired Indicator | Matched Trade ID |
| Model Updated Time | Trade Yield | Trade Price |
| LQD Price | HYG Price | TLT Price |
| IEI Price | Model Paired | Trade Execution Time |
| Client Trade Indicator | Paired Trade Indicator | |

Trade Execution Time is in the format of business time (method of conversion is in Section 2), and it is different from the format of Trade Time, which has the format as mm/dd/yyyy hh:mm:ss.

6. Pricing Modes

Model Price may be used as a source of market data to produce the Continuous Price, and if model price is chosen as the market data, notifications of model price status may have an impact on continuous price and may be managed by the evaluator. Testing of model price may be independent, like testing of trade outliers. There may be three market data types of model price, added to the Market Data Ranking screen:

High confidence of model price.

Medium confidence of model price.

Low confidence of model price.

The evaluator can select which model price to be used in Market Data Ranking algorithm as a reference to continuous price. Model price confidence intervals typically degrade as a result of two primary factors:

Time since last trade.

Volatility in traded prices.

Figure 18:
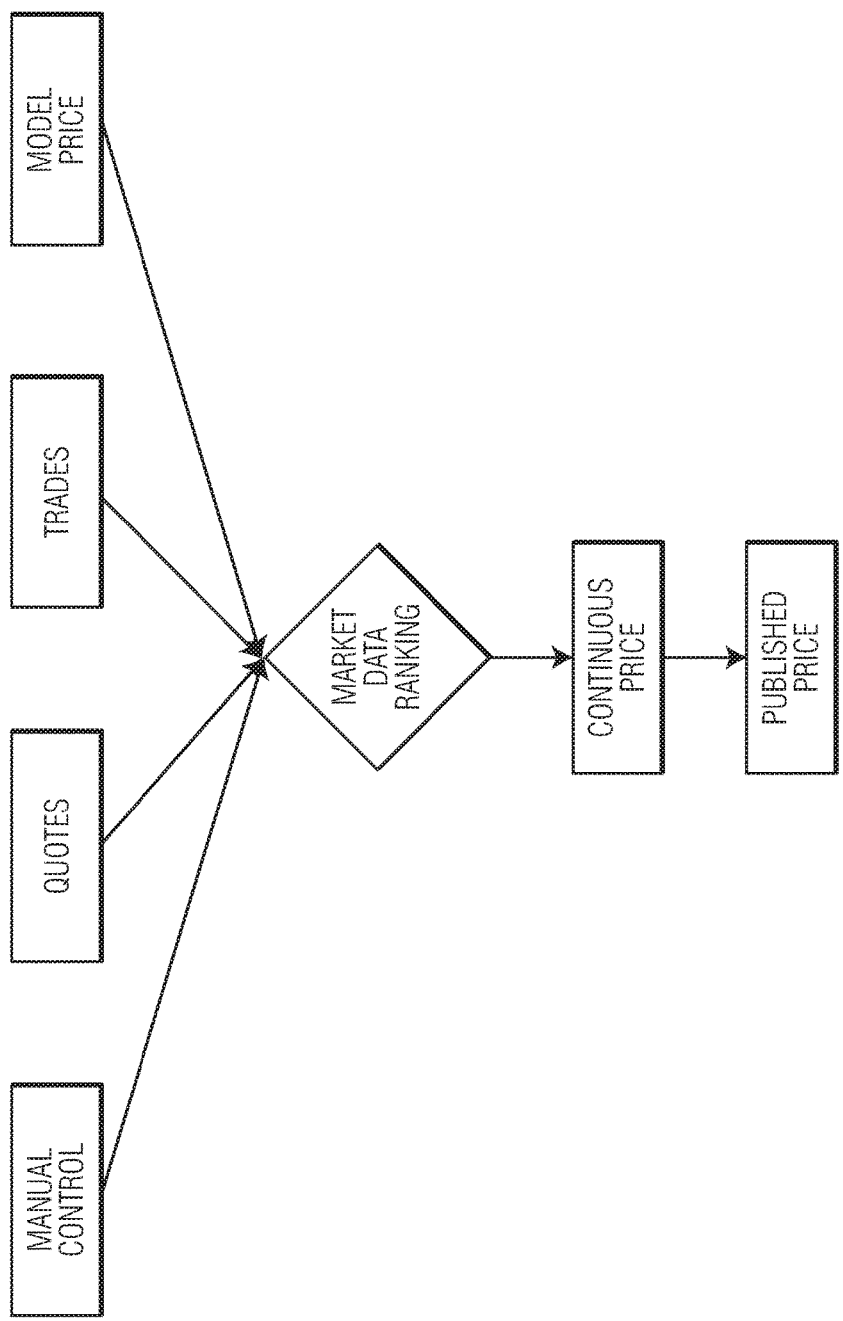
FIG. 18 depicts an exemplary flow chart of a high level workflow of how to use model price in Market Data Ranking

FIG. 18 depicts an exemplary flow chart of a high level workflow of how to use model price in Market Data Ranking. The general strategy for using the alternative plan may be:

Calculate the model price, and test model price independently.

Calculate the Confidence Interval and Confidence Group, and display on Quote screen.

Use model prices of different confidence groups as separate types in market data ranking. The ranking is manually managed as a profile, as in USIG today.

Allow the evaluator to manage notifications if model price is chosen as market data and with a suspect status.

7. Status Handling

Status may be implemented both on Dashboard and Worksheet. There is no screen or GUI specifically for Model Pricing, but notifications and status may be enhanced into Dashboard and Worksheet in different sectors, i.e., IG, HY and AGY.

7.1 Dashboard Display

Include Model notifications in Dashboard counts of Suspect and Warning notifications only if model price is chosen as the source of market data in Market Data Ranking algorithm.

No change in rule that all Suspect conditions may need to be dealt with prior to release.

7.2 Worksheet Changes

Current Status columns (Status 3 PM, Status RT, Status 4 PM) may reflect top-level status of the evaluation, i.e., the status of the Continuous Price.

No additional columns for the GUI.

8. Model Confidence Group

According to model performance by confidence interval, the model confidence group is divided into three sub-groups: High, Medium, and Low. Confidence interval is calculated by using predicted model price over the next trade price. After the overnight regression is run in Section 3, the width of confidence interval may be calculated. Rank the width from small to large and fill model price into the following three model confidence groups based on cutoff threshold values. Narrow CIs predict better relative performance by the model, which means model price lies in CI percentile of $0$-$25^{th}$ has high confidence. For example, the table below is shown Model Mid Price performance by confidence interval.

| Confidence Group | CI percentile | Prior MSE | Model MSE | Eval MSE | Model % of Prior | Eval % of Prior |
|---|---|---|---|---|---|---|
| High | $0$-$25^{th}$ | 0.15 | 0.10 | 0.27 | 65 | 176 |
| Medium | $25^{th}$-$50^{th}$ | 0.31 | 0.17 | 0.35 | 55 | 112 |
|  | $50^{th}$-$75^{th}$ | 0.41 | 0.23 | 0.49 | 57 | 120 |
|  | $75^{th}$-$90^{th}$ | 0.60 | 0.40 | 0.92 | 66 | 152 |
|  | $90^{th}$-$95^{th}$ | 0.89 | 0.55 | 0.84 | 62 | 94 |
| Low | $95^{th}$-$100$ | 2.68 | 0.97 | 2.32 | 36 | 86 |
|  | No Model | NA | NA | NA | NA | NA |

In the above table, CI percentile in $0$-$25^{th}$ may be considered as top group, $25^{th}$-$95^{th}$ is medium group, and the bottom group is in $95^{th}$-$100$ CI percentile. In addition, there are some descriptions of some fields in the above table:

The Model MSE of 0.10 for the high confidence group means that the model is off by around sqrt(0.10)=32 cents, in par terms, on average.

All MSEs may include the change in the random walk price, so even a perfect model may not have an MSE of zero. In other words, knowing all past data and having the best possible model still might not let you perfectly predict the next traded price.

"Prior" means the VWAP based on TRACE data.

8.1 Setting the Confidence Group

The boundaries between the confidence groups (High, Medium, Low) may be defined by configurable threshold levels.

High confidence prices are those where the CI is narrower than the High/Medium Group Threshold Medium confidence prices are those where the CI lies between the High/Medium Group Threshold and the Medium/Low Group Threshold Low confidence prices are those where the CI is wider than the Medium/Low Group Threshold.

In addition to the thresholds themselves, a range is defined around the threshold to control and stabilize movement between the groups. A price only moves into a new group when it crosses the furthest point in the range. For example, if the High/Medium Group Threshold=12c, a range is defined around this of ±2c. A High Confidence price becomes a Medium Confidence price when its CI widens to 14 c, while a Medium Confidence price becomes a High Confidence price when its CI narrows to 10c. By using this range, the movement between the groups is smoothed, and price oscillation from one group to another is avoided when their CIs are close to the threshold.

For each pricing method, i.e., IG, HY and Agency, there are two sets of threshold range on configuration screen. Each of them has both an upper level value and a lower level value. The previous rules of switching between pricing modes have been removed, however, the definition of the three model price confidence groups and the threshold may keep the same as examples below.

For example, there are current configuration cutoff values and threshold values for High-Medium group as [13, +2, −3]. If at Day 1, the start confidence interval value is 9, then there are the following examples:

CI=9<13, then Group=High (Note: the cutoff value is only used on the first confidence interval on Day 1)

CI=14<15, no change: Group=High

CI=15<=15, then Group=Medium (15 is the margin value here, so use the lower confidence group)

CI=18>15, no change: Group=Medium

Another example is when confidence intervals become narrower and change from lower confidence group to higher confidence group:

CI=18>13, then Group=Medium

CI=12>10, no change: Group=Medium

CI=10, no change: Group=Medium (10 is the margin value here, stay at the lower confidence group)

CI=8, then Group=High

CI=50<80, then Group=Medium (on Day 1, compare the CI value with the cutoff value, it's 80 in this case)

CI=100<=100, then Group=Low (100 is the margin value here, use the lower confidence group)

CI=101, no change: Group=Low

CI=100, no change: Group=Low

CI=50, no change: Group=Low (50 is another margin value here, stay at the lower confidence group)

CI=49, then Group=Medium

There are three more examples on Day 1 and comparing the first CI value and the cutoff value (keep the same assumption that the cutoff and threshold values for High-Medium group are [13, +2, −3], for Medium-Low group are [80, +20, −30]:

CI=90>80, then Group=Low; CI=12<13, then Group=High
CI=90>80, then Group=Low; CI=13<=13, then Group=Medium
CI=10<13, then Group=High; CI=80>=80, then Group=Low Additionally, it is possible that confidence group may jump from high confidence group directly to low confidence group, or from low confidence group to high confidence group.

On the screen, the user is able to edit the cutoff threshold and also the upper and lower level of the range, so the range of the threshold equals to: cutoffs±upper/lower level value. Please see Section 10.2.1. Model Pricing Configurations under the tab of Confidence Group. Behavior of the groups are described below in Section 8.2.-8.4..

8.2 Behavior of Top Group—High Confidence

Model Pricing in this group may be considered as high confidence. There may be a warning notification if bond moves out of top group, under such circumstance, the evaluator may actively manage their continuous pricing evaluation, and choose if they want to choose model price medium confidence group as market data source. There may also be a warning notification if bond moves into the top group, under this case, the evaluator may consider using model price high confidence group as one of market data sources.

8.3 Behavior of Medium Group—Medium Confidence

Model Pricing in medium group may be considered as medium confidence.

8.4 Behavior of Bottom Group—Low Confidence/No Model

Model Pricing in bottom group may be considered as very low confidence or no model price.

8.5 Rules for Handling Suspect Prices

A suspect price may not update the Published Price until the suspect condition is resolved.

If Model Price is suspect and it is chosen as the market data, then Continuous Price is suspect until the notification is accepted/rejected.

9. Model Price Enrichment (Calculate Model Evaluations Value)

Full calculation of model evaluations may be performed and these evaluation values may be displayed on the Quote screen:

Ask Px=2*MidPx−BidPx.

Calculate Bid/Ask adjustments.

Bid, mean and ask yields may be calculated from the prices above using the security's continuous pricing configurations.

Bid, mean and ask spreads may be calculated using the security's continuous pricing configurations and benchmarks, using the same rules as continuous pricing, i.e.:

If Pricing Anchor=Price or Yield, don't calculate the spread.
If Pricing Anchor=Spread, then calculate the spread using the configured benchmark.

| Bid/Ask Config (Type, Value) | | | |
|---|---|---|---|
| Bid Px | Mean Px | Ask Px | |
| Bid Yield | Mean Yield | Ask Yield | Price To config (Mat, Call, Worst) Redemption configs Calculation configs |
| Bid Spread | Mean Spread | Ask Spread | Benchmark Config (Curve) |

Bid Px and Mean Px are inputs, and the rest of the grids are the outputs. By using the rules above, ask Px and yield, spread can be calculated and converted from price. Note that that model price may not tick with the Treasury curve. Model price may tick with ETFs (also new trades), and ETFs ticking is more frequent than that of the Treasury curve. Additionally, model pricing is price based, when the Spread/Yield is calculated, the current value of the curve is used, but it is not necessary to tick with the curve at real time.

9.1 Published Evaluation and Pricing Output File

The final pricing output file that gets published from the pricing methods (Agencies, HY, IG) includes the Published Evaluation values. The calculation rules above may ensure that the Published evaluation fields for all securities based on a model price are complete.

10. GUI Design and Functionality

All the changes specified in Model Pricing Phase Two are applied to US IG, US HY and Agency screens. All the fields displayed on Worksheet, Quote Market screen, Quote History screen and Model Details Screen are defined in the spreadsheet, which is in Appendix E.

10.1 Model Details Screen

Model Pricing Phase One has introduced all the fields on the Worksheet, including the following:
Model Bid/Mid Spread
Model Bid/Mid Price
Model/Eval Diff
Model 3 PM Bid/Mid Price
Model 4 PM Bid/Mid Price
Model 3 PM Bid/Mid Spread
Model 4 PM Bid/Mid Spread In Phase Two, there may be no new fields added onto the Worksheet. However, one or more model variables may be displayed on a new screen, e.g., Model Details screen. Model Details screen may show all the important variables from Model Pricing Phase One and Phase Two. This screen may be found in each of the three systems, i.e., IG, HY and Agency, under the submenu of Market Data. The user can flip the pricing mode on Dashboard or Worksheet to show the evaluations at Real Time, 3 PM, or 4 PM. FIG. 19 depicts an exemplary pricing mode displayed on a Model Details screen. Provided below is a list of fields on Model Details screen:
Model Rating Score
Model YTM
Model Updated Time
Model Bid Price
Model Mid Price
Model Ask Price
Model Bid Spread
Model Mid Spread
Model Ask Spread
Model Bid Yield
Model Mid Yield
Model Ask Yield
Model/Eval Diff
Model Market Adjustment
Model Trade-to-trade Change in Price
Model Price Status
Model 3 PM Bid/Mid/Ask Price
Model 3 PM Bid/Mid/Ask Spread
Model 3 PM Bid/Mid/Ask Yield
Model 4 PM Bid/Mid/Ask Price
Model 4 PM Bid/Mid/Ask Spread
Model 4 PM Bid/Mid/Ask Yield
Model Confidence Intervals
Model Confidence Group Model 3 PM Confidence Intervals
Model 3 PM Confidence Group
Model 4 PM Confidence Intervals
Model 4 PM Confidence Group
Details of the above new fields are listed in the table below:

| Field | GUI Name | Data Range | Example |
|---|---|---|---|
| Model Rating Score | Model Rating Score | Variable R in Model Pricing Phase One [0, 1] Rating = 0 for bonds rated AA+ or above, 1 for bonds rated CC or below, and is linear in credit rating between as (S&P numerical −3)/16, i.e., rat = 1 − max (0,min(1, (SPrat −3)/16)). R may be set to 0 in calculation of Agencies. | 0.25 |
| Model YTM | Model YTM | ytm = (maturity_date-execution_date)/365.25 (using the most recent trade execution time as the execution_date in calculation) | 3.0061601642710474 |
| Model Updated Time | Model Updated Time | Date and time (mm/dd/yyyy hh:mm:ss) | 09/04/2014 08:33:47 |
| Model Bid/Mid/Ask Price | Model Bid Price Model Mid Price Model Ask Price | Positive floating number | 99.81561 99.86360 99.91159 |
| Model Bid/Mid/Ask Spread | Model Bid Spread Model Mid Spread Model Ask Spread | Positive floating number | |
| Model Bid/Mid/Ask Yield | Model Bid Yield Model Mid Yield Model Ask Yield | Positive floating number | |
| Model/Eval Diff | Model/Eval Diff | Floating number | |
| Model Market Adjustment | Model Mkt Adj. | Positive floating number | |
| Model Trade-to-trade Change in Price | Model Px Change | Positive floating number | |
| Model Price Status | Model Price Status | Good, Failed, Suspect, Warning | Suspect |
| Model 3PM Bid/Mid/Ask Price | Model Bid Price Model Mid Price Model Ask Price | Positive floating number | |
| Model 3PM Bid/Mid/Ask Spread | Model Bid Spread Model Mid Spread Model Ask Spread | Positive floating number | |
| Model 3PM Bid/Mid/Ask Yield | Model Bid Yield Model Mid Yield Model Ask Yield | Positive floating number | |
| Model 4PM Bid/Mid/Ask Price | Model Bid Price Model Mid Price Model Ask Price | Positive floating number | |
| Model 4PM Bid/Mid/Ask Spread | Model Bid Spread Model Mid Spread Model Ask Spread | Positive floating number | |
| Model 4PM Bid/Mid/Ask Yield | Model Bid Yield Model Mid Yield Model Ask Yield | Positive floating number | |
| Model Confidence Intervals | Model CIs | Positive Integers | 15 |
| Model Confidence Group | Model Confidence Group | High, Medium, Low | Medium |
| Model 3PM Confidence Intervals | Model CIs | Positive Integers | |
| Model 3PM Confidence Group | Model Confidence Group | High, Medium, Low | |
| Model 4PM Confidence Intervals | Model CIs | Positive Integers | |
| Model 4PM Confidence Group | Model Confidence Group | High, Medium, Low | |

Descriptions and functionality of these fields are provided in the following sub-sections.

10.1.1 Model Rating Score:

Model Rating Score is defined and calculated in Model Pricing Phase One, which converts S&P Rating (or Moody's or Fitch Rating) to a numerical value between 0 and 1. Rating =0 for bonds rated AA+ or above, 1 for bonds rated CC or below, and is linear in credit rating between as (S&P numerical−3)/16, i.e., rat=1-max(0,min(1,(SPrat-3)/16)). R may be set to 0 in calculation of Agencies.

10.1.2 Model YTM:

Model YTM is defined and calculated in Model Pricing Phase One. ytm=(maturity_date-execution_date)/365.25(using the most recent trade execution time as the execution_date in calculation).

10.1.3 Model Updated Time:

Model Updated Time is defined in Model Pricing Phase One. Model Updated Time shows the time when model price is updated. The format of this field is defined as Date and Time (mm/dd/yyyy hh:mm:ss).

10.1.4 Model Bid/Mid/Ask Price/Spread Yield:

Model Bid/Mid/Ask Price: Model Bid/Mid Price is calculated in Model Pricing Phase One, and Model Ask Price is defined and calculated in Model Pricing Phase Two Section 9. This is the real time model price.

Model Bid/Mid/Ask Spread: Model Bid/Mid/Ask Spread is calculated based on model price and calculation is described in Model Pricing Phase Two Section 9. This is the real time model spread.

Model Bid/Mid/Ask Yield: Model Bid/Mid/Ask Yield is calculated based on model price and spread, and the calculation is described in Model Pricing Phase Two Section 9. This is the real time model yield.

10.1.5 Model/Eval Diff:

Model/Eval Diff is defined as the difference between model price and evaluation price at real time.

10.1.6 Model Market Adjustment:

Model Market Adjustment is defined and calculated in Model Pricing Phase One, which is denoted as etf23. And the calculation is described in Model Pricing Phase One Section 4.6.3..

10.1.7 Model Trade-to-trade Change in Price:

Model Trade-to-trade Change in Price is defined and calculated in Model Pricing Phase One, which is denoted as $\Delta p$.

10.1.8 Model Price Status:

Model Price Status is defined in Model Pricing Phase Two Section 11.1.3. with four values to show the status of model pricing: Good, Failed, Suspect and Warning.

10.1.9 Model 3 PM Bid/Mid/Ask Price/Spread/Yield:

Model 3 PM Bid/Mid/Ask Price/Spread/Yield is defined as Model Bid/Mid/Ask Price/Spread/Yield at 3 pm mode.

10.1.10 Model 4 PM Bid/Mid/Ask Price/Spread/Yield:

Model 4 PM Bid/Mid/Ask Price/Spread/Yield is defined as Model Bid/Mid/Ask Price/Spread/Yield at 4 pm mode.

10.1.11 Model Confidence Intervals:

Model Confidence Intervals show the results from regressions at Section 2 at real time, the confidence interval width:

Model CIs: Model confidence interval width termed in price (cents), e.g. 15 (in price term, i.e., cents).

10.1.12 Model Confidence Group:

Model Confidence Group shows which confidence group the bond may be located, based on confidence interval width calculated from Section 2 and confidence threshold in Section 4 at real time, which is defined on the screen as:

Model Confidence Group: Model confidence group, e.g. High, Medium, Low.

10.1.13 3 PM/4 PM CIs and Confidence Group.

New fields may include:

Model 3 PM/4 PM Confidence Intervals.

Model 3 PM/4 PM Confidence Group.

These fields are defined similarly as real time Model Confidence Intervals and Model Confidence Group under 3 pm or 4 pm mode.

10.2 Quote Market Screen—New Fields

Figure 20:
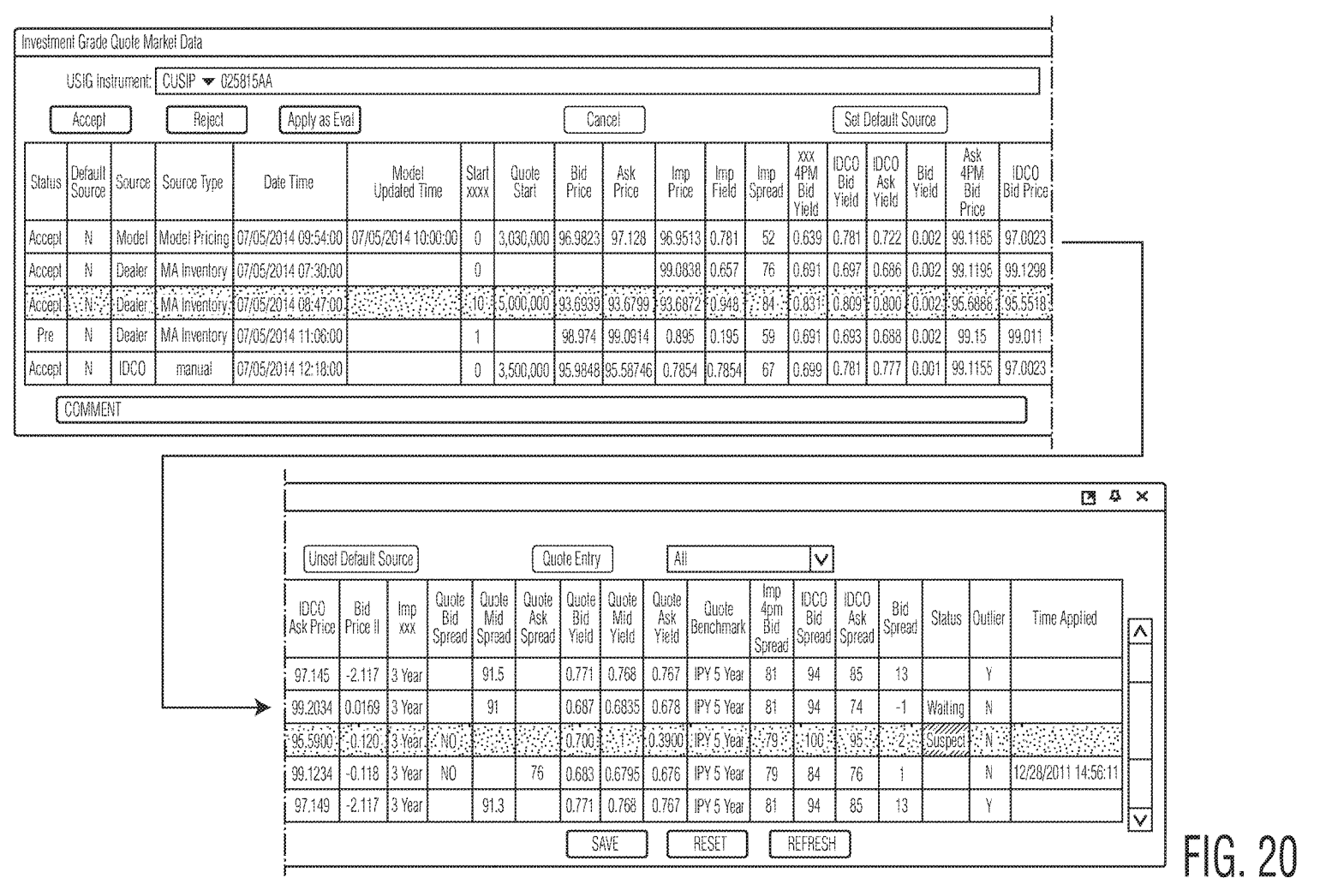

FIG. 20 depicts an exemplary Quotes Market Data screen for each system, i.e., IG, HY and AGY for display of model price and model evaluations. In an exemplary embodiment, only the most recent model price may be displayed on the Quote Screen and positioned at the top row on the screen. There may be no display of model price ticks. The following fields may be displayed for each model price:

Model Updated Time—The time when model price gets updated.

Source Type—Model.

Source Feed—Name of Omega source feed for published model price—check with Dev (Alex and Ling), the name of the feed.

Bid/Mid/Ask Price, Implied Bid/Mid/Ask Price, IDCO Bid/Mid/Ask Price: Under the source of model pricing, these columns may show model bid/mid/ask price.

Implied Bid/Mid/Ask Yield, IDCO Bid/Mid/Ask Yield: Under the source of model pricing, these columns may show model bid/mid/ask yield calculate using the rules in Section 9; Bid/Mid/Ask Yield may be blank under the source of model pricing.

Implied Bid/Mid/Ask Spread, IDCO Bid/Mid/Ask Spread: Under the source of model pricing, these columns may show model bid/mid/ask spread; Bid/Mid/Ask Spread may be blank under the source of model pricing.

3 PM/4 PM Bid/Mid/Ask Price/Yield/Spread: these fields may show model bid/mid/ask price/yield/spread at 3 pm or 4 pm mode.

10.2.1 Button Behavior

Accept: Accepts the most recent model price, clearing and dismissing any notification on the security due to the selected market data.

Reject: Rejects the most recent model price, clearing any notification on the security due to the selected market data and going back to the last good model price.

Apply as Eval: The evaluator may select a line that may be used for the evaluation and click Apply as Eval. Particularly, model price may be automatically ticking with each institutional trade, and the evaluator can use this button to apply model price as the evaluation. Note that this may behave the same way as any manually applied trade or quote, in the sense that the market data ranking may only consider data that comes in after the apply time of the model price, when deciding whether new data may replace the manually applied model price.

The rest of the buttons on the screen, i.e., Cancel, Set Default Source, Unset Default Source, Quote Entry, may be grayed out when a model price is selected. Note Model Price sensitivity condition may last until it's accepted/rejected or the next institutional trade occurs. The maximum time of Model Price sensitivity condition may last until the end of the day.

10.2.2 Market Data Ranking Profile

FIG. 21 depicts an exemplary investment grade data ranking profile screen. The evaluator can set up model pricing as one of the market data sources on Market Data Ranking Profiles screen in each system, i.e., IG, HY and AGY. Model Price High Confidence Group, Model Price Medium Confidence Group, and Model Price Low Confidence Group may be shown under "Unused Data Types" and can be selected to Data Ranking tab as a source of market data. The configuration of the three Model Price Confidence Groups can be done on the configuration screen at sector level, which is shown in Section 10.3.1.2.

10.3 Quote History Screen

Figure 22:
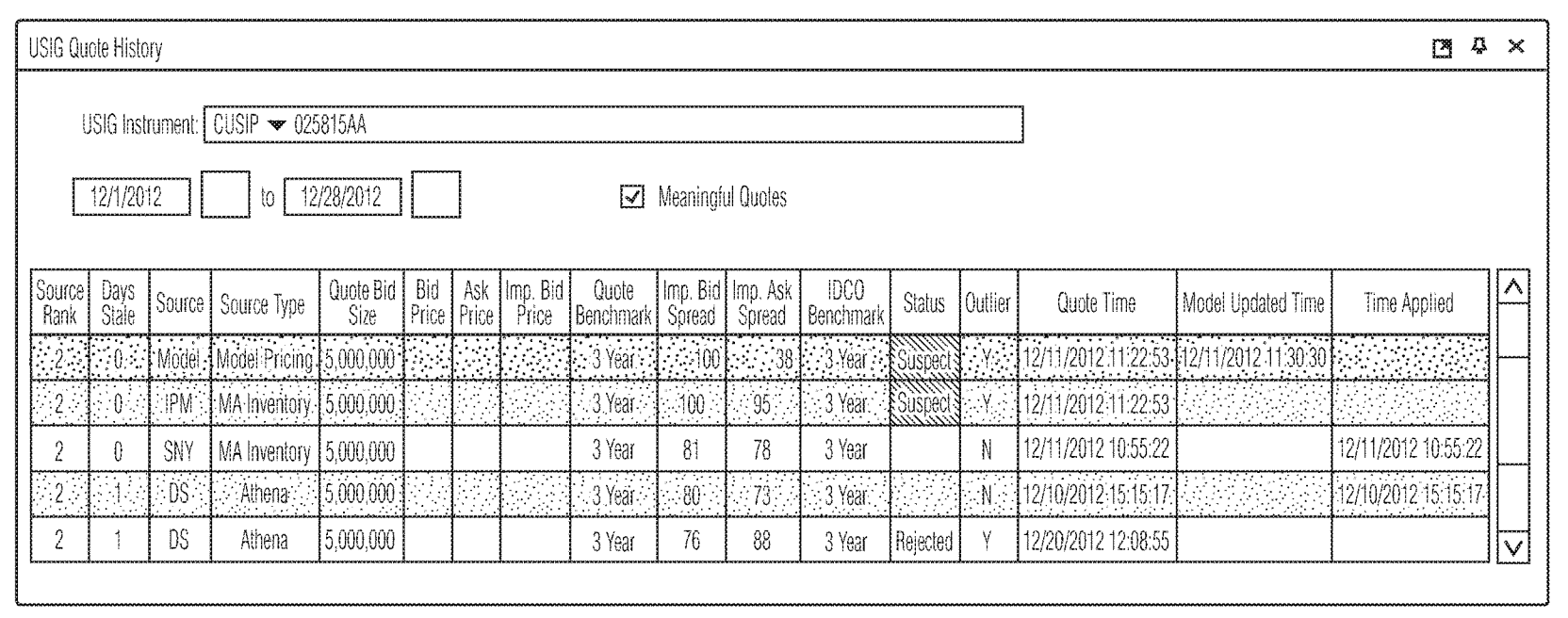

FIG. 22 depicts an exemplary Quote History screen for each system, i.e., IG, HY and AGY, displaying model price and model evaluations. Similarly defined as the Quote screen, only the most recent model price may be displayed on the Quote History Screen and positioned at the top row on the screen. There may be no display of model price ticks.

10.4 Event Log

Figure 23:
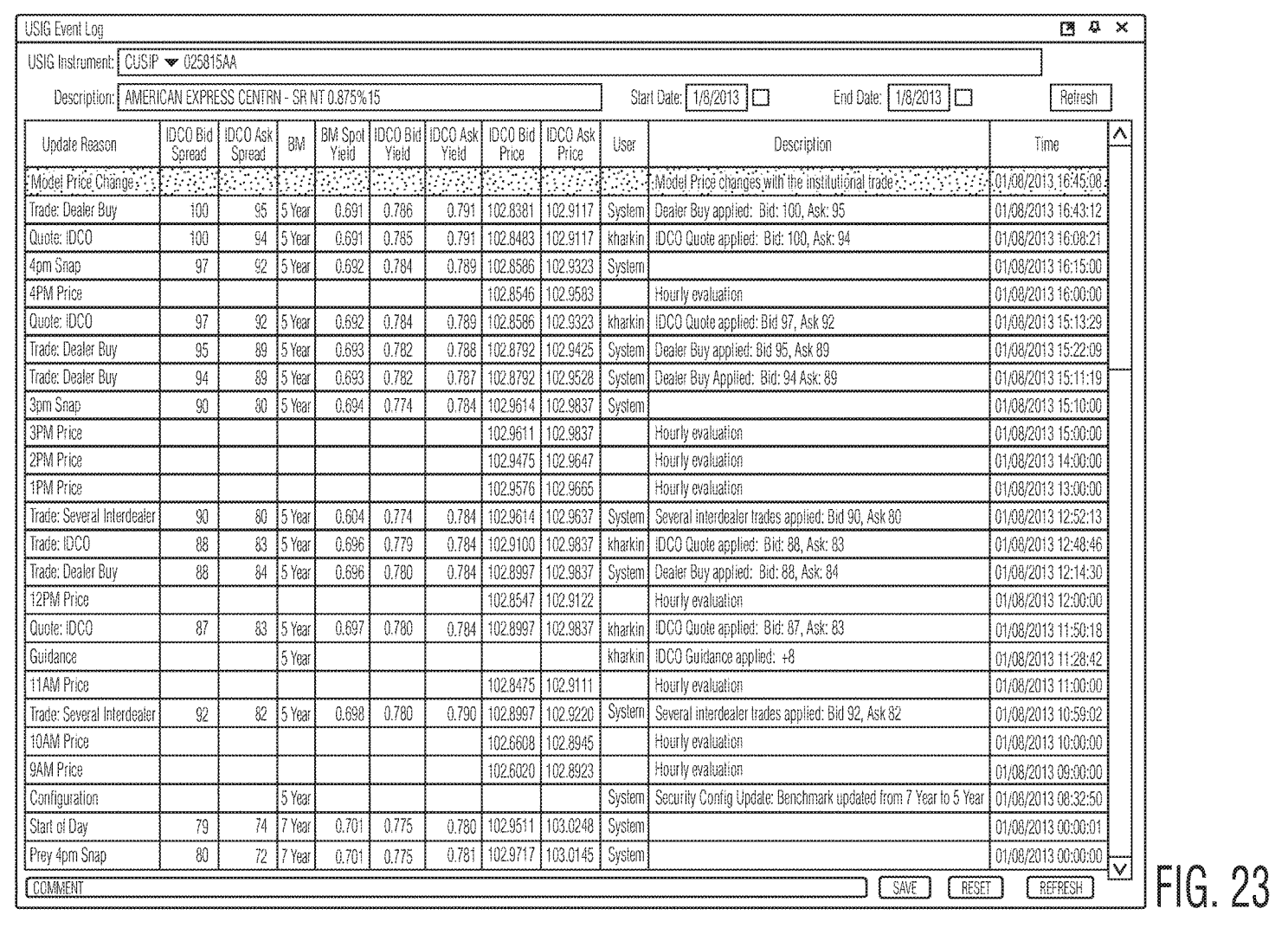

FIG. 23 depicts an exemplary event log. One row is added in the event log each time an institutional trade causes model price ticking, and meanwhile model price is the driver of the evaluation (i.e., model price is selected as the market data source). In addition, capture the price once an hour and display as "Hour (10 AM) Price". The purpose of this record is to show the hourly price between institutional trades, which may occur hours away with each other. This hourly price is recorded regardless of whether model price is selected as market data source.

10.5 Configuration Screens

There are two types of configuration screens: Model Pricing Configurations, which is added to the existing tabs from Phase One and this is on model level; and Model Notifications Configurations, which is added to the existing tabs on the existing Configuration screen in each system, i.e., IG, HY and AGY.

10.5.1 Model Pricing Configurations

Configurations on this screen are all model level and are sectors of CORP, AGENCY and INACTIVE. Values are configurable under each sector. There are two new tabs added to the existing Model Pricing Configurations screen from Phase One, which are Confidence Interval and Confidence Group.

Figure 24:
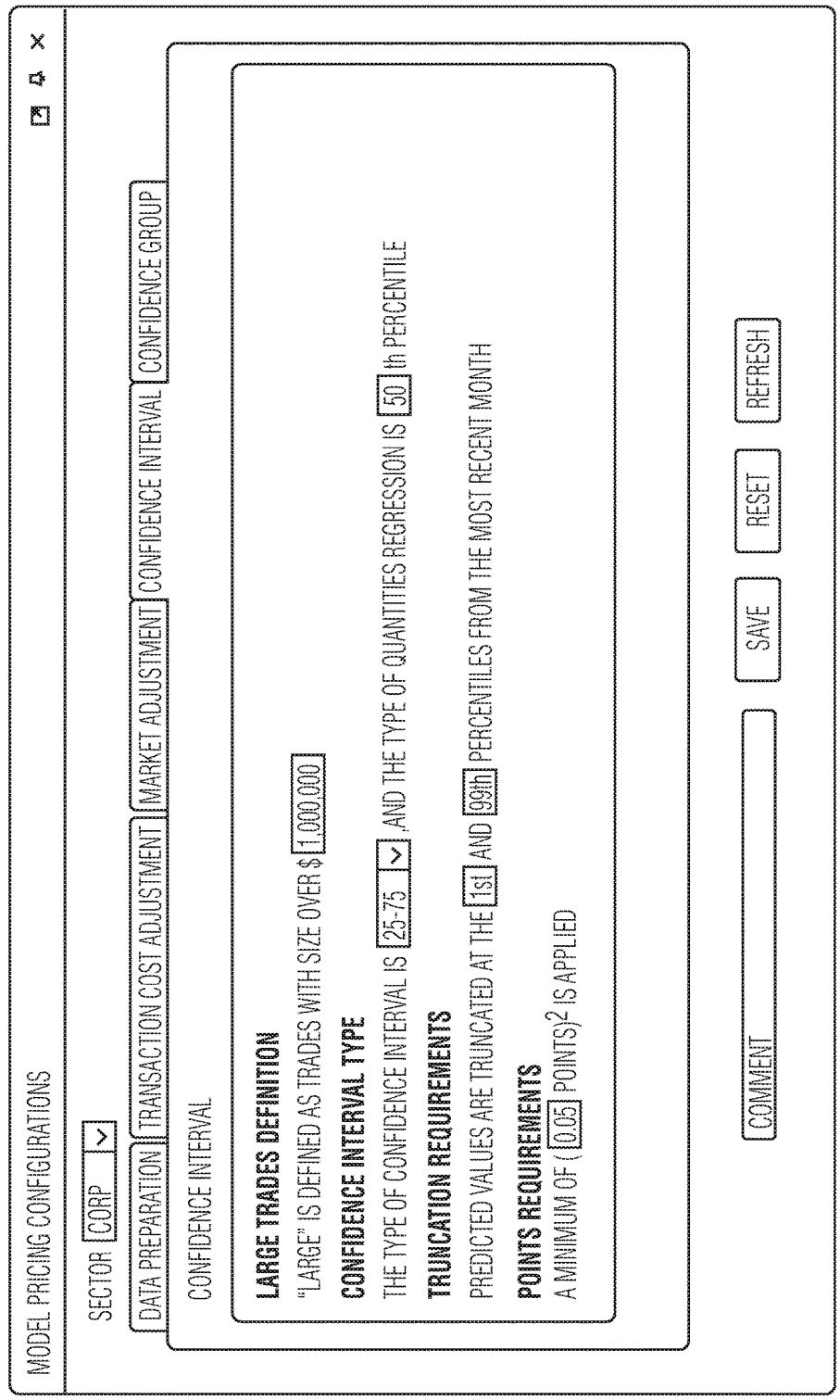
FIG. 24 depicts an exemplary model pricing configuration screen for a confidence interval.

Confidence Interval:

FIG. 24 depicts an exemplary model pricing configuration screen for a confidence interval. This screen enables Methodology to configure definition of large trade's size, quantile regression type, truncation requirements, and minimum points requirements.

Confidence Group

FIG. 25 depicts an exemplary model pricing configuration screen for a confidence group. On this screen, Methodology and evaluator can change the cutoff values and threshold range of the three confidence groups, i.e., High, Medium and Low. Definition and examples of confidence groups are described in Section 9. In an exemplary embodiment, all the margin values of the range are inclusive; in other words, if the confidence interval equals the margin value of the range or on the border, then it may belong to the lower confidence group.

10.5.2 Model Notifications Configurations

Figure 26:
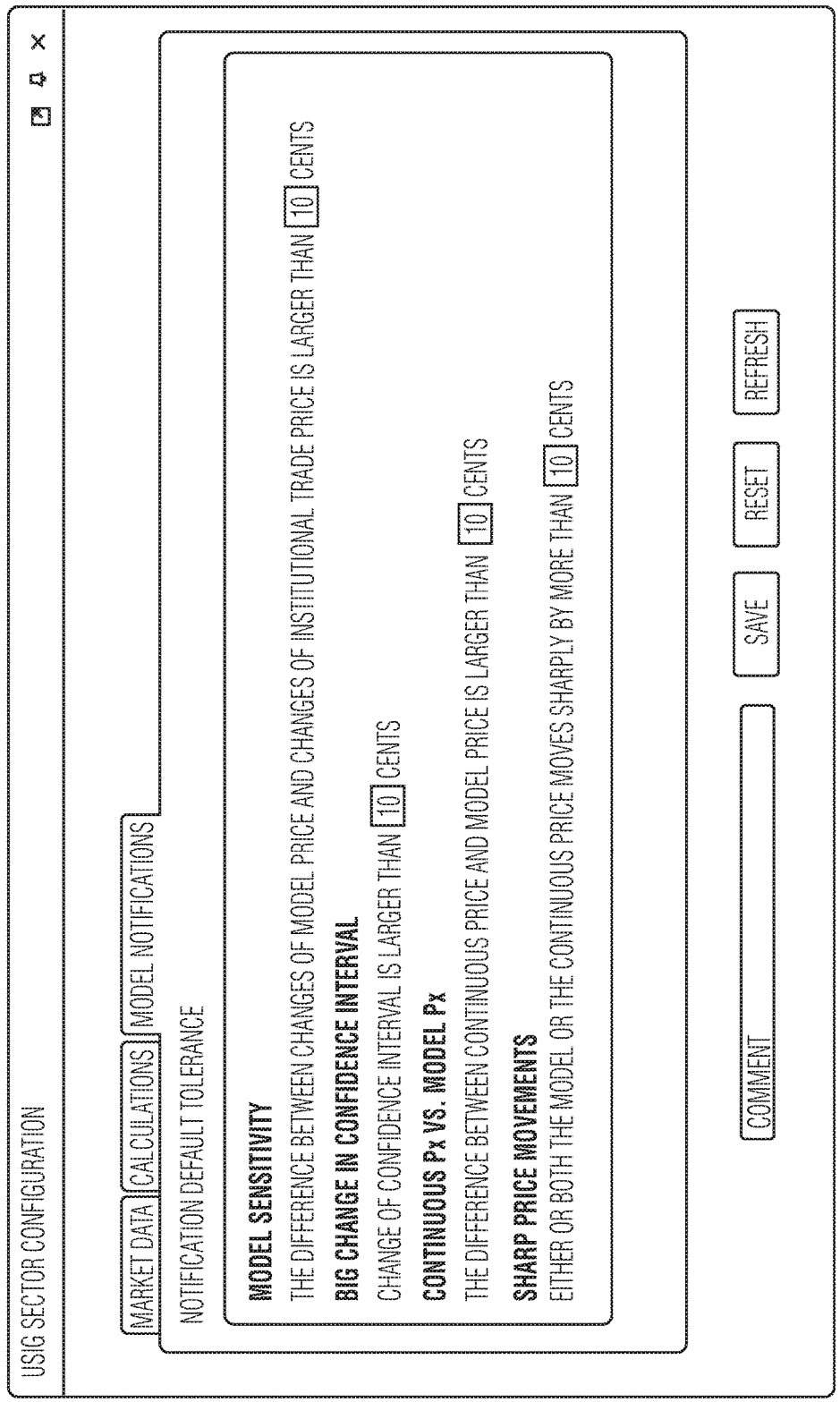
FIG. 26 depicts an exemplary sector configuration screen for model notifications.

FIG. 26 depicts an exemplary sector configuration screen for model notifications. Configurations on this screen may be added to the existing tabs in each system, i.e., IG, HY and AGY under sectors. This new tab enables Methodology and the evaluator to change the default tolerance of Model Notifications. For example, FIG. 26 is a screenshot to add the Model Notifications tab onto the existing USIG Sector Configuration screen.

11. Notifications

In an exemplary embodiment, none of the existing notifications applied to trades or quotes may be applied to model price. Notification details may be displayed on Inbox of each pricing system, i.e., IG, HY and Agency. Model Price may be tested independently, and notifications may only be applied if model price is chosen as the market data.

11.1 Suspect

There is one Model Price Notification. If the test is failed, it may generate a suspect notification. If the notification is acknowledged, then the evaluator may not get a new notification until a new institutional trade comes in.

11.1.1 Model Sensitivity to Δ Institutional Trade Px

There may be a Large Change in Model Sensitivity suspect notification if:

there is a large difference between changes of model mid price and changes of institutional trade price since the last institutional trade, i.e., the difference between the deltas is more than X (X is configurable)

In this case, the evaluator may be able to verify model price and the cause of this large difference. When comparing the changes of model mid price and changes of institutional trade price, the same time period may be used. For example, if our new trade happens at time t, and the last institutional trade time is at t−1, then the changes of trade price may be $\Delta_P=P(t)-P(t-1)$. And model bid price at t and t−1 may be used to calculate the changes in the model, i.e., $\Delta_M=M(t)-M(t-1)$. M(t) and M(t−1) are model mid prices triggered by trade at t and t−1. The sensitivity test passes if the difference between changes of model mid price and changes of institutional trade price is less than X. For example, at time t, $\Delta_P(t)-\Delta_M(t)>X$ have been tested (when test fails, notification is issued). The suspect notification is cleared automatically when a new institutional trade arrives, causing the test to be run again, and the test passes. For example, at time t+1, the differences are again calculated as $\Delta_P(t+1)=P(t+1)-P(t)$, and $\Delta_M(t+1)=M(t+1)-M(t)$. If $\Delta P(t+1)-\Delta_M(t+1)<X$, then the suspect notification may be cleared. Alternatively, the evaluator can accept the suspect model price manually to clear the notification. Model Price sensitivity condition may last until it's accepted/rejected or the next institutional trade occurs. The maximum time of Model Price sensitivity condition may last until the end of the day.

11.2 Warnings 11.2.1 Big Change in Confidence Interval

If confidence interval moves sharply, the evaluator may receive a warning notification if:

confidence interval moves from one confidence group to another, e.g., confidence interval jumps from medium confidence group to high confidence group.

Under such circumstances, the evaluator may have a warning notification as big change in confidence interval. The test may be based on confidence interval threshold values defined in Section 8.1. to decide if model price has been moved from one confidence group to another.

11.2.2 First Model Price

There may be a warning notification when the first model price is available. This is for new issued bonds, which have had at least six trades. No action is required for this warning notification. And the purpose of this notification is to let the evaluator know that model price is available and good to use from today. This warning notification may be cleared automatically at the end of the day. This is in the Model Pricing Phase One's spec, Section 4.1., Minimum Requirements of Intraday Calculation. To calculate the first model price, at least six trades may be needed to run the overnight regression. And to generate model price at real-time, besides these six trades, the seventh trade may be needed to happen the next day to trigger the intraday calculation on model price. For example, there are several possible cases:

When there is at least six trades today, the overnight regression is run by using these trades and saving the coefficients. The next day, the first model price may not be calculated until a new trade comes in.

When there is at least six trades today, the overnight regression is run by using these trades and saving the coefficients. The next day, there may not be a new trade but the ETF price changes. In this case, the first model price may not be calculated.

The first model price may only be calculated when there is at least six trades today, and the overnight regression is run by using these trades and saving the coefficients. And the seventh trade is the next day (or several days later). Then the coefficients may be used to generate the first model price.

11.3 Calculation Failure

Calculation Failure may be applied to model price. Rules of handling calculation failure notifications are:

Use same failure notifications as IG.

Failure Notifications may be counted on Dashboard.

11.4 Model Pricing Status

There is a Model Price Status column on Model Details screen with four possible values to show the status of model pricing: Good, Failed, Warning, and Suspect. The status of each model price may be maintained, but (like outliers in trades and quotes), notifications may only be generated if the model price is chosen to be applied by the Market Data Ranking rules. If this model price is suspect, it generates the notification, and the Continuous Price is suspect until the notification is accepted or rejected. The evaluator may clear all notifications before release.

11.5 Notification Details

| Description (headline) | Type | Reason (details) | Cause | Actions | Screen |
|---|---|---|---|---|---|
| Large Change in Model Sensitivity | Suspect: Worksheet | [security ID] [security description] has a large difference between changes of model price and changes of institutional trade price and the difference is more than [X]. | During the same time period, the changes of model price (use mid price) and changes of institutional trade price has a large difference and break the default tolerance. | The evaluator may be able to verify model price and the cause of this large difference. | Worksheet |
| Calc Failure | Calc Failure: Worksheet | [security ID] [security description] has calc failure. | The system is unable to calculate a security and the calculation library may return a failure. The possible reasons of calc failure may be the same as defined in IG. | The evaluator may either correct the security's configuration, modify underlying assumptions, or enter a manual price only quote for the security. | Worksheet |
| Big Change in Confidence Interval | Warning: Worksheet | [security ID] [security description] has moved from [X] confidence group to [Y] confidence group. | Model Price is more confident as new trades come in or less confident as time passed without any trade, i.e., the confidence interval is widen out. | The evaluator may reevaluate whether to use model price as a market data source | Worksheet |
| First Model Price | Warning: Worksheet | [security ID] [security description] has the first model price available. | This is for new issued bond with at least six trades. This warning notification may alert the user that the first model price is available to be considered in market data source. | No action required. The evaluator can go to market data ranking profile to set model price as the driver of the evaluation. | Worksheet |

12. Configurations

Configurations in this section are applied to all the three pricing systems—IG, HY and Agency. For each system, there may be one configuration screen.

12.1 Configurable Numbers and Functions

The type of confidence interval is configurable. Currently, all the examples used in apply to a 25-75 confidence interval. A 10-90 or 5-95 confidence interval can be used later.

The type of quantile regression is currently using $50^{th}$ percentile. This is configurable.

Predicted values are truncated at the $1^{st}$ and $99^{th}$ percentiles from the most recent month, and these numbers are configurable.

A minimum of $(0.05 \text{ points})^2$ is applied, and this is also a configurable number.

The cutoff of the confidence group by using CI percentile may be configurable.

12.2 Configuration Screens

FIG. 27 depicts an exemplary model pricing configuration screen for a confidence interval.

Figure 28:
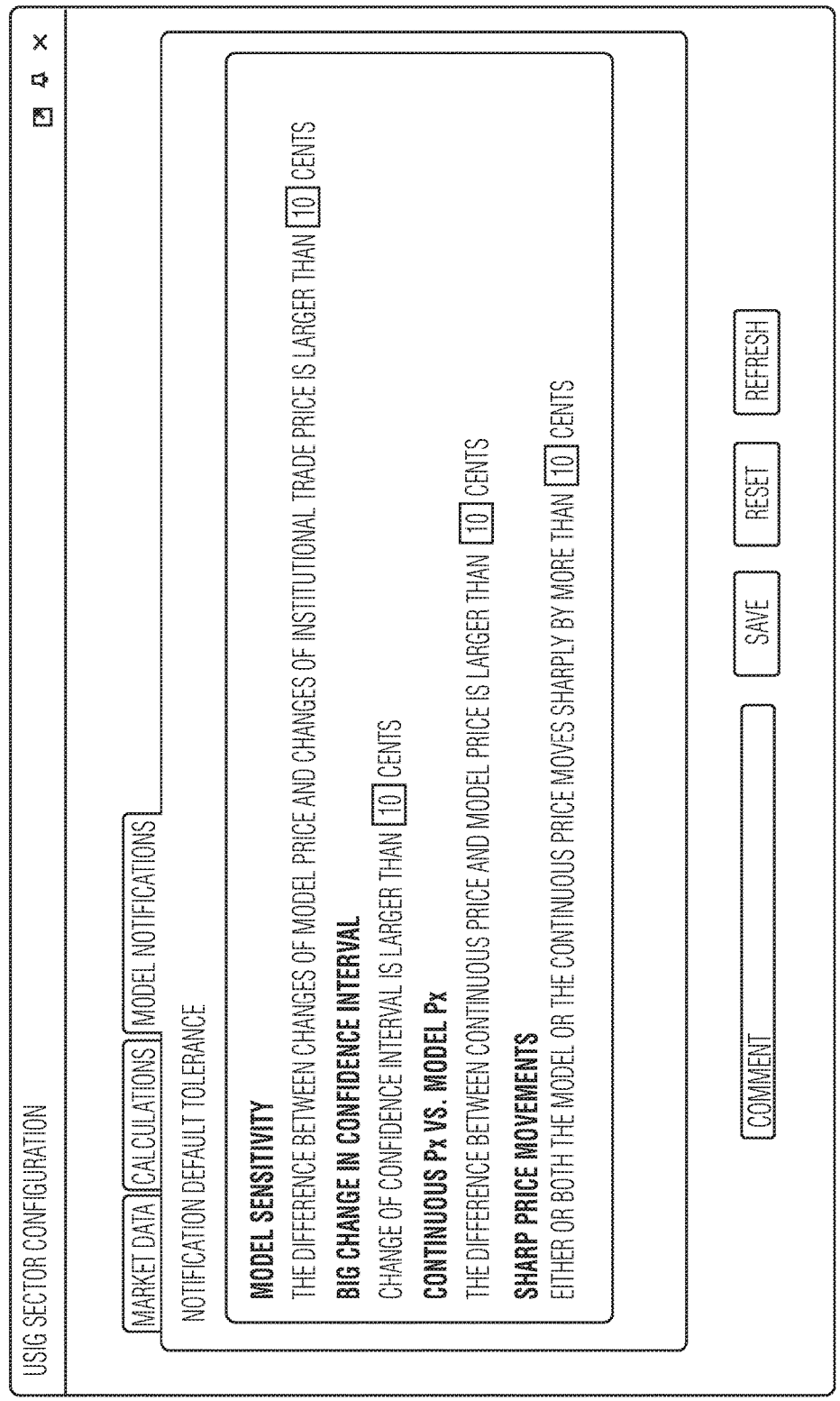
FIG. 28 depicts an exemplary sector configuration screen for model notifications.

FIG. 28 depicts an exemplary sector configuration screen for model notifications.

13. Appendix A: Regression Framework and Formulae

In this Appendix address regression frameworks are addressed in general and regression formulae applied to TC model and Market Adjustment. Note that all regressions involved may be weighted regressions. Also note that the design matrix and the right-hand-side of regressions include $1^{st}$ differences, except for the constant term in design matrix.

13.1 Assumptions and General Settings

A few assumptions are made as basis of framework and general settings for TC model and Market Adjustment applications are provided. Regressions are run in rolling windows. The generic form of a rolling window is [t−24, t] with t being a time unit in month. Assuming that observations come with execution times $\{t_i\}$. The execution times are also used to calculate $1^{st}$ differences. Let $p_t$ denote the price at execution time t. Then the $1^{st}$ difference for price is calculated according to the following:

$$p_{t_i} - p_{t_{i-1}} = \Delta p_i \epsilon \Delta pt_{i-1} < t_i; t_i, t_{i-1} \epsilon [t-24, t]; (t_{i-1}, t_i) \cap [t-24, t] = 0 \quad (10.1)$$

$(t_{i-1}, t_i) \cap [t-24, t] = 0$ means there is no execution between $t_{i-1}$ and $t_i$. $1^{st}$ differences for other quantities are also calculated according to rules above. Note that $1^{st}$ difference calculations are based on grouping according to certain id's.

13.2 Regression Formulae and Components

The following notations are defined as follows:

Let $f_j(t_i, \ldots)$ be the $j^{th}$ basis function at time $t_i$.

Let $q_k(t_i, \ldots)$ be the $k^{th}$ function that constitute the right-hand-side of the regression, $k=1, \ldots, K$.

Let $c_k$ be constants, $k=1, \ldots, K$

Let M be the number of basis functions.
Let N be the number of observations.
Let A be the design matrix of regression.
Let H be the right-hand-side of regression.
Let W be the weight-matrix.
Let Ω be the inverse of W.
Generic element in A is in the following form:

$$a_{i,j} = f_j(t_i, \ldots), i=1, \ldots, N, j=1, \ldots M$$

Generic element in H is in the following form:

$$h_i = \sum_{k=1}^{K} c_k q_k(t_i, \ldots)$$

Generic element in W is in the following form:

$$w_i = w(t_i)$$

The coefficients of regression, β, an M-vector is given by the solution of the following linear equations:

$$[D^T D] \cdot \beta = D^T H, \text{ where } D = W \cdot A \quad (10.2)$$

A constant term was not included in basis functions $f_j$ but it may be included in (10.2).

14. Appendix B: Blended Model—18 Betas Model

14.1 Inputs

There may be two time variable inputs:
t is the time at which the bond is evaluated.
s is the time of the most recent human evaluation.
For mids, there are 5 primary inputs:
$M_t^M$, the model mid price at time t.
$M_s^M$, the model mid price at time s.
$C_t^M$, the continuous pricing mid price at time t.
$C_s^M$, the continuous pricing mid price at time s.
$E_s^M$, the evaluation at time s.
For bids, there are another 5 primary analogous inputs:
$M_t^B$, the model bid price at time t.
$M_s^B$, the model bid price at time s.
$C_t^B$, the continuous pricing bid price at time t.
$C_s^B$, the continuous pricing bid price at time s.
$E_s^B$, the evaluation at time s.
In addition, there may be several secondary inputs used for calculating betas in Section 15.5 below:
Confidence intervals for the mid and bid model output at time t and s.
Values for the most recent trade prices for the ETFs used by the corporate model (LQD, HYG, IEI, TLT) at times s and t (For Agency, use ETF tickers AGZ, IEI, TLT).
Years to maturity and next call.
Credit rating.

14.2 Outputs

For each issue, the system may produce a blended mid and bid price and an updated confidence interval for each:
Blended Bid Price
Blended Mid Price

14.3 Variable Definition

In an exemplary embodiment, this is the mapping of variable names in the model.

14.4 Method

For each of blended mid and bid prices, the method may estimate 9 parameters, for mids:

$$B_t^M = E_s^M + \beta_1^M (M_t^M - M_s^M) + \beta_2^M (M_s^M E_s^M) + \beta_3^M (C_t^M - C_s^M) + \beta_4^M (C_s^M - E_s^M) + \beta_5^M (M_t^B - M_s^B) + \beta_6^M (M_s^B - E_s^M) + \beta_7^M (C_t^B - C_s^B) + \beta_8^M (C_s^B - E_s^M) + \beta_9^M (E_s^B E_s^M)$$

and for bids:

$$B_t^B = E_s^B + \beta_1^B (M_t^M - M_s^M) + \beta_2^B (M_s^M - E_s^B) - \beta_3^B (C_t^M - C_s^M) + \beta_4^B (C_s^M - E_s^B) + \beta_5^B (M_t^B - M_s^B) + \beta_6^B (M_s^B E_s^B) + \beta_7^B (C_t^B - C_s^B) + \beta_8^B (C_s^B - E_s^B) + \beta_9^B (E_s^M - E_s^B)$$

The betas may be configured by methodology by using an upload function, since the 18 betas are different bond by bond. The betas above may be estimated using a past sample of data, using a linear regression on the above equations, where the Bs may be substituted with a measure of future mid/bid prices. The betas may be modeled to be a function of the secondary inputs, and these functions may also contain parameters to be estimated.

14.5 Upload Blended Px Betas

Figure 29:
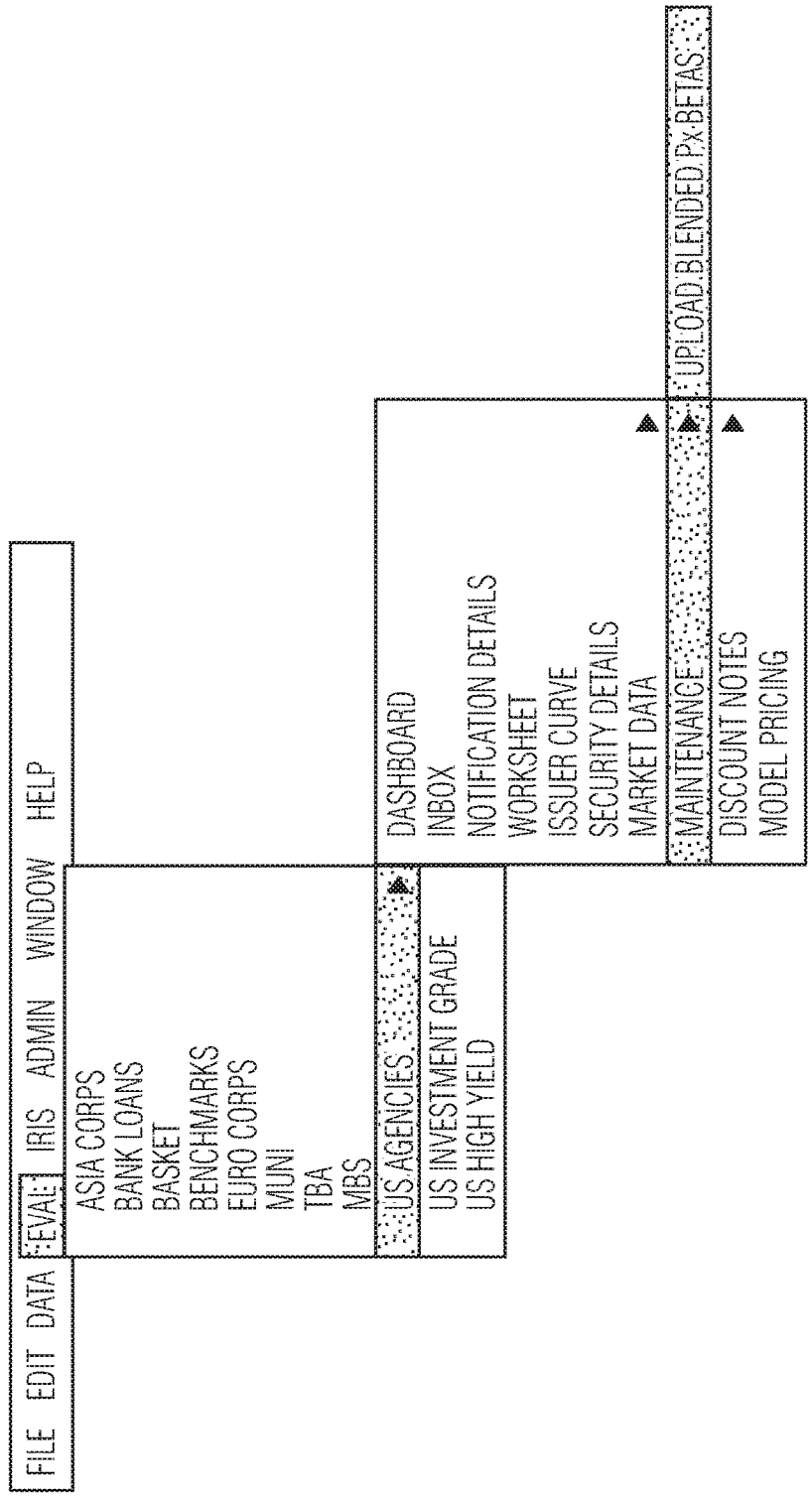
FIG. 29 depicts an exemplary upload button.

FIG. 29 depicts an exemplary upload button. There may be an upload button for methodology to manually upload the 18 betas on bond level, as the betas are calculated and different bond by bond. This button may be available on system level, one for each of AGN, IG, HY, and the top menu option as shown in FIG. 29. Upload Blended Px Betas menu is under the Maintenance menu for each pricing system.

Figure 30:
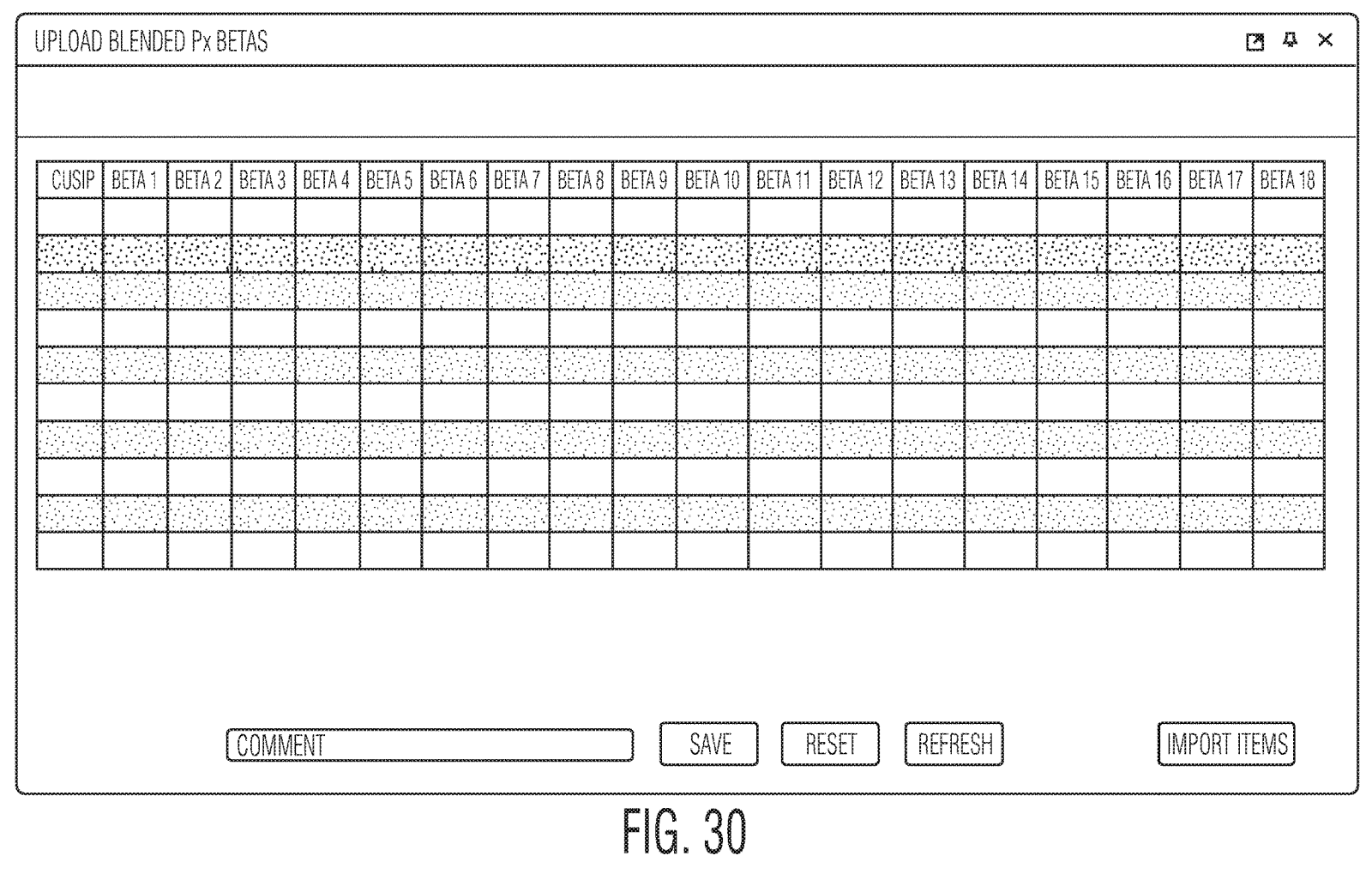

FIG. 30 depicts an exemplary screen of upload blended price betas. The "Import Items" button enables the user to load the file where the blended price betas have been saved.

Figure 31:
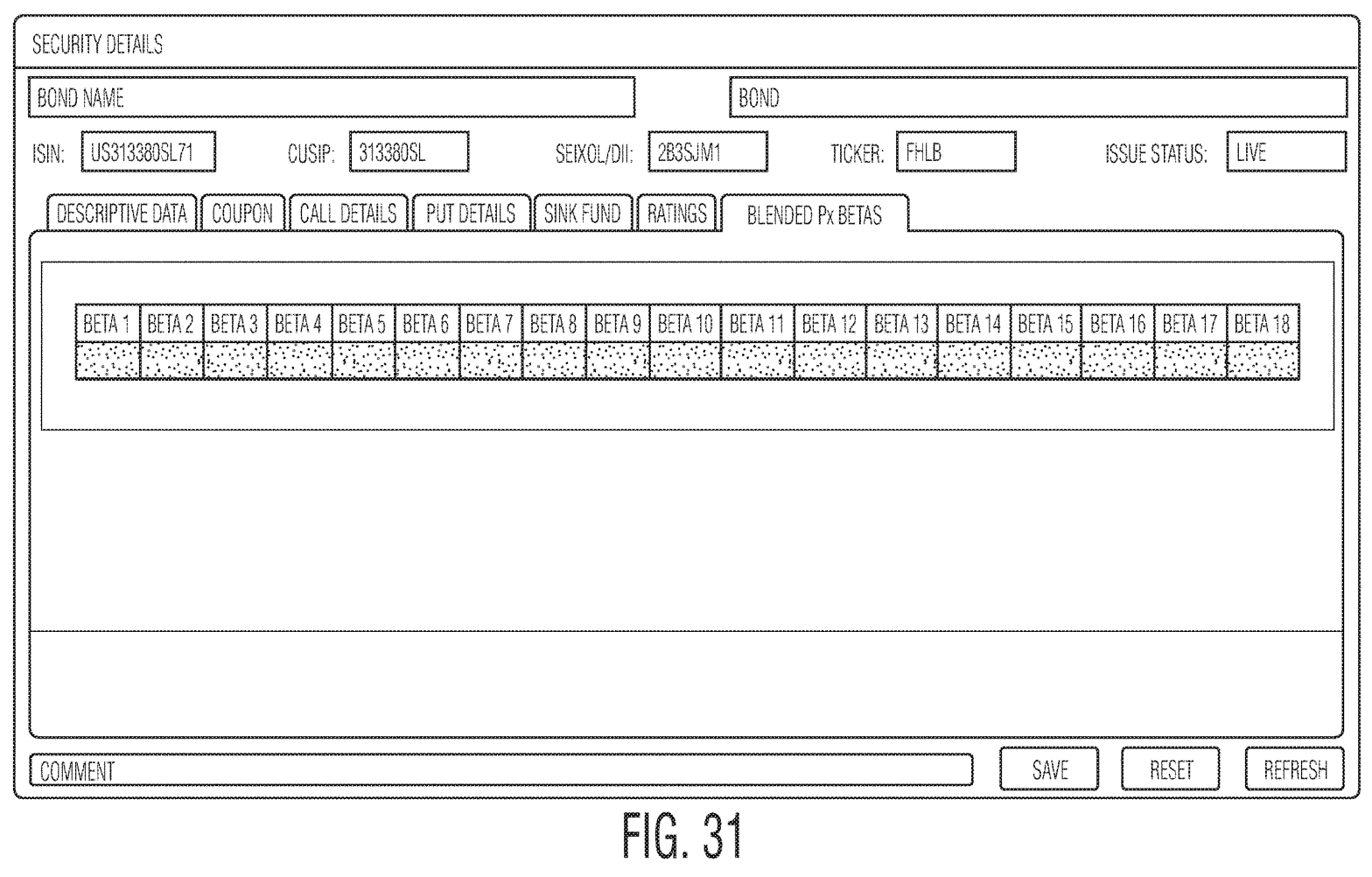

FIG. 31 depicts an exemplary new tab added on the screen of Security Details as "Blended Px Betas" and display CUSIP with 18 betas. This is applied to all the three pricing systems, i.e., IG, HY and Agency.

15. Appendix C: Historical Data Dependencies

This section describes historical data that may be needed in order to run quantile regression for confidence intervals and linear regression for blended model.

15.1 Historical Data for Quantile Regression

Two-year data of the following fields may be needed to run quantile regression in Section 3.

15.1.1 Reference Data

Reference data in the model includes only the following fields:
CUSIP.
Maturity—enriched to Years to Maturity, $YTM_{30}$.
Ratings—enriched to rating buckets.
Historical reference data is not available. For purposes of historical inputs into the regressions, current reference data may be used for all bonds. Note that the reference data at time of trade may be used.

15.1.2 TRACE Data

Two years trade data may be needed. The trade data may be transformed into the same format that the History service retrieves on a going forward basis, in order to be populated and retrieved by the service on Day 1. From Phase One, the following trade-level data may be captured—these fields are used for GUI purposes—and may be included in the history service:
MODEL_UPDATED_TIME.
MODEL_SIDE_INDICATOR.
MODEL_PAIRED_INDICATOR.
MODEL_PAIRED.
MODEL_PRICE_CHANGE.
MODEL_OBSERVATION_WEIGHT.
MODEL_BID_PRICE.
MODEL_ASK_PRICE.
MODEL_MID_PRICE.
MODEL_OUTOFSAMPLE_TC.
MODEL_TRUNC_OS_TC.
MODEL_RESCALED_TC.
MODEL_FINAL_TC.

In addition to the highlighted fields above (needed for linear regression), the following 4 fields may also be needed for calculating the confidence interval:
MODEL_ADJ_PRICE
MODEL_LDB2
MODEL_PRED_MID_PRICE
MODEL_PRED_BID_PRICE These fields may have been added to Phase One already, such that it may not be necessary to back-populate them from Phase One go-live day to Phase Two go-live day. Historical values may be included.

15.1.3 Bond Data Betas

For the first Day 1 CI regression, the bond-level ETF betas (5 per day per bond) may be needed and 2 years worth of history. The 5 bond-level ETF betas that may be needed to calculate etf2 and etf23 are:

beta_l (this is final LQD beta calculated by using beta_LQD and the cell-average coefficient).
beta_h (this is final HYG-LQD beta calculated by using beta_HYG-LQD and the cell-average coefficient).
beta_m (this is final TLT-IEI beta calculated by using beta_TLT-IEI).
Reg6_Coef_etf2 (Issue-level market adjustment coefficient, from Regression 6).
Reg6_Se_etf2 (Issue-level market adjustment standard error, from Regression 6).

15.1.4 ETFs Price Data

Two-year past ETFs price history sampled every 15 minutes may be needed, for LQD and AGZ. This may be used to attach the trade data. This requirement may already be met for Phase One.

15.2 Historical Data for Blended Model (Linear Regression)

One-year data of the following fields may be needed to run linear regression in Section 5.

15.2.1 TRACE Data

One-year TRACE trade may be needed, including trade price for each large interdealer trade and each large dealer buy trade. This data may already be available. In addition, the evaluation price may be attached at time of trade to each trade. For historical purposes, there may only be 3 PM and 4 PM prices. The logic may be as follows:

Any trade executed prior to 3 PM gets the previous business day's 4 PM evaluation.
Any trade executed between 3 PM (inclusive) and 4 PM gets the 3 PM evaluation.
Any trade executed after 4 PM (inclusive) gets the 4 PM evaluation.

15.2.2 Model Price

One-year Model Mid/Bid Price may be used for the same large interdealer trade and large dealer buy trade. These may be captured in the history above (16.2.1)

15.2.3 Confidence Interval

One-year confidence interval at the time of each historical large interdealer and large dealer buy trade may be needed for all dates up to Go Live -1.

15.2.4 LQD (AGZ for Agencies) Price at time of evaluation

One-year LQD price may be needed at the time of each evaluation:

For the 3 pm evaluation, find the ETF price prior to 3 pm.
For the 4 pm, evaluation, find the ETF price prior to 4 pm.

16. Appendix D: Downgrade List of Agency and IG Notifications

There are two downgrade lists below for Agency and IG notifications respectively. If it is a "Yes" in Downgrade column, then when model price changes, these notifications may be downgrade from suspect to warnings following rules in Section 9.5. If it is a "No" in Downgrade column, then when model price moves, these notifications may stay as suspect. If it is a "N/A" in Downgrade column, then these notifications do not relate to model price or do not have a model price, so they may not change their notifications with model price. In an exemplary embodiment, only suspect notifications may be downgraded, all the warnings may remain the same.

16.1 Downgrade List of Agency Notifications

| Downgrade? | Description (headline) | Type | Reason (details) |
|---|---|---|---|
| Yes | Outlier Buy/IDB Trade | Suspect: Market Data | Outlier [Trade Side] trade received for [Trade Size] of [CUSIP] at [Trade Timestamp]: [IDCO Bid Spread] to [IDCO Benchmark] ([IDCO Bid Spread - New Bid Spread]) |
| N/A | Incomplete Curve Notification | Suspect: Curve | [Curve Name] is missing sufficient data for points: <List of missing CMT points> |
| N/A | Discount Rate <Minimum | Suspect: Rates | Rate for [Month] of [New Rate] is less than the minimum [Minimum Rate] |
| N/A | Discount Rate Outlier | Suspect: Rate Quotes | Outlier quote received from [Source]: |
| N/A | Insufficient Data for Discount Rates Scale | Suspect: Rates | Insufficient market data to calculate Agency Discount Rates scale |
| Yes | Negative Yield | Suspect: Evaluation | Negative yield(s) detected for [CUSIP]: |
| N/A | Unchanged Curve Spread | Suspect: Evaluation | Spread has not changed for a particular 'curve point' on the issuer curve. |
| N/A | Unchanged Curve Spread | Suspect: | Spread has not changed for a particular 'curve point' on the issuer curve. |

16.2 Downgrade List of IG Notifications

| Downgrade? | Description (headline) | Type | Reason (details) |
|---|---|---|---|
| Yes | One-Sided Ask Quote | Suspect: Market Data | A one-sided ask quote for security [security ID] [security description] was received from default source [default source name]. Review the default source and determine if it may be changed. |
| Yes | Outlier | Suspect: Market Data | The incoming [market data type] for [security ID] [security description] has exceeded the outlier threshold of [X] by [Y]. |

-continued

| Downgrade? | Description (headline) | Type | Reason (details) |
|---|---|---|---|
| Yes | Stale Default Source | Suspect: Market Data | The default source [source name] has exceeded the stale threshold of [X]. Currently, it has been stale for [Y] days. |
| Yes | Same-level Default Source Quotes | Suspect: Market Data | Notification may indicate that the market data was previously rejected source is sending unchanged level. |
| Yes | Assign Parent | Suspect: Parent/Child | The market data score for security [security ID] [security description] has dropped below the suspect configurable threshold of [10] does not have a parent assigned. Review the security and assign it to a parent if possible. |
| Yes | MD Score Fallen Below a Certain Threshold | Suspect: Configuration | The Market Data Score has fallen below a certain threshold that is configurable by the user. |
| Yes | Child BM Change | Suspect: Parent/Child | Child [security ID] [security description] has changed to the [benchmark] benchmark. Verify the Parent relationship is accurate or find a new Parent. |
| No | Child Corporate Action | Suspect: Parent/Child | Child [security ID] [security description] has had a corporate action. Verify the Parent relationship is accurate or find a new Parent. |
| Yes | Child Credit Rating Change | Suspect: Parent/Child | Child [security ID] [security description] has changed to a [rating agency]'s [rating level] rating. Verify the Parent relationship is accurate or find a new Parent. |
| Yes | Child Redemption Date Change | Suspect: Parent/Child | Child [security ID] [security description] has a change in redemption date. Verify the Parent relationship is accurate or find a new Parent. |
| Yes | Large Parent/Child BM Change | Suspect: Parent/Child | The difference in benchmark yield between Child [security ID] [security description] and Parent [security ID] [security description] is now [Y], which exceeds the change of threshold of [X]. |
| Yes | Parent BM Change | Suspect: Parent/Child | Parent [security ID] [security description] has changed to the [benchmark] benchmark. Verify the dependent security relationships are accurate or find a new Parent for the dependent securities. |
| Yes | Parent Credit Rating Change | Suspect: Parent/Child | Parent [security ID] [security description] has changed to a [rating agency]'s [rating level] rating. Verify the dependent security relationships are accurate or find a new Parent for the dependent securities. |
| Yes | Parent Matured | Suspect: Parent/Child | Parent [Parent security ID] [Parent security description] has matured. Select another Parent for [security ID] [security description]. |
| Yes | Parent Redemption Date Change | Suspect: Parent/Child | Parent [security ID] [security description] has a change in redemption date. Verify the dependent security relationships are accurate or find a new Parent for the dependent securities. |
| Yes | Stale Offset | Suspect: Parent/Child | The offset of Child [security ID] [security description] and Parent [security ID] [security description] has exceeded the stale offset threshold of [X]. It has been stale for [Y] days. |
| Yes | Stale Parent | Suspect: Parent/Child | Parent [security ID] [security description] has exceeded the stale Parent threshold of [X]. It has been stale for [Y] days. |
| No | Manager Approval Required | Suspect: Configuration | (see details in section 18.3 and 20.3.2) |
| No | Security Called | Suspect: Worksheet | [security ID] [security description] has been called. |
| No | Corporate Action | Suspect: Worksheet | [security ID] [security description] has had a corporate action. |
| No | Defaulted Security | Suspect: Worksheet | [security ID] [security description] has defaulted. |

| Downgrade? | Description (headline) | Type | Reason (details) |
|---|---|---|---|
| Yes | Undefaulted Security | Suspect: Worksheet | [security ID] [security description] has un-defaulted {security no longer in default}. |
| Yes | Big Mover—Manual Enterred Quotes | Suspect: Worksheet | Manual quote of [security ID] [security description] is [Y] different from last published price; exceeded the big mover tolerance [X]. |
| Yes | Big Mover—Manual Enterred Guidance | Suspect: Worksheet | Enterred guidance of [security ID] [security description] is [Y] different from last published price; exceeded the big mover tolerance [X]. |
| No | Big Mover—Jump to Par | Suspect: Worksheet | [security ID] [security description] has moved to par or redemption price since the last published price. |
| Yes | Unchanged Evaluation | Suspect: Worksheet | [security ID] [security description] has not changed for [X] days, exceeding the unchanged threshold of [Y] days. |
| Yes | Retail Bond: Interdealer/Dealer Buy/Default Source Outliers | Suspect: Market Data | The incoming [market data type] for [security ID] [security description] has exceeded the outlier threshold of [X] by [Y]. |

17. Appendix E: Fields of Worksheet and Quote screens

The spreadsheet below is an exemplary list of the fields displayed on Worksheet, Main Quote Market screen, Quote History screen, and Model Details screen.

| Field | Phase | WS | Quote | Quote History | Model Details | |
|---|---|---|---|---|---|---|
| Model Rating Score | 1 | | | | x | |
| Model YTM | 1 | | | | x | |
| Model Updated Time | 1 | | x | x | x | add to Quote screen, remove from WS |
| Model Bid Spread | 1 | Model Bid Spread | Implied Bid Spread IDCO Bid Spread | x | x | keep bid/mid in worksheet |
| Model Mid Spread | 1 | Model Mid Spread | Implied Mid Spread IDCO Mid Spread | x | x | |
| Model Ask Spread | 1 | | Implied Ask Spread IDCO Ask Spread | x | x | |
| Model Bid Yield | 1 | | Implied Bid Yield IDCO Bid Yield | | x | |
| Model Mid Yield | 1 | | Implied Mid Yield IDCO Mid Yield | | x | |
| Model Ask Yield | 1 | | Implied Ask Yield IDCO Ask Yield | x | x | remove from WS |
| Model Bid Price | 1 | Model Bid Price | Bid Price Implied Bid Price IDCO Bid Price | x | x | |
| Model Mid Price | 1 | Model Bid Price | Mid Price Implied Mid Price IDCO Mid Price | x | x | |

-continued

| Field | Phase | WS | Quote | Quote History | Model Details | |
|---|---|---|---|---|---|---|
| Model Ask Price | 1 | | Ask Price Implied Ask Price IDCO Ask Price | x | x | keep bid/mid in worksheet |
| Model/Eval Diff | 1 | x | | | x | keep on WS |
| Model Market Adjustment | 1 | | | | x | |
| Model Trade-to-trade Change in Price | 1 | | | | x | |
| Model Price Status | 1 | | | | x | Status of model price independent of whether or not it's being used |
| Model 3PM Bid/Mid/Ask Price | 1 | x | x | x | x | keep bid/mid in worksheet |
| Model 4PM Bid/Mid/Ask Price | 1 | x | x | x | x | remove from WS |
| Model 3PM Bid/Mid/Ask Spread | 1 | x | x | x | x | keep bid/mid in worksheet |
| Model 4PM Bid/Mid/Ask Spread | 1 | x | x | x | x | remove from WS |
| Model 3PM Bid/Mid/Ask Yield | 1 | | x | x | x | remove from WS |
| Model 4PM Bid/Mid/Ask Yield | 1 | | x | x | x | remove from WS |
| Model Confidence Intervals | 2 | | | | x | remove from WS |
| Model Confidence Group | 2 | | | | x | remove from WS |
| Model 3PM Confidence Intervals | 2 | | | | x | remove from WS |
| Model 4PM Confidence Intervals | 2 | | | | x | remove from WS |
| Source Type | 2 | | x | x | | remove from WS |
| Source Feed | 2 | | x | x | | remove from WS |
| Model 3PM Confidence Group | 2 | | | | x | remove from WS |
| Model 4PM Confidence Group | 2 | | | | x | remove from WS |

Embodiments comprise computer components and computer-implemented steps that will be apparent to those skilled in the art after reviewing the description herein. For example, calculations and communications can be performed electronically, and results can be displayed using a graphical user interface.

Figure 32:
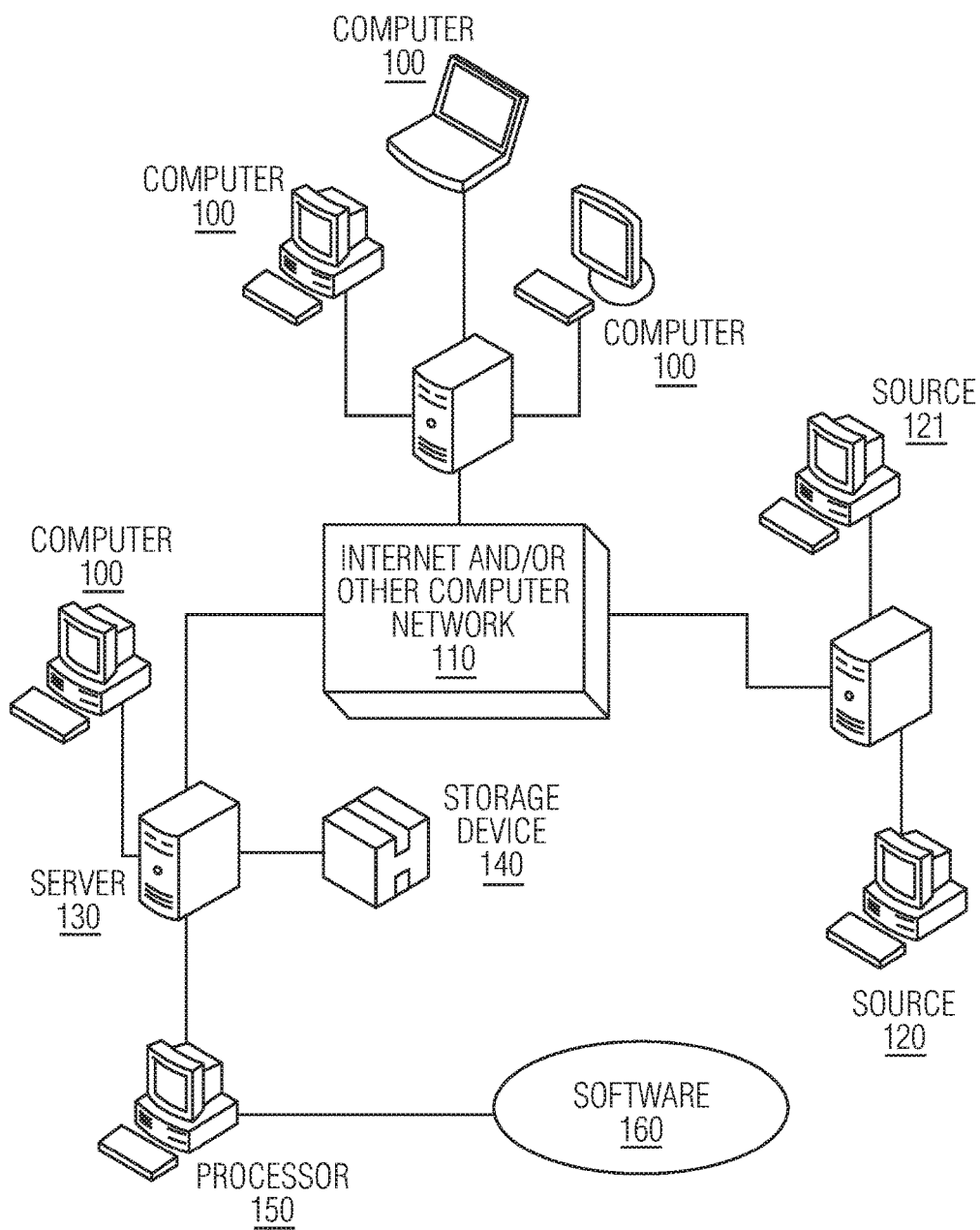
FIG. 32 depicts an exemplary computer network system.

An overview of an exemplary such system is depicted in FIG. 32. Computers 100 communicate via network 110 with a server 130. The computers 100 may be any device operable to provide the functionality disclosed herein, including communicating with the one or more servers and/or other client devices, displaying information with one or more interface screens, collecting information from users thereof, retrieving data, storing data, etc. For example, the computers 100 may be a mobile phone, a smart phone or tablet, a personal computer (PC), as well as any dedicated computer apparatus. The front-end functionality may be provided with a browser or any other network communication application, or with special purpose software or "apps" designed specifically for accessing and providing the features disclosed herein. A plurality of sources of data 120-121 also communicate via network 110 with a server 130, processor 150, and/or other components operable to calculate and/or transmit information. Server(s) 130 may be coupled to one or more storage devices 140, one or more processors 150, and software 160.

Exemplary computers 100 according to at least one embodiment are shown. In one embodiment, the computers 100 include a bus or other communication mechanism for communicating information between components of the computers 100, and the processor 150 coupled with the bus for processing the information. The computers 100 may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor 150. In addition, the main memory may be used for storing temporary variables or other intermediate information during the execution of instructions by the processor 150. The computers 100 may further include read only memory (ROM) or other static storage device (e.g., programmable ROM (PROM), erasable PROM (EPROM), and electrically erasable PROM (EEPROM)) coupled to the bus for storing static information and instructions for the processor 150. The at least one computer readable medium or memory may have stored thereon programmed instructions and/or contain data structures, tables, records, or other data described herein.

The computers 100 may also include a disk controller coupled to the bus to control the one or more storage devices 140 for storing information and instructions, such as a hard disk, and a removable media drive (e.g., floppy disk drive, read-only compact disc drive, read/write compact disc drive, compact disc jukebox, tape drive, and removable magneto-optical drive). The storage devices 140 may be added to the computers 100 using an appropriate device interface (e.g., small computer system interface (SCSI), integrated device electronics (IDE), enhanced-IDE (E-IDE), direct memory access (DMA), or ultra-DMA).

The computers 100 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)) designed to perform as the components described herein.

The computers 100 may also include a display controller coupled to a bus to control a display, such as a liquid crystal display (LCD), for displaying information via the one or more interface screens disclosed herein to a user thereof. In one exemplary embodiment, the computers 100 include at least one input device, such as a keyboard or a pointing device, for a computer user to interact with the computers 100 and to provide information/instructions to one or more processors, e.g., the processor 150. The pointing device, for example, may be a mouse, a trackball, a pointing stick, a track pad, a touch screen, etc. In addition, a printer may provide printed listings of data stored and/or generated by the computers 100.

The computers 100 generally perform a portion or all of the processing steps disclosed herein in response to the processors, e.g., the processor 150, executing one or more sequences of one or more instructions contained in a memory, such as the main memory. Such instructions may be read into the main memory from another computer readable medium, such as a hard disk or a removable media drive. The instructions stored may be in any form, including without limitation executable code, scripts, interpretable programs, dynamic link libraries (DLLs), Java classes, application program interfaces (APIs), complete executable programs, or a combination thereof.

The computers 100 may also include a communication interface coupled to the bus. The communication interface provides a two-way data communication coupling to the network 110 that is connected to, for example, a local area network (LAN), or to another communications network, such as the Internet. For example, the communication interface may be a network interface card to attach to any packet switched LAN. As another example, the communication interface may be an asymmetrical digital subscriber line (ADSL) card, an integrated services digital network (ISDN) card, or a modem to provide a data communication connection to a corresponding type of communications line. Wireless links may also be implemented. In any such implementation, the communication interface sends and receives electrical, electromagnetic, or optical signals that carry digital data streams representing various types of information.

The network 110 typically provides data communication through one or more networks to other data devices. For example, the network 110 may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network 110 may provide a connection through a LAN or wireless network to a mobile device, such as a personal digital assistant (PDA), smartphone, laptop computer, or any other type of client device.

The system features may generally operated or otherwise made available by one or more providers via the one or more server 130. Some of the features of the system may be provided in conjunction with a third party or parties. For example, a provider may obtain information in connection with the one or more features through third party data providers, such as from a regulatory database (e.g., as the SEC's EDGAR), a commercial data provider (e.g., Bloomberg, Reuters, etc.), or any other public or private data source (e.g., securities exchanges). The provider server or servers may be coupled to one or more third party servers 130 and/or databases 140.

The provider or a third party may also allow companies, investors, intermediaries, or other users of the system to exchange trading or pricing information regarding trades or securities on one or more electronic trading platforms, marketplaces, and/or exchanges, such as via an electronic communication network (ECN), etc. In this instance, the system may further have access to one or more exchange or marketplace servers. That is, the computers 100 may receive data regarding trade orders directly from an exchange server or indirectly from a provider server.

The system may be implemented over any type of communications network, such as a local area network (LAN), a wide area network (WAN), the Internet, a telephone network (POTS), a wireless network, including cellular and Wi-Fi networks, or combinations of wired and/or wireless networks. For example, the computers 100 may access the servers 130 directly over a LAN/WAN 110. Alternatively or additionally, computers 100 may access the servers 130 indirectly over a LAN/WAN 110. The computers 100 are preferably configured or otherwise capable of transmitting and/or receiving communications to and/or from the one or more servers 130, including any items of data discussed herein. This may be accomplished with a communication interface that enables communication with a similarly equipped server computer, wirelessly, wired, or a combination thereof. In at least one embodiment, the computers 100 generally provide the front-end functionality and one or more servers 130 provide the back-end functionality discussed herein.

Calculations described herein, and equivalents, are, in an embodiment, performed entirely electronically. Other components and combinations of components may also be used to support processing data or other calculations described herein as may be evident to one of skill in the art. Server 130 may facilitate communication of data from a storage device 140 to and from processor(s) 150, and communications to computers 100. Processor 150 may optionally include or communicate with local or networked storage (not shown) which may be used to store temporary or other information. Software 160 can be installed locally at a computer 100, processor 150 and/or centrally supported for facilitating calculations and applications.

For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of one or more embodiments of the present invention.

Moreover, where a computer system is described or claimed as having a processor for performing a particular function, it may be understood by those skilled in the art that such usage may not be interpreted to exclude systems where a single processor, for example, performs some or all of the tasks delegated to the various processors. That is, any combination of, or all of, the processors specified in the description and/or claims could be the same processor. All such combinations are within the scope of one or more embodiments of the invention.

Alternatively, or in combination, processing and decision-making may be performed by functionally equivalent circuits such as a digital signal processor circuit or an application specific integrated circuit.

Many routine program elements, such as initialization of loops and variables and the use of temporary variables, are not described herein. Moreover, it may be appreciated by those of ordinary skill in the art that unless otherwise indicated, the particular sequence of steps described is illustrative only and can generally be varied without departing from the scope of the invention. Unless otherwise stated, the processes described herein are unordered—that is, the processes can be performed in any reasonable order.

All steps described herein may be understood by those skilled in the art as being capable of implementation in one or more embodiments by software, where feasible. Moreover, such software may be understood by those skilled in the art to be storable on a non-transitory computer readable medium and implementable by one or more computer processors.

While certain exemplary aspects and embodiments have been described herein, many alternatives, modifications, and variations may be apparent to those skilled in the art. Accordingly, exemplary aspects and embodiments set forth herein are intended to be illustrative, not limiting. Various modifications may be made without departing from the spirit and scope of the disclosure.

We claim:

1. A computer system comprising:
   one or more computer servers communicatively coupled to one or more external data sources,
   said computer servers comprising at least one processor, a non-transitory computer-readable medium storing computer-readable instructions, a receiving component, a filtering component, and a pricing valuation model, the computer-readable instructions, when executed by the at least one processor, causing the computer system to:
   execute a first portion of the pricing valuation model to determine a baseline pricing estimation, said first portion comprising a transaction cost adjustment component, a market adjustment component and value estimation component, and further causing the computer system to:
     receive, via the receiving component, valuation data for a security from the one or more external data sources,
     filter, via the filtering component, the received valuation data by removing outlier values according to a predetermined set of parameters,
     identify, via the transaction cost adjustment component, one or more characteristics of the security in the filtered valuation data,
     perform, via the transaction cost adjustment component, a first transaction cost adjustment regression calculation for the security based on a first set of characteristics from among the identified one or more characteristics in the filtered valuation data,
     determine, via the transaction cost adjustment component, a transaction cost adjustment coefficient for the security based on the first transaction cost adjustment regression calculation,
     determine, via the transaction cost adjustment component, a final transaction cost adjustment value for the security based on the transaction cost adjustment coefficient,
     perform, via the market adjustment component, a first market adjustment regression calculation based on a second set of characteristics of the security from among the identified one or more characteristics of the filtered valuation data, said first market adjustment regression calculation independent of said transaction cost adjustment regression calculation,
     determine, via the market adjustment component, a market adjustment coefficient for the security based on the first market adjustment regression calculation,
     determine, via the market adjustment component, a final market adjustment value for the security based on the market adjustment coefficient, and
     determine, by the value estimation component, the baseline pricing estimation of the security based on the final transaction cost adjustment value of the security and the final market adjustment value of the security, and
     store said baseline pricing estimation; and
   execute a second portion of the pricing valuation model to determine a current pricing estimation, in real-time or near real-time, said second portion further causing the computer system to:
     monitor live market data from among the one or more external data sources,
     retrieve the stored baseline pricing estimation,
     determine the current pricing estimation, in real-time or near real-time, in response to changes detected in the monitored live market data, said current pricing estimation based on the retrieved baseline pricing estimation and on at least a portion of the monitored live market data, and
     transmit the current pricing estimation to at least one computer.

2. A system as in claim 1, wherein the baseline pricing estimation is determined by rescaling prices to terms of the final transaction cost adjustment value and the final market adjustment value.

3. A system as in claim 1, further comprising a confidence interval component that calculates a confidence interval for the baseline pricing estimation.

4. A system as in claim 3, wherein the confidence interval is calculated with approximately the same frequency as the baseline pricing estimation.

5. A system as in claim 1, wherein said received valuation data comprises ETF transaction price data.

6. A system as in claim 1, wherein said received valuation data comprises bond attribute data.

7. A system as in claim 1, wherein said received valuation data comprises credit rating data.

8. A system as in claim 1, wherein said received valuation data comprises TRACE data.

9. A system as in claim 1, wherein said baseline pricing estimation is updated by applying one or more coefficient adjusted ETF data updates.

10. A system as in claim 1, wherein the one or more characteristics are based on at least one of a distance between a bid and an ask of a transaction for the security and a size of the transaction for the security.

11. A system as in claim 1, wherein said changes in the live market data comprise at least one of new trades, cancelled trades, replacement trades, and price changes.

* * * * *